(12) United States Patent  
Campbell

(10) Patent No.: US 12,078,451 B2  
(45) Date of Patent: Sep. 3, 2024

(54) FIREARM SIGHTING DEVICE AND SYSTEM

(71) Applicant: Robert Marshall Campbell, Miami, FL (US)

(72) Inventor: Robert Marshall Campbell, Miami, FL (US)

( * ) Notice: Subject to any disclaimer, the term of this patent is extended or adjusted under 35 U.S.C. 154(b) by 37 days.

(21) Appl. No.: 17/871,487

(22) Filed: Jul. 22, 2022

(65) Prior Publication Data

US 2023/0142324 A1    May 11, 2023

Related U.S. Application Data

(63) Continuation-in-part of application No. 17/829,291, filed on May 31, 2022, which is a continuation of application No. 17/556,824, filed on Dec. 20, 2021, application No. 17/871,487 is a continuation-in-part of application No. 17/403,769, filed on Aug. 16, 2021, said application No. 17/556,824 is a continuation of application No. 16/820,604, filed on Mar. 16, 2020, now Pat. No. 11,204,219, said application No. 17/403,769 is a continuation of application No. 16/519,919, filed on Jul. 23, 2019, now Pat. No. 11,092,409, application No. 17/871,487 is a continuation-in-part of application No. 16/404,584, filed on May 6, 2019, now abandoned, said application No. 16/519,919 is a continuation of application No. 15/884,067, filed on Jan. 30, 2018, now Pat. No. 10,359,256, said application No. 16/820,604 is a continuation of application No.

(Continued)

(51) Int. Cl.
*F41G 1/30*    (2006.01)
*F41C 27/00*    (2006.01)
*F41G 1/00*    (2006.01)
*F41G 1/34*    (2006.01)
*F41G 1/36*    (2006.01)
*F41G 11/00*    (2006.01)
*F41J 5/10*    (2006.01)
*G03B 29/00*    (2021.01)
*H04N 23/00*    (2023.01)

(52) U.S. Cl.
CPC ............... *F41G 1/30* (2013.01); *F41C 27/00* (2013.01); *F41G 1/00* (2013.01); *F41G 1/345* (2013.01); *F41G 1/36* (2013.01); *F41G 11/003* (2013.01); *F41J 5/10* (2013.01); *G03B 29/00* (2013.01); *H04N 23/00* (2023.01)

(58) Field of Classification Search
CPC .............. F41G 3/165; F41G 1/00; F41G 1/42
See application file for complete search history.

(56) References Cited

U.S. PATENT DOCUMENTS

2006/0010759 A1*    1/2006    Penney .................. F41G 11/001  
    42/126  
2014/0110483 A1*    4/2014    Benson .................. H01L 23/576  
    235/404

(Continued)

*Primary Examiner* — J. Woodrow Eldred  
(74) *Attorney, Agent, or Firm* — Javier Sobrado; The Brickell IP Group, PLLC

(57) ABSTRACT

A targeting device for a firearm having a sighting device, the targeting device having a mount capable of being secured to the fire arm, and a camera capable of capturing images in a field of view including the sighting device, the camera being adjustable relative to the sighting device such that it can be aligned with the sighting device.

20 Claims, 29 Drawing Sheets

Related U.S. Application Data

15/353,706, filed on Nov. 16, 2016, now Pat. No. 10,591,249.

(60) Provisional application No. 63/224,812, filed on Jul. 22, 2021, provisional application No. 62/667,499, filed on May 5, 2018, provisional application No. 62/467,197, filed on Mar. 5, 2017, provisional application No. 62/452,986, filed on Jan. 31, 2017, provisional application No. 62/398,509, filed on Sep. 22, 2016, provisional application No. 62/330,199, filed on May 1, 2016, provisional application No. 62/388,110, filed on Dec. 12, 2015, provisional application No. 62/388,109, filed on Dec. 12, 2015, provisional application No. 62/386,054, filed on Nov. 16, 2015, provisional application No. 62/386,055, filed on Nov. 16, 2015.

(56) References Cited

U.S. PATENT DOCUMENTS

| | | | |
|---|---|---|---|
| 2016/0245621 A1* | 8/2016 | Kintzing | F41G 11/003 |
| 2020/0072577 A1* | 3/2020 | Chen | H04N 23/54 |

* cited by examiner

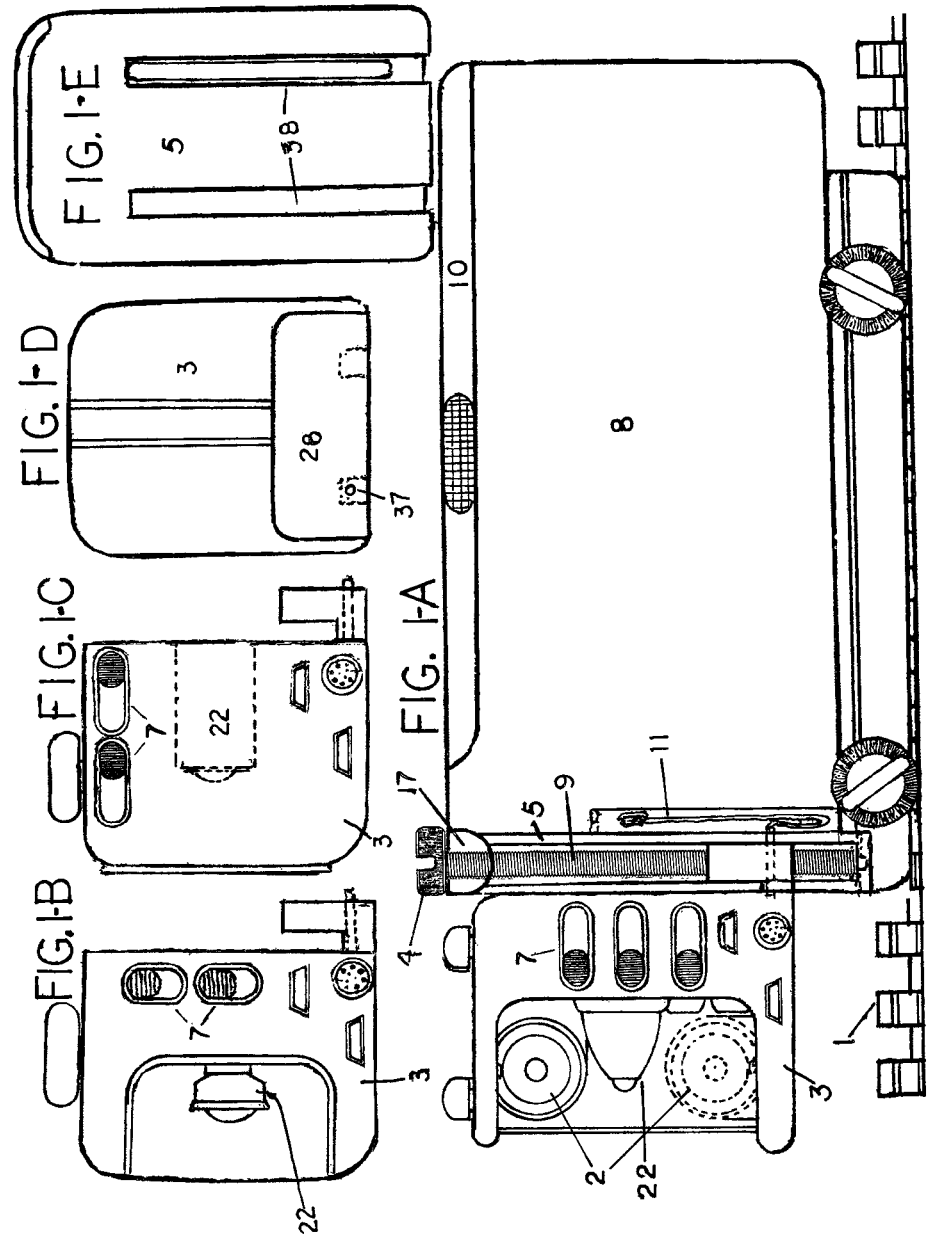

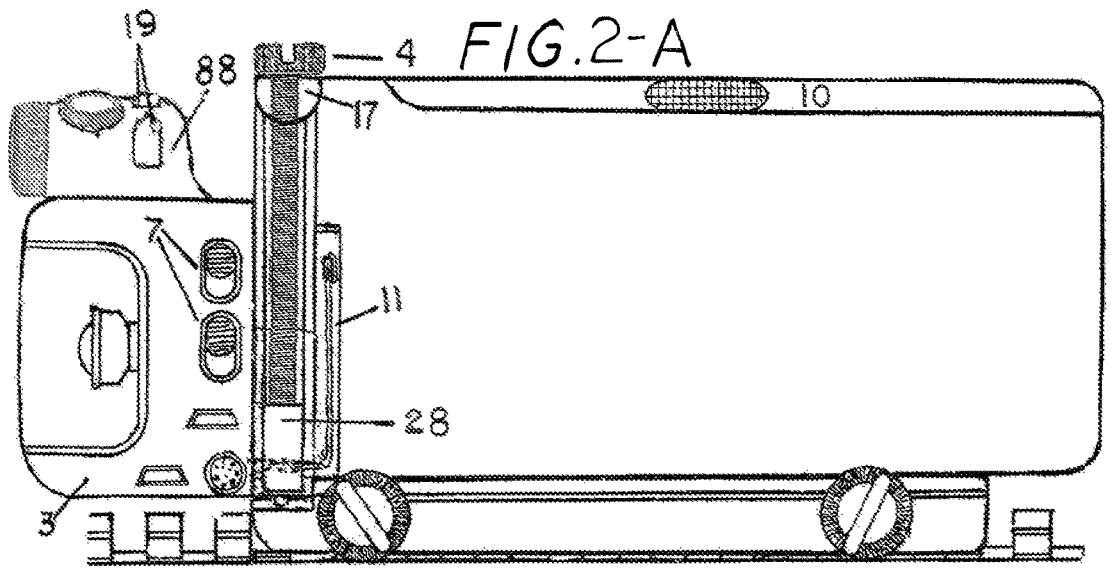
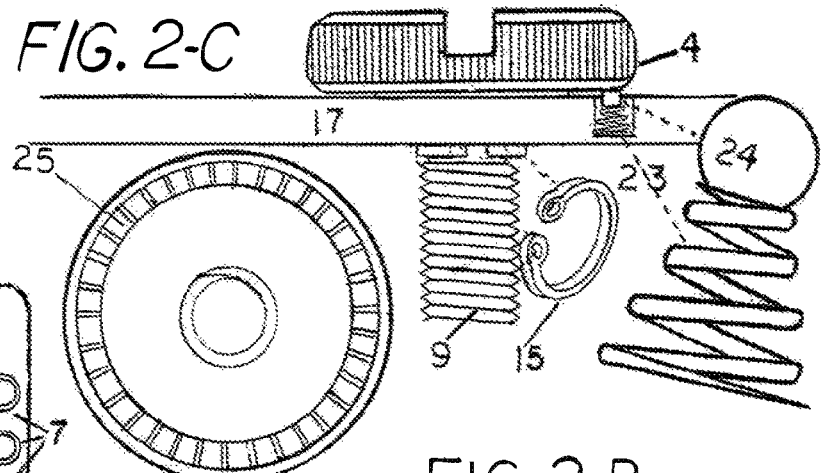
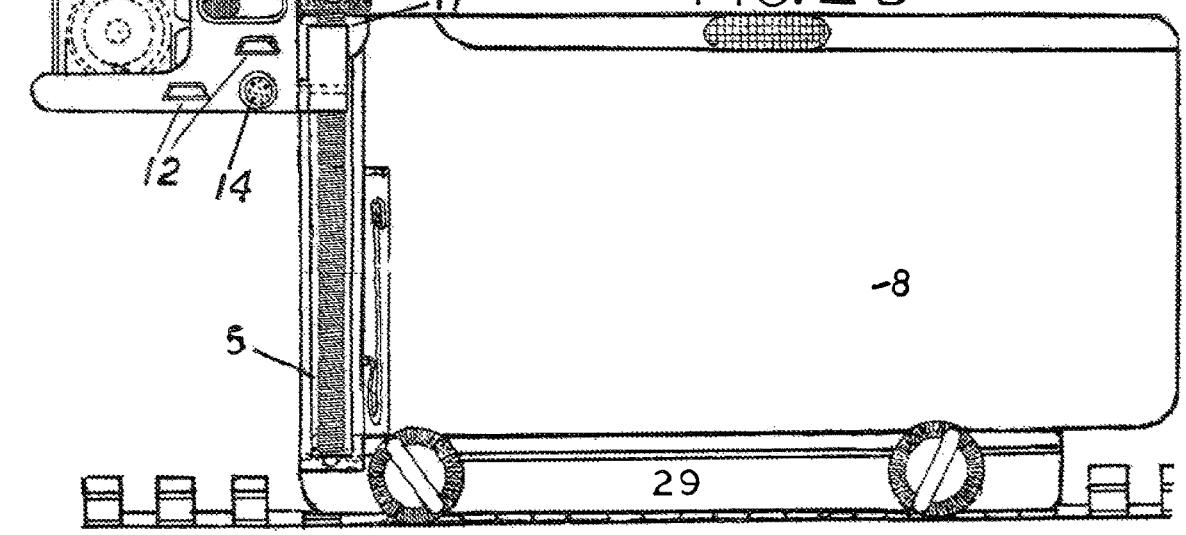

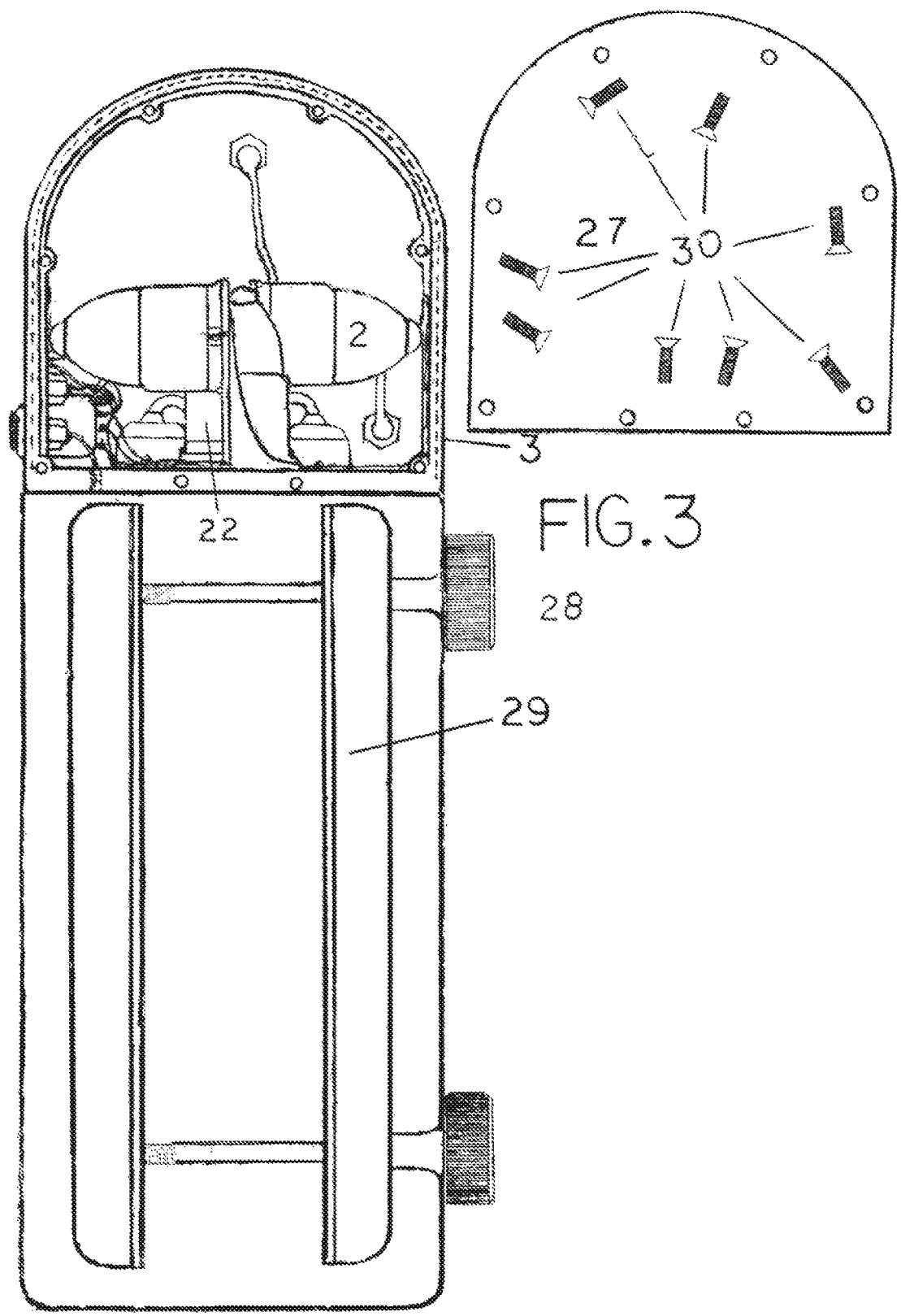

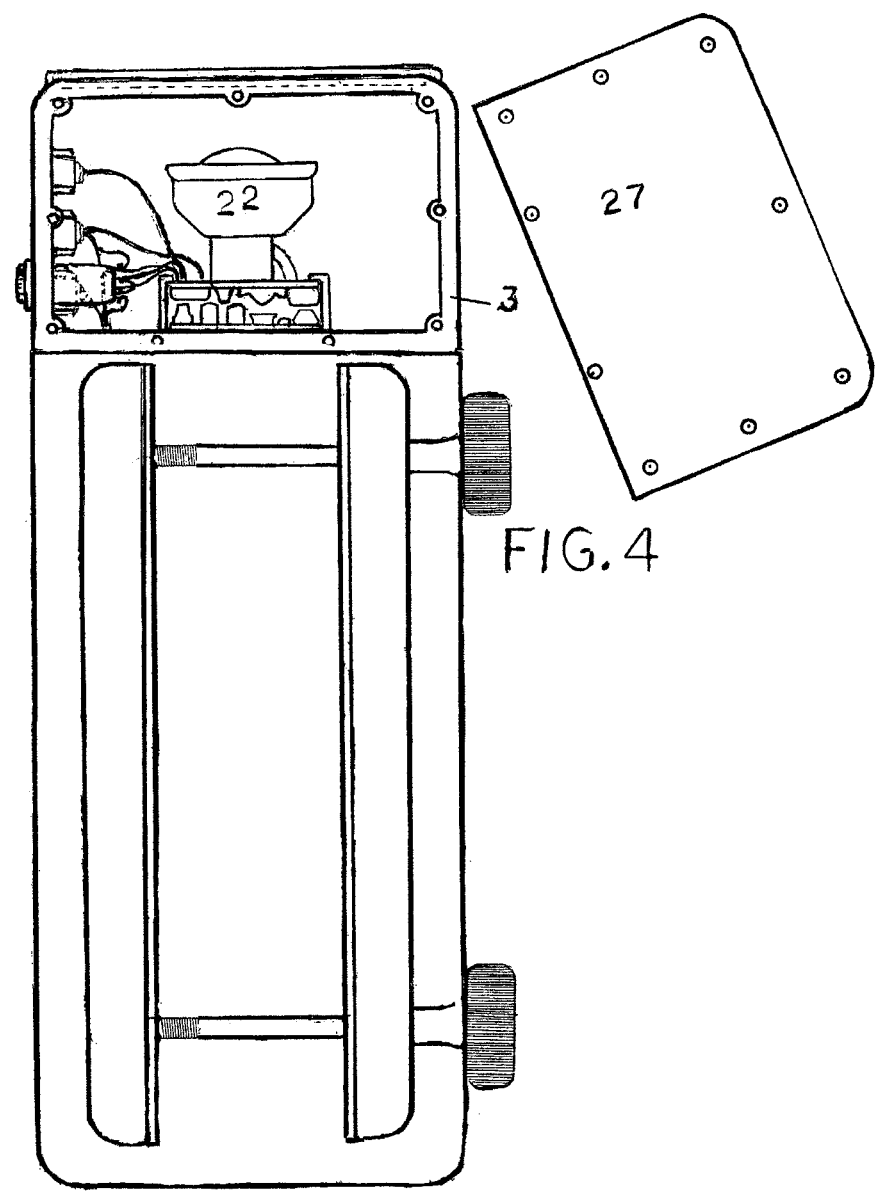

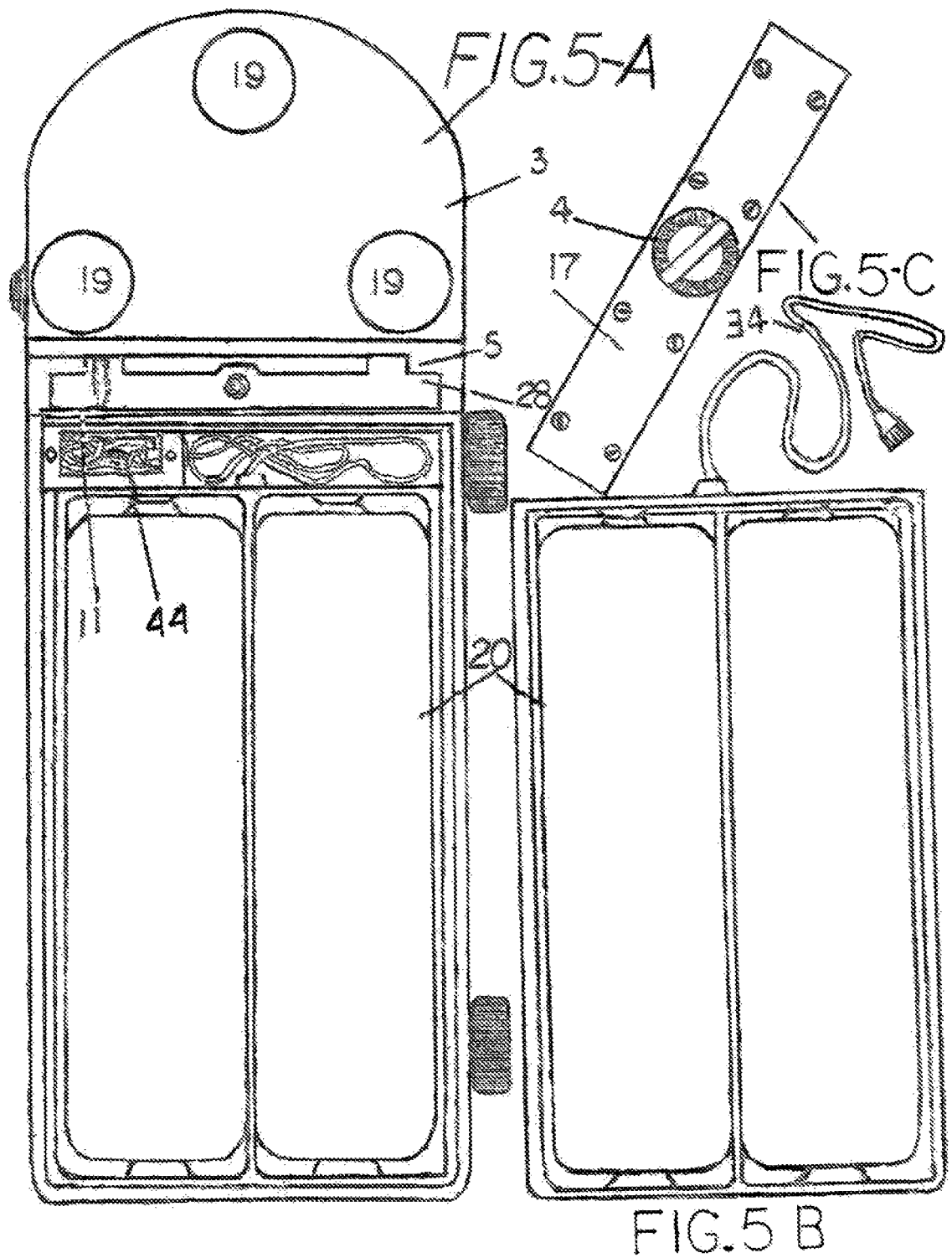

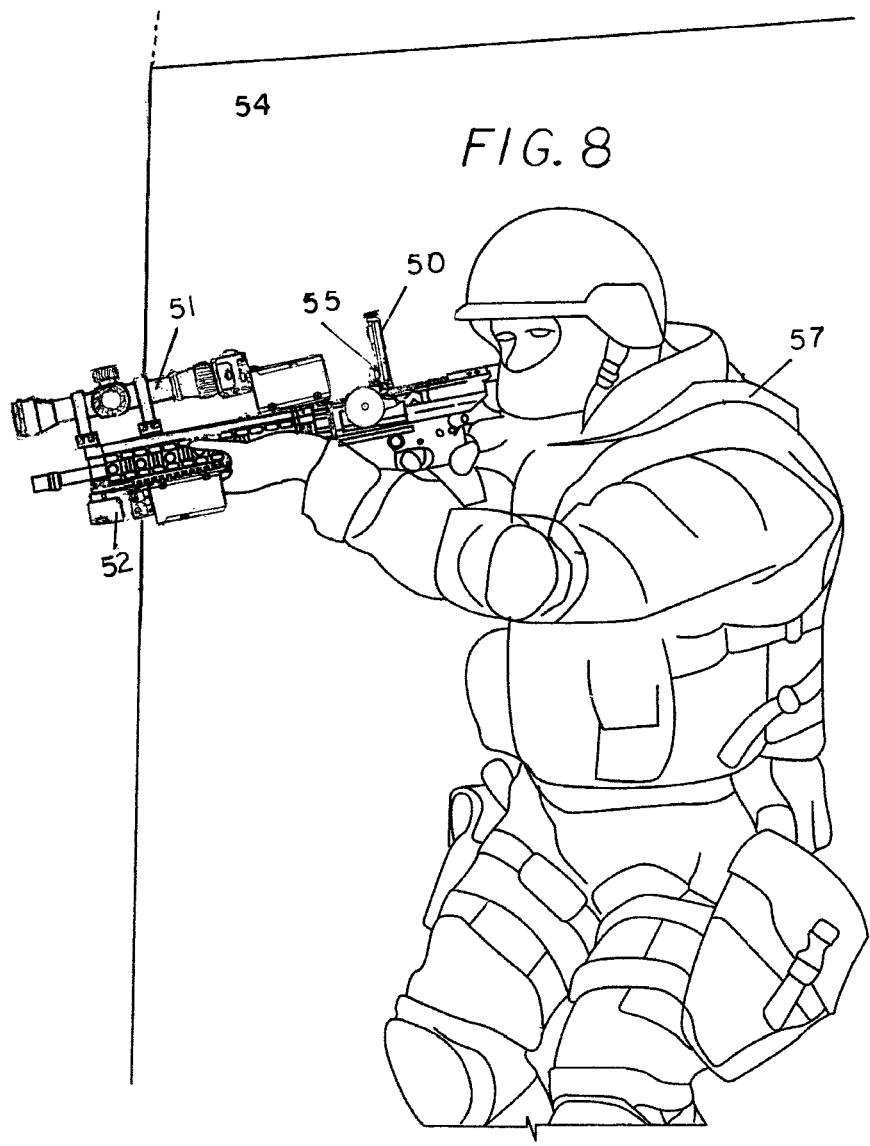

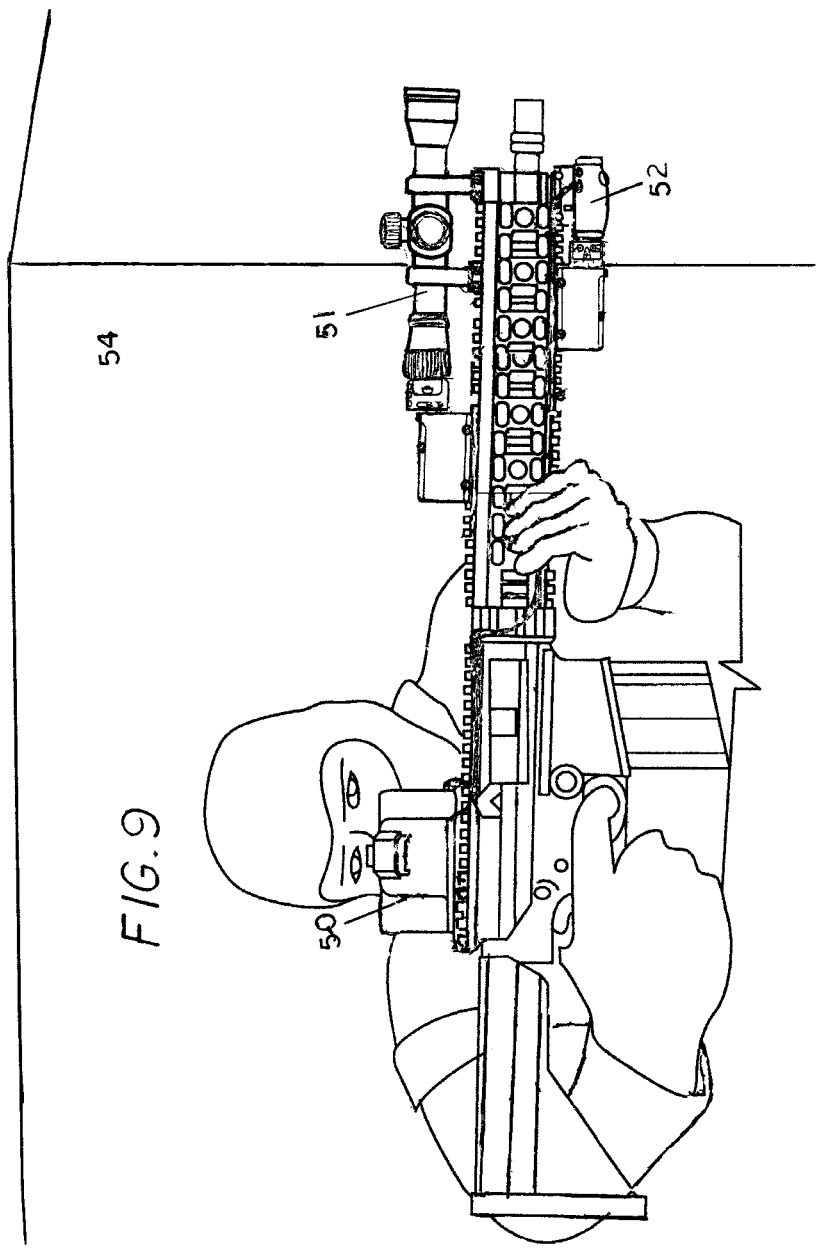

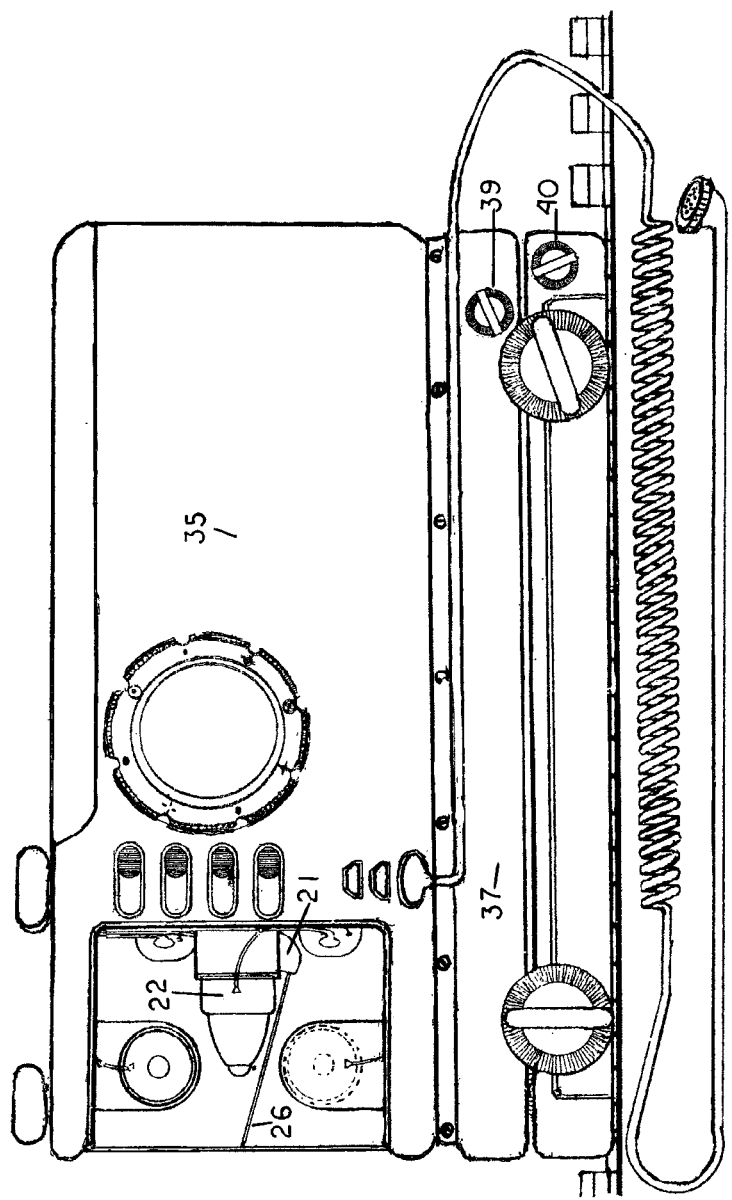

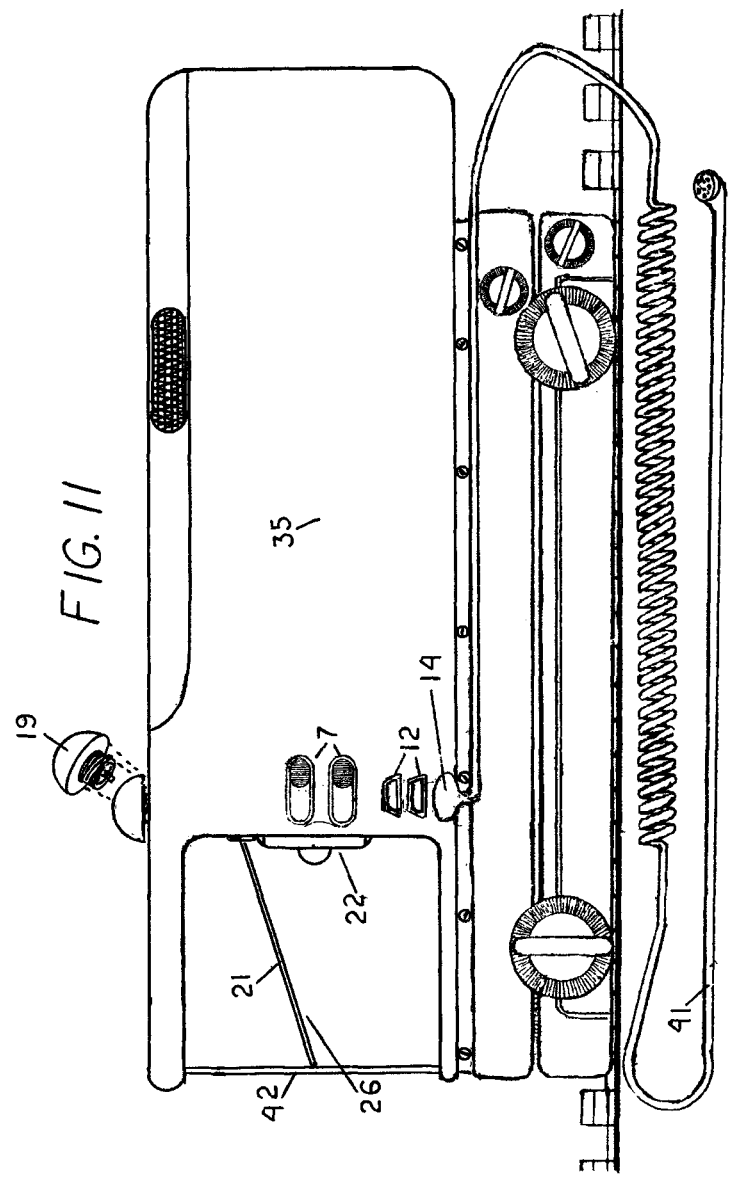

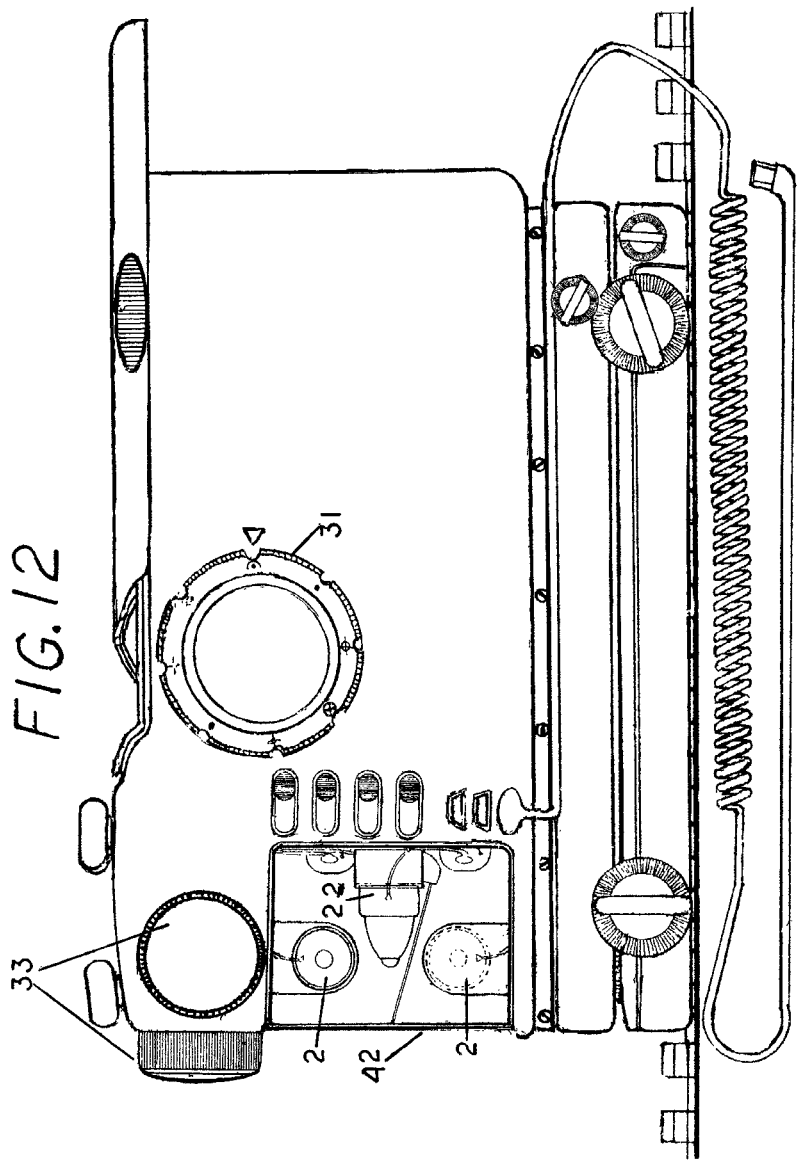

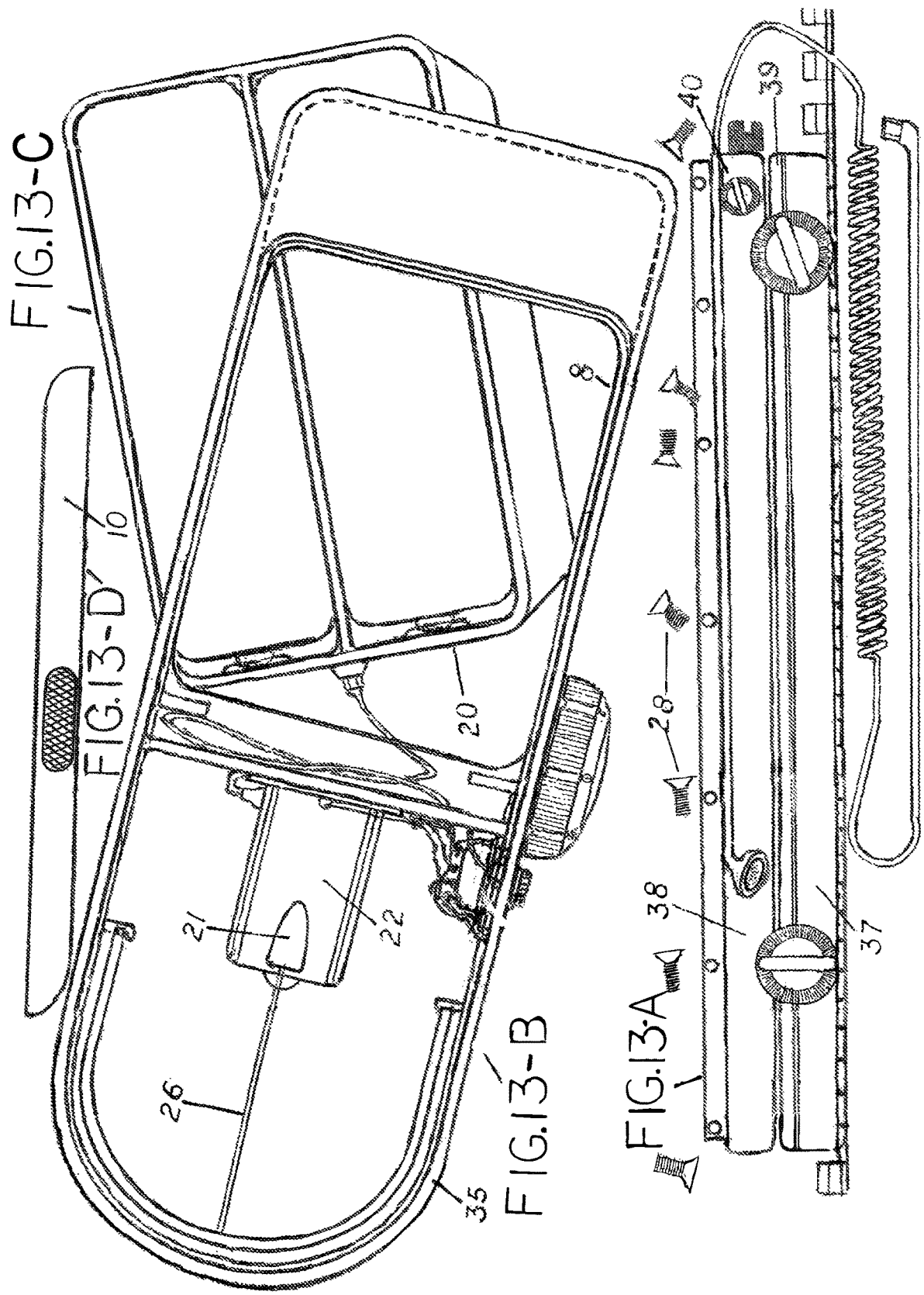

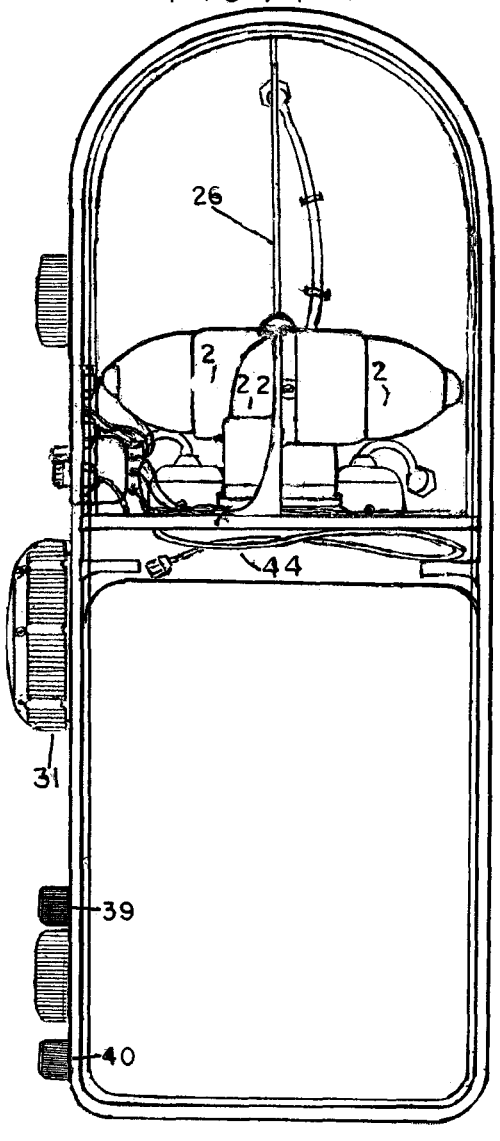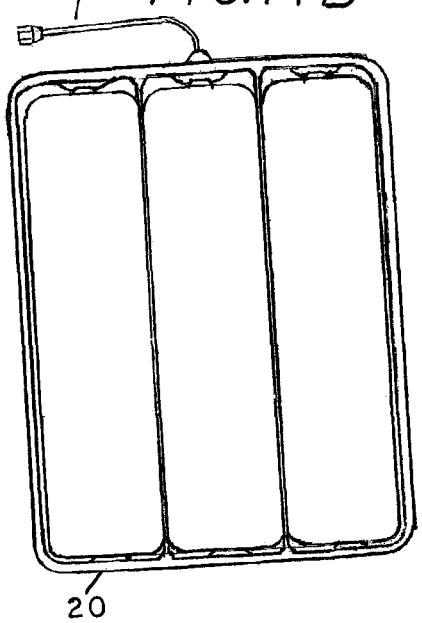

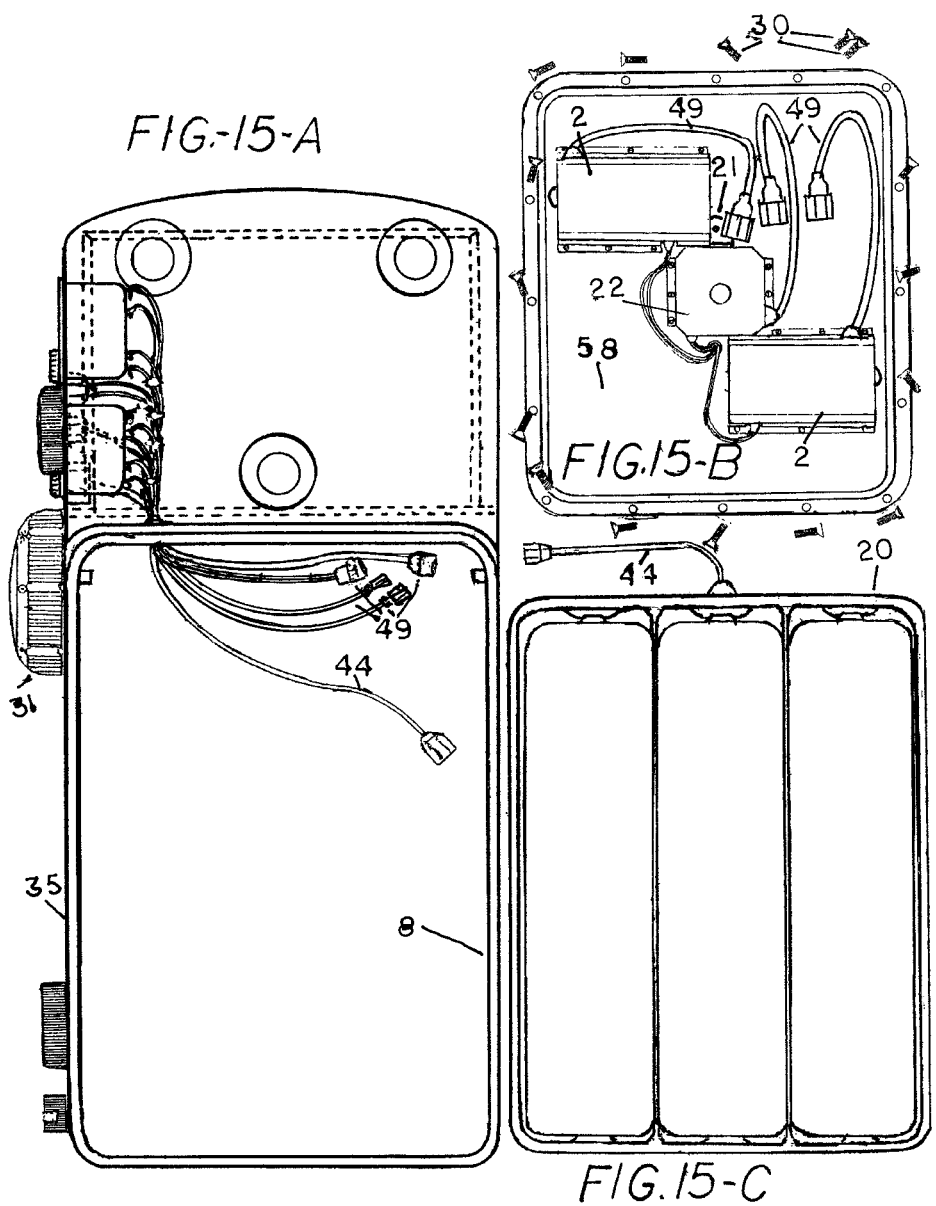

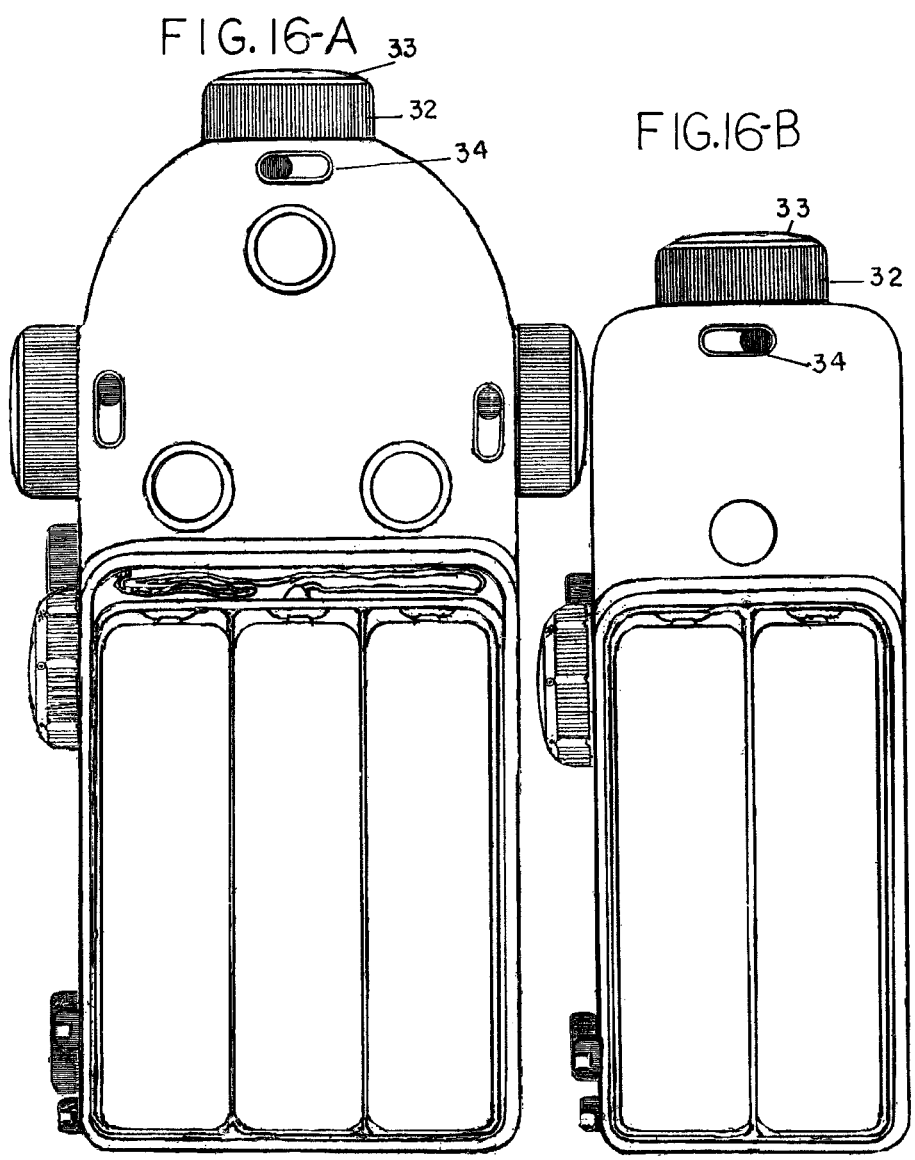

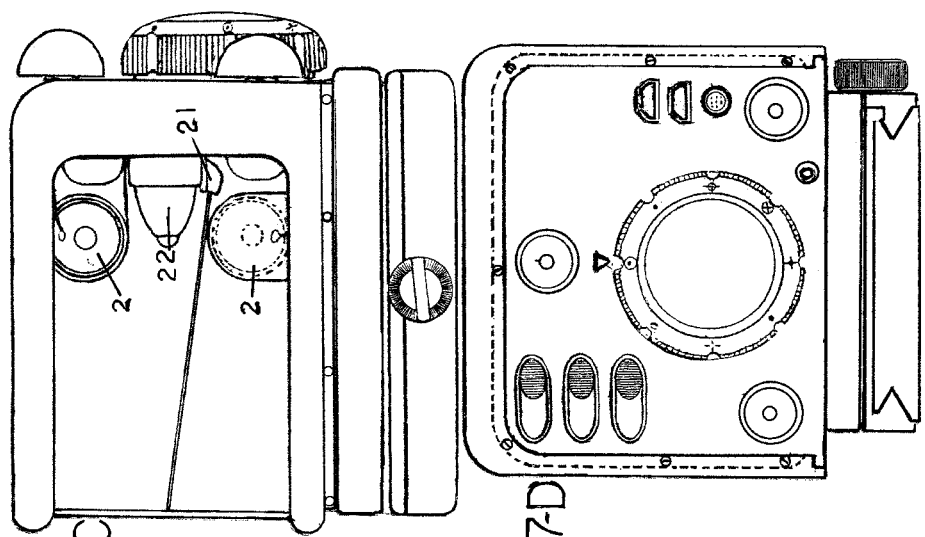
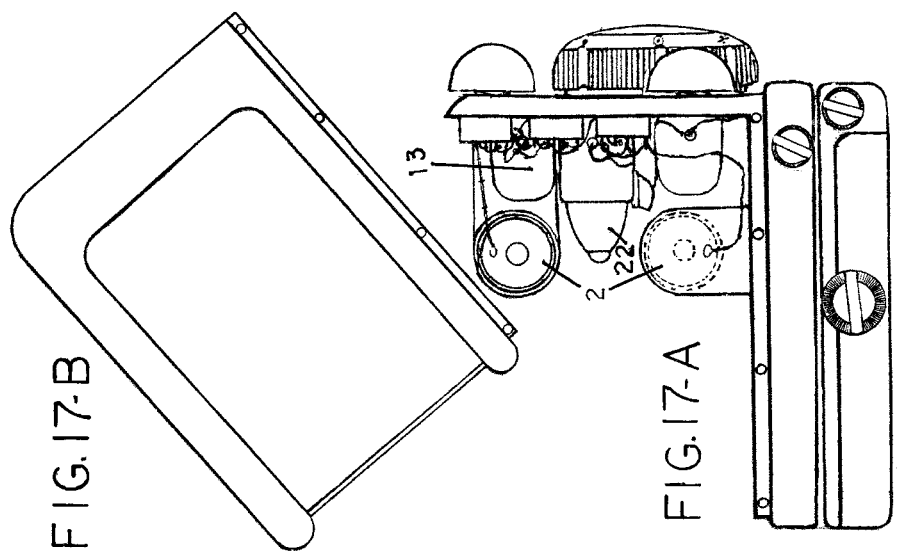

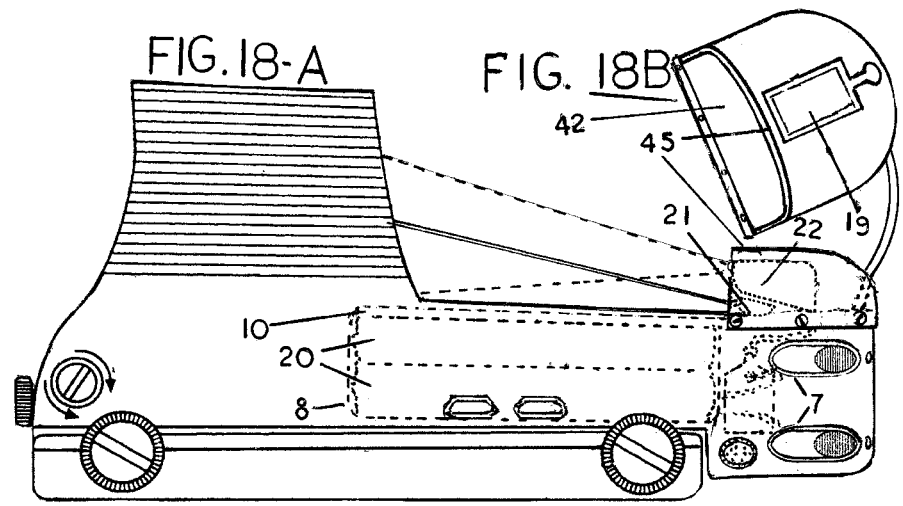

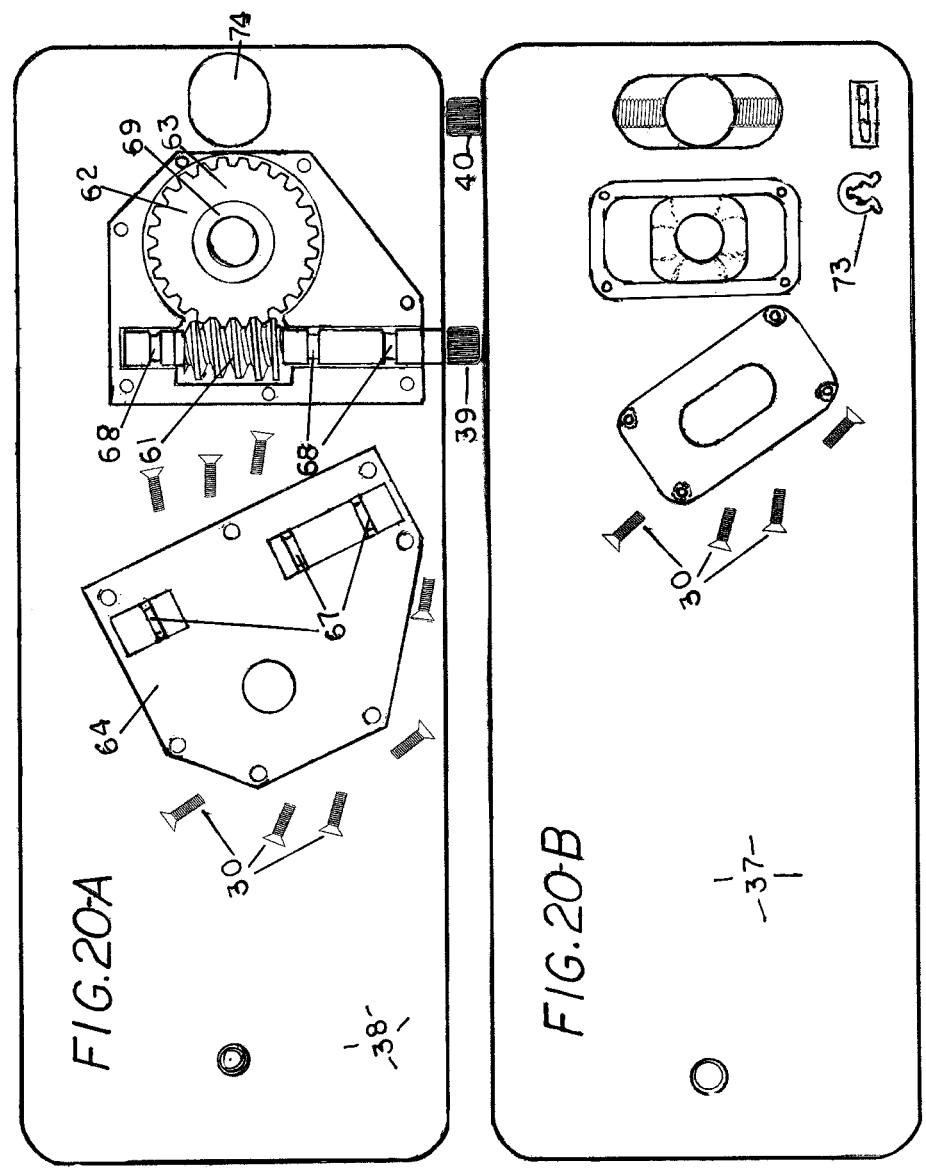

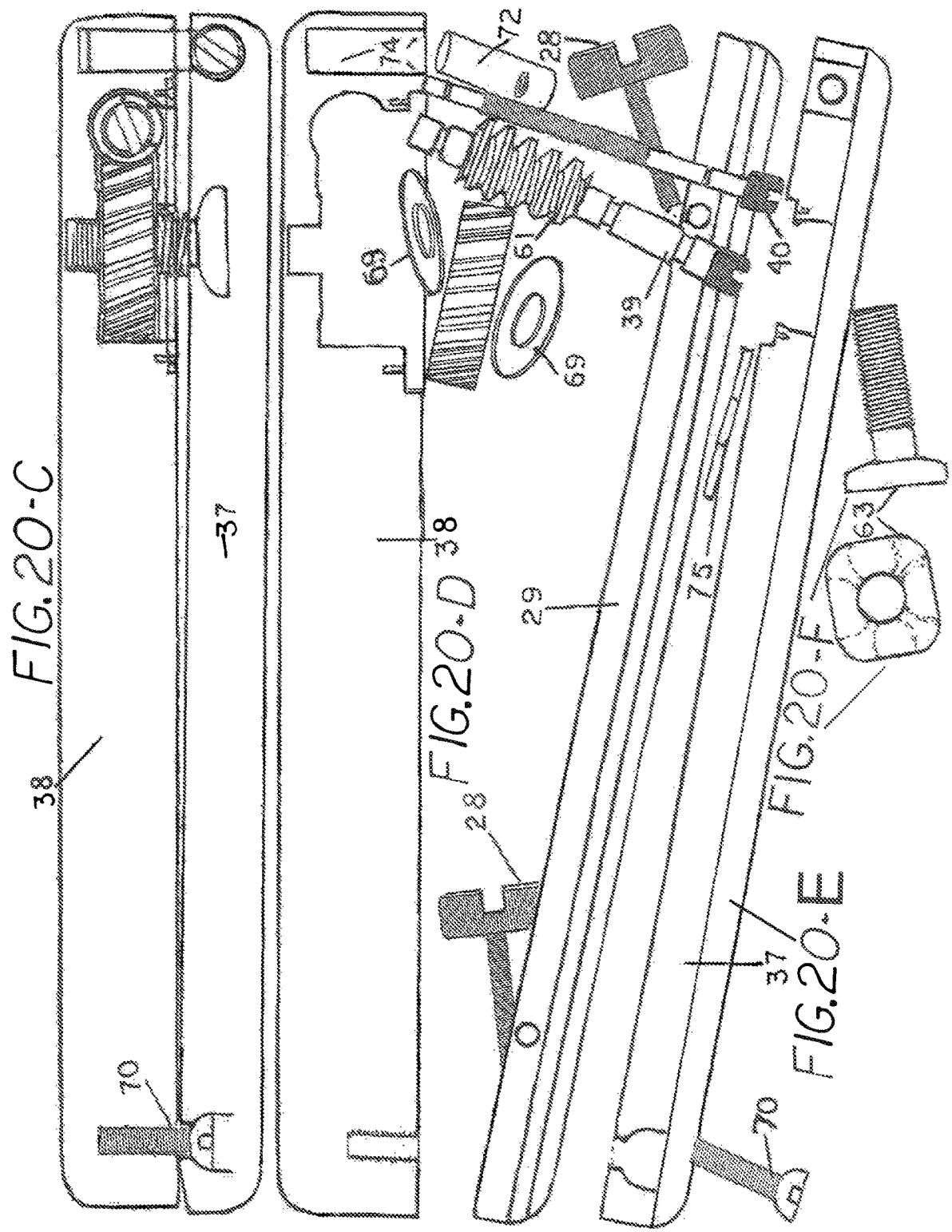

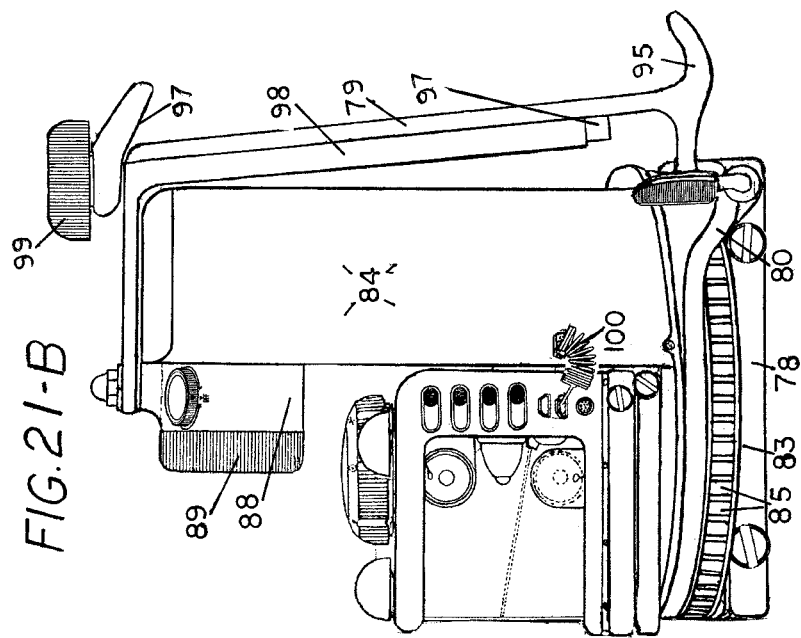
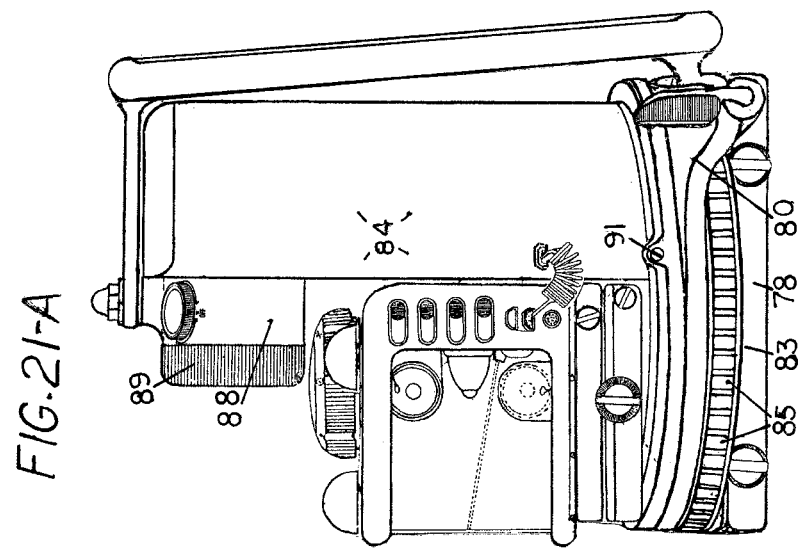

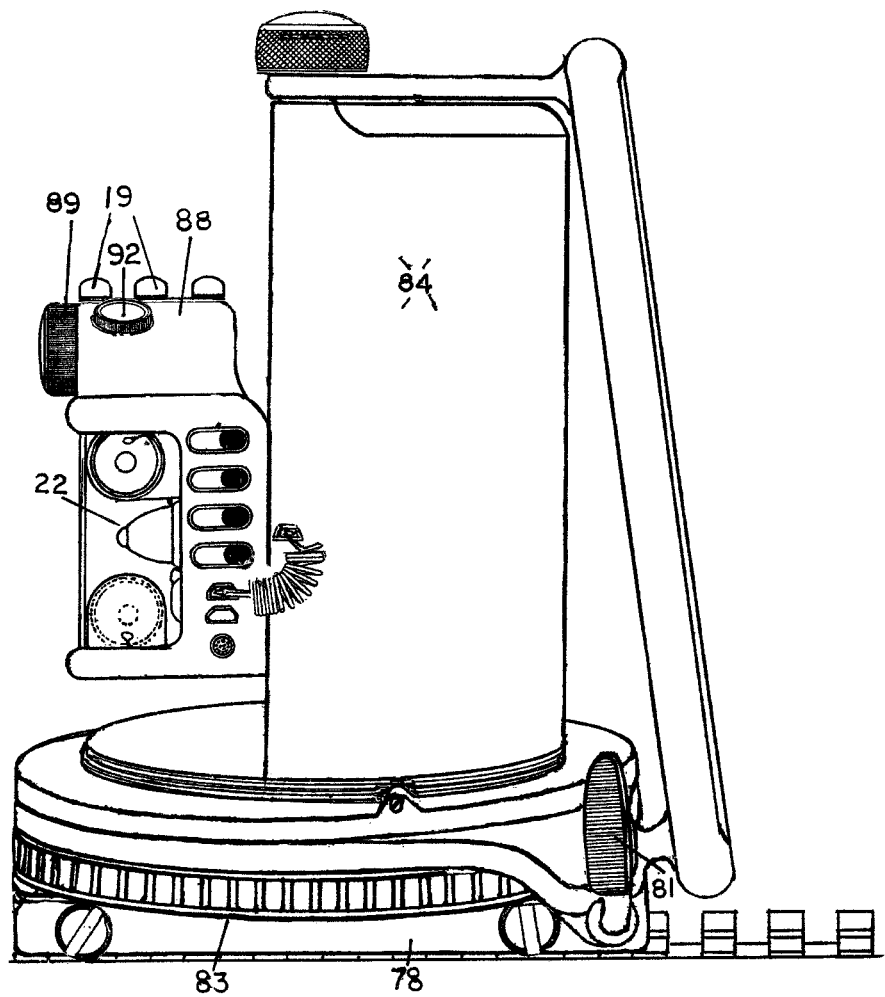
FIG.22-A

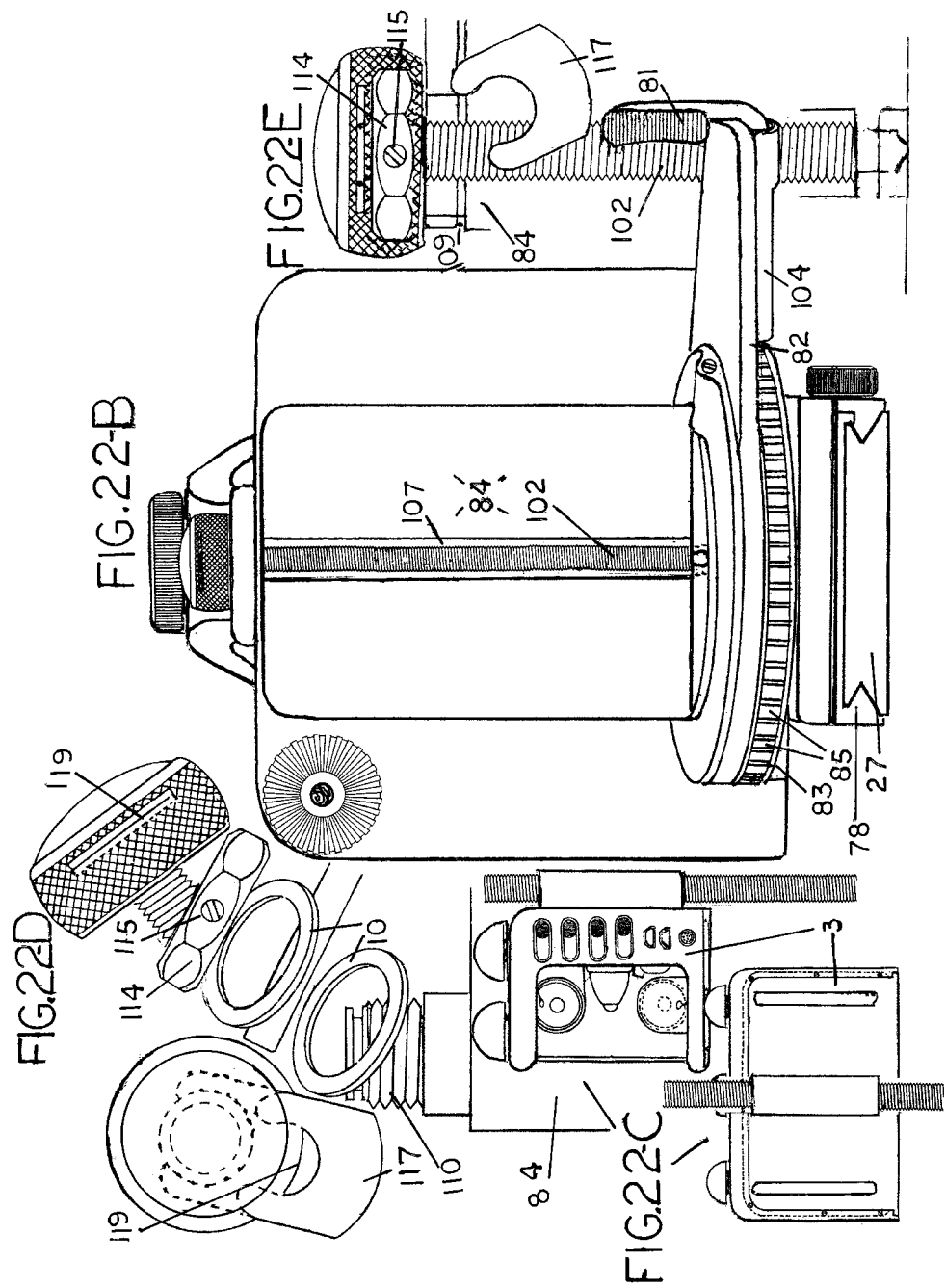

FIREARM SIGHTING DEVICE AND SYSTEM

CROSS REFERENCE TO RELATED APPLICATIONS

This application claims the benefit of U.S. Provisional Application No. 63/224,812 filed Jul. 22, 2021, the disclosure of which is hereby incorporated herein by reference in its entirety. This application is a continuation-in-part of prior U.S. patent application Ser. No. 17/829,291, filed May 31, 2022, which is a continuation of U.S. patent application Ser. No. 17/556,824, filed Dec. 20, 2021, which is a continuation of U.S. patent application Ser. No. 16/820,604, filed Mar. 16, 2020 now U.S. Pat. No. 11,204,219, which is a continuation of U.S. patent application Ser. No. 15/353,706, filed Nov. 16, 2016 no U.S. Pat. No. 10,591,249, which claims priority to U.S. Provisional Patent Application No. 62/398,509, filed Sep. 22, 2016, U.S. Provisional Patent Application No. 62/330,199, filed May 1, 2016, U.S. Provisional Patent Application No. 62/388,110, filed Dec. 12, 2015, U.S. Provisional Patent Application No. 62/388,109, filed Dec. 12, 2015, U.S. Provisional Patent Application No. 62/386,055, filed Nov. 16, 2015 and U.S. Provisional Patent Application No. 62/386,054, filed Nov. 16, 2015, where the entire contents of each are hereby incorporated by reference. This application is a continuation-in-part of U.S. prior U.S. patent application Ser. No. 17/403,769, filed Aug. 16, 2021, which is a continuation of U.S. patent application Ser. No. 16/519,919, filed Jul. 23, 2019 now U.S. Pat. No. 11,092,409, which is a continuation of U.S. patent application Ser. No. 15/884,067 filed on Jan. 30, 2018 and now U.S. Pat. No. 10,359,256, which claims the benefit of U.S. Provisional Patent Application No. 62/467,197, filed on Mar. 5, 2017 and U.S. Provisional Patent Application No. 62/452,986, filed on Jan. 31, 2017, where the entire contents of each are hereby incorporated by reference. This application is a continuation-in-part of prior U.S. patent application Ser. No. 16/404,584, filed May 6, 2019, which claims priority to U.S. Provisional Patent Application No. 62/667,499, filed May 5, 2018, the entire contents of which are hereby incorporated by reference.

FIELD OF INVENTION

The present invention generally relates to the field of firearm accessories, and more specifically to a device and system for to obtain and calculate sighting and targeting information.

BACKGROUND OF INVENTION

Targeting systems in the field rely on user experience and knowledge, careful calculations, spotters, manuals, ballistic table, weather information and mathematical equations in order to allow a firearms user to calculate the necessary adjustments to be made for distance, trajectory and an accurate aim point. The process can be cumbersome and is not well suited to active battle fields where users may be under fire or other stresses that impact these calculations. The disclosed concepts aim to simplify the process and calculate the necessary variables for the user based on user input.

SUMMARY

The following presents a simplified summary of the disclosure in order to provide a basic understanding of some aspects of the various embodiments disclosed herein. This summary is not an extensive overview of every detail of every embodiment. It is intended to neither identify key or critical elements of every embodiment nor delineate the scope of every disclosed embodiment. Its sole purpose is to present some concepts of disclosure in a simplified form as a prelude to the more detailed description that is presented later.

In an embodiment, a targeting device may include a mount capable of being secured to the fire arm and a camera capable of capturing images in a field of view including the sighting device. The camera may be adjustable relative to the sighting device such that it can be aligned with the sighting device.

In an embodiment, a targeting device may include a mount capable of being secured to the fire arm, a first camera capable of capturing images in a first field of view including the sighting device, a second camera disposed at a first angle relative to the first camera such that it is capable of capturing images in a second field of view that is different from the first field of view, and a third camera disposed at a second angle relative to the first camera such that it is capable of capturing images in a third field of view that is different from the first and second fields of view. The first camera may be adjustable relative to the sighting device such that it can be aligned with the sighting device.

In an embodiment, a targeting device may include a mount capable of being secured to the fire arm, a camera capable of capturing images in a field of view including the sighting device, and a transmitter capable of transmitting images captured by the camera to a display device. The camera may be adjustable relative to the sighting device such that it can be aligned with the sighting device, and the camera may include optical zoom capabilities, at least one infrared illuminator and at least one thermo-optic component.

The following description and annexed drawings set forth certain illustrative aspects of the disclosure. These aspects are indicative, however, of but a few of the various ways in which the principles disclosed may be employed. Other advantages and novel features disclosed herein will become apparent from the following description when considered in conjunction with the drawings.

BRIEF DESCRIPTION

FIG. 1-A is a profile view of an embodiment of a combination sight acquiring and surveillance device that includes a height adjustable forward portion thereof equipped to provide the user with target images acquired from any other sights, scopes, or any target viewing device on the firearm and of which this embodiment thereof is additionally devised to provide users with the surveilled images of the areas forward to each side and partly behind the user and to each side of the user as well; same is also to be viewed simultaneously in the screen of a digital display employed by same.

FIG. 1-B illustrates a profile view of an embodiment an alternative type of target acquiring device that includes a height adjustable digital image sensor and image transfer component housing #3 removed from the height adjustment and battery compartment portion of the device in this example of an embodiment thereof.

FIG. 1-C illustrates a profile view of an embodiment of basically the same type of height adjustable digital image sensor and image transfer component housing #3 removed from the height adjustment and battery compartment portion of the device in this example of an embodiment thereof.

FIG. 1-D illustrates a bottom view of an embodiment of a height adjustable digital image sensor and image transfer component housing #3 consisting of a slide portion thereof located on the aft bottom of the housing of a portion of same in this example of an embodiment thereof.

FIG. 1-E illustrates a back view of an embodiment of #5 which in this example of an enclosed forward compartment portion of the battery compartment housing #8. This drawing shows a forward view of this housing in this example of an embodiment thereof.

FIG. 2-A illustrates a profile view of an embodiment of a height adjustable sight acquiring device, in a configuration similar to that of FIGS. 1-B and 2-B that includes only one digital image sensor in this example of an embodiment thereof.

FIG. 2-B illustrates a profile view of the embodiment of the combination surveillance and sight image acquiring device of FIG. 1-A, equipped with three digital image sensors housed in the height adjustable digital image camera and image transfer component housing #3 in this example of an embodiment thereof.

FIG. 2-C illustrates a profile view of height adjustment components enabling the manual adjustment of the housing containing the surveilling and target image acquiring digital image sensors in this example of embodiments thereof.

FIG. 3 illustrates a bottom view of an embodiment of the combination surveillance device and sight image acquiring device, as if turned upside down with the removable cover #27 of a portion of the height adjustable digital image sensor and image transfer component housing #3 is removed in this example of an embodiment thereof.

FIG. 4 illustrates a bottom view of an embodiment of a design of a target image capturing and transferring or transmitting device also turned upside down with cover #27 removed in this example of an embodiment thereof.

FIG. 5-A illustrates a top view of the interior of an embodiment of a target acquiring and surveillance device. This drawing shows the top portion of the height adjustable digital image sensor and image transfer component housing #3 as well as components provided to adjust the height of same in this example of an embodiment thereof.

FIG. 5-B illustrates a top view of an embodiment of a battery pack #20 removed from the battery compartment.

FIG. 5-C illustrates a top view of top cover plate #17 which is the top of the removable plate that is mechanically fastened and sealed on to the upper edges of the outer periphery of the slide housing, that the rod portion of the height adjustment knob #4 extends through and in turn threads through the center of the slide portion, #28 of the height adjustable digital image sensor and image transfer component housing #3 in this example of an embodiment thereof.

Figure 6:
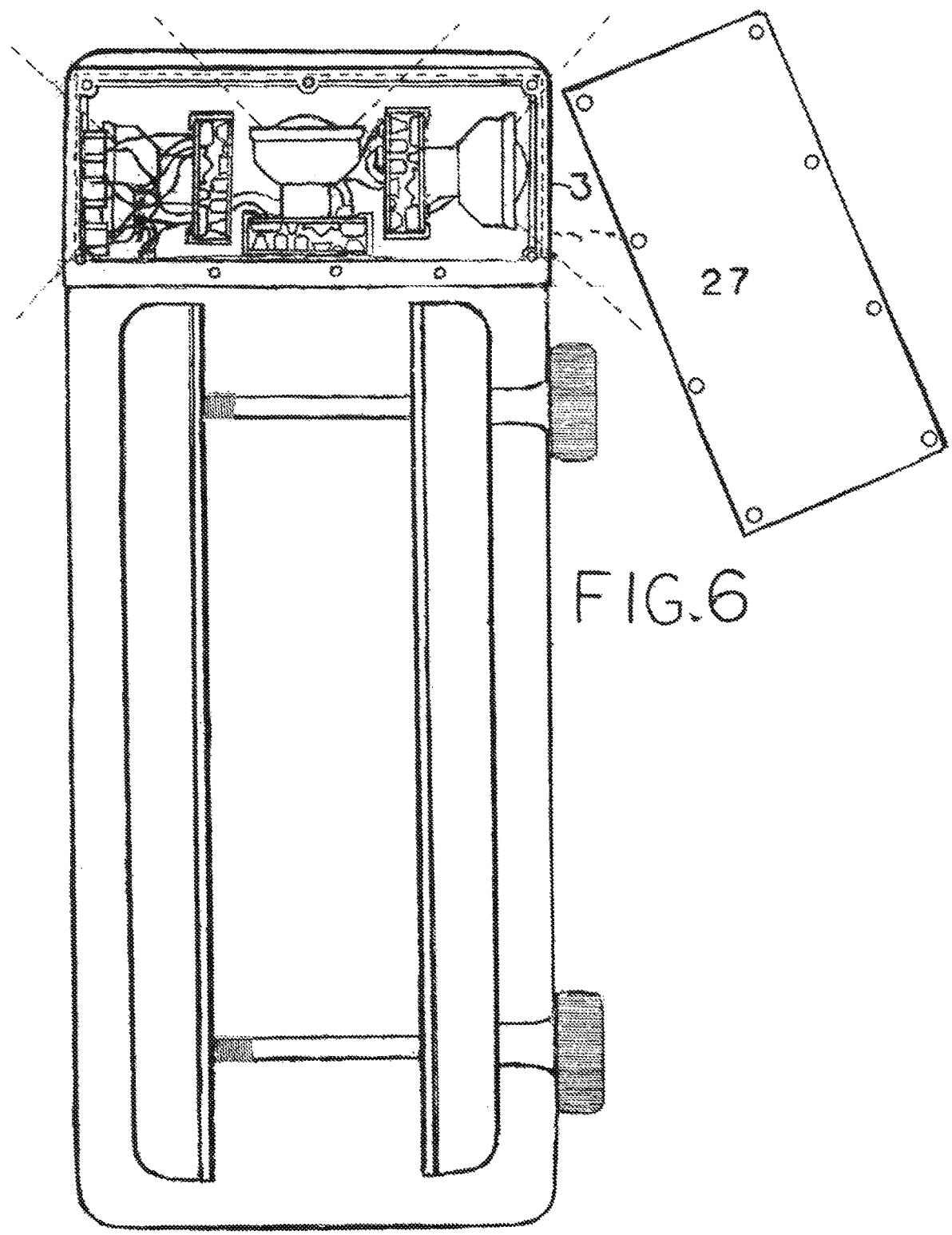

FIG. 6 illustrates a profile view of an embodiment of a device as if turned upside down with the removable cover portion #27 of he height adjustable digital image sensor and image transfer component housing #3 removed, to view the contents therein in this example of an embodiment thereof.

Figure 7:
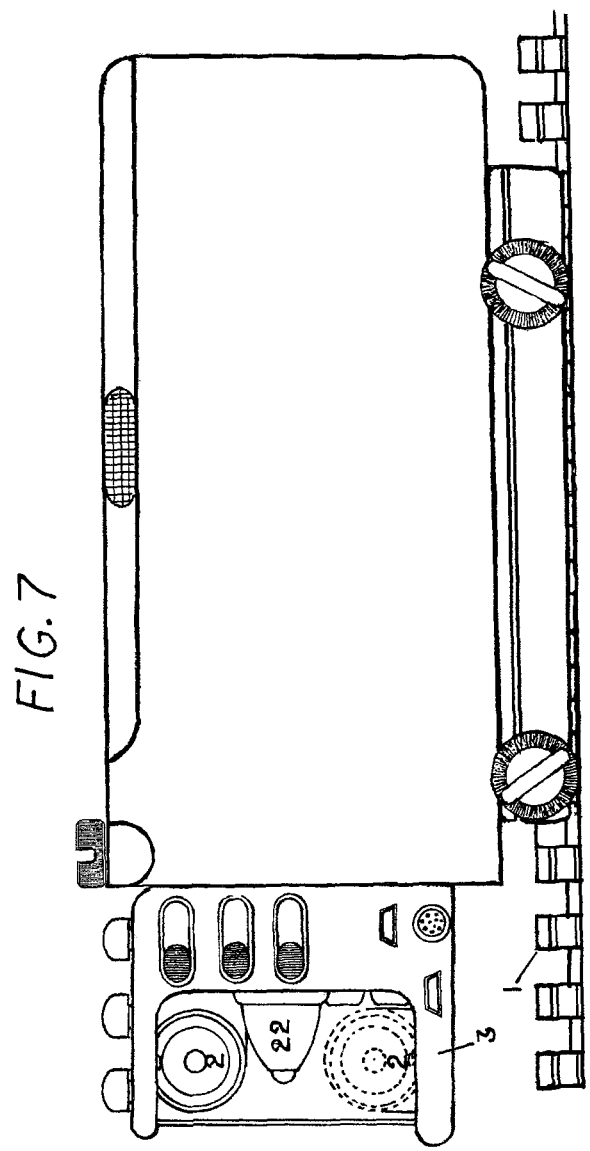

FIG. 7 is a profile view of an embodiment of a target image acquiring devices mounted on a Picatinny accessory mounting rail #1 in this example of an embodiment thereof.

FIG. 8. illustrates a perspective view of a soldier, member of a S.W.A.T. team, or other firearm user, actually employing embodiments of two of these devices with the device mounted behind the high powered scope #51 on the top rail #1, providing its single image to the display, #50 and the other device mounted behind a regular reflex sight, #52 on the bottom rail #1 of the firearm extended just beyond the edge of the corner of the building #54 or other; he is taking cover behind where the digital image sensors mounted behind the viewing window, or windows of the device and can attain a full view of the area in this example of an embodiment thereof.

FIG. 9 illustrates perspective view of the same soldier, member of a S.W.A.T. team, or other, of FIG. 8, with the user employing the equipment while remaining behind protective cover and out of the line of fire, where all sighting and surveilling abilities as well as the ability to engage targets, if under attack and the order is given to do so and whether from a common position as this drawing depicts, or literally from any position he has to position himself in relation to the firearm to do so, to remain out of the line of fire in this example of an embodiment thereof.

FIG. 10 illustrates a profile view of an embodiment of one of the applicant's more recently devised multi digital image sensor surveillance sight with one of many optional positional arrangements of the digital image sensors employed in same in this example of an embodiment thereof.

FIG. 11 illustrates a profile view of an embodiment of a device with a more simple single digital image sensor surveillance sights that actually possesses a great many advantages and employment options in this example of an embodiment thereof.

FIG. 12 illustrates a profile view of an embodiment of a device having a multi digital image sensor surveillance sight which is actually the exact same type of surveillance sight as described and included in the drawing of FIG. 10 with the only difference between the two being the infrared illuminators #33 incorporated into the housing in this embodiment thereof.

FIG. 13-A illustrates a profile view of an embodiment of an assembled rail mountable portion #37 of the digital sensor sight, mounted to a mounting rail #1 of a firearm by means of two screws #28 in this example of an embodiment thereof.

FIG. 13-B illustrates a bottom view of an embodiment of an upper housing portion of this embodiment of a single digital image sensor surveillance sight, that's shown as if same had been manufactured as being mechanically fastenable and thus removed from the lower portion of the housing #38 included in FIG. 13-A for same in this example of an embodiment thereof.

FIG. 13-C illustrates a bottom view of an embodiment of a battery pack that may used with the upper housing portion of FIG. 13-B.

FIG. 13-D illustrates a profile view of an embodiment of a cover for the battery compartment.

FIG. 14-A illustrates a top view of an embodiment of an upper housing portion of a multi digital image sensor surveillance sight, engineered much in the same manner as the partly dissembled version of the single digital image sensor surveillance sight included in FIGS. 13-A-B-C and D in this example of an embodiment thereof.

FIG. 14-B illustrates a top view of an embodiment of a battery pack #20 for this embodiment of a digital image sensor surveillance sight as if same had been removed from the housing portion of the sight for same in this example of an embodiment thereof.

FIG. 15-A illustrates a top view of an embodiment of a multi digital image sensor surveillance sight, in which the lower portion of the digital image sensor sight's housing #38, (not shown in this drawing) and the upper portion of same #35 would simply be manufactured as one piece in this example of an embodiment thereof.

FIG. 15-B illustrates a top view of an embodiment of a removable plate #58, with the combination digital image sensors and digital image transmitting and/or transferring components comprising same included as complete units in this example of an embodiment thereof.

FIG. 15-C illustrates a top view of an embodiment of a removable battery pack #20 as well as the wire and plug for same #44 in this example of an embodiment thereof.

FIGS. 16-A illustrates a top view of an embodiment of the a multi digital image sensor surveillance sight similar to those shown in in FIGS. 15-A, 15-B, and 15-C in this example of an embodiment thereof.

FIGS. 16-B illustrates a top view of an embodiment of the same basic type of multi digital image sensor surveillance sight similar to that shown in FIGS. 15-A, 15-B, and 15-C with the exception of this embodiment thereof being a single digital image sensor surveillance sight in this example of an embodiment thereof.

FIG. 17-A illustrates a profile view of an embodiment of a multi digital image sensor surveillance sight, with the forward housing portion #35 of same shown as being removable in this example of an embodiment thereof.

FIG. 17-B illustrates a rotated profile view of an embodiment of a cover portion and viewing window for the surveillance sigh of FIG. 17-A. with the multi digital image sensor surveillance sight's housing removed in this embodiment thereof.

FIG. 17-C illustrates a illustrates a profile view of the multi digital image sensor surveillance sight of FIG. 17-A and the cover portion of FIG. 17-B.

FIG. 17-D illustrates a back view of the sight and cover of FIGS. 17-A, 17-B. and FIG. 17-C fully assembled.

FIG. 18-A illustrates a profile view of an embodiment of a single digital image sensor sight, that provides the user with both the use of a regular reflex or holographic sight, along with the additional provision of services providable by a single digital image sensor sight in this embodiment thereof.

FIG. 18-B illustrates a top perspective view of the aft cowling portion of the embodiment of FIG. 18-A as if the mechanical fasteners and sealant securing same had been removed to remove the aft cowling portion in this example of an embodiment thereof.

FIG. 19 illustrates a profile view of an embodiment of the of a surveillance sight similar to the sight of FIG. 18 with the aft cowling portion detached and rotated, with the exception of same being either mechanically fastened to, or manufactured as an integral portion of an angularly adjustable rail mount, optionally made as an integral portion of any of the single digital image sensor sights of the applicant, that literally transforms them into profoundly effective and highly efficient tactical digital image sensor sights in this example of an embodiment thereof.

FIG. 20-A. illustrates a bottom view of an embodiment of a bottom surface of the bottom portion of a surveillance sight housing, #38 the opposite side, of which in some embodiments thereof being mechanically fastenable to the lower open outer periphery portion of an upper portion of an embodiment of a surveillance sight's housing #35. This drawing included in FIG. 20-A includes an embodiment of the components that provide the surveillance sight with vertical adjustability, relative to the the lower rail mountable portion of same in this embodiment thereof.

FIG. 20-B illustrates a top view of an embodiment of an upper surface portion of a lower rail mountable portion #37 of a digital image sensor surveillance sight with this drawing thereof including a view of the upper surface portion of same. The lower side thereof would be the portion of same that would include a clamping portion attachable to a mounting rail on a firearm. Housed in inner portions of this lower rail mountable portion #37 of the digital image sensor surveillance sight are the components providing same with lateral or horizontal sighting adjustability.

FIG. 20-C illustrates a profile view of the bottom portion of FIG. 20-A and the upper surface portion of FIG. 20-B assembled.

FIG. 20-D illustrates a profile view of the bottom portion of the surveillance sight housing of FIGS. 20-A and 20-C, including a disassembled of the components thereof.

FIG. 20-E illustrates a rotated profile view of the lower rail mountable portion of FIGS. 20-B and 20-C along with sight adjustment screws and other mechanical portions of same removed from same. FIG. 20-E also includes a separate rotated profile view from the opposite side drawing of the clamping plate portion in which screws #28 extend through same on the other side of this lower mounting portion of the sight adjustable rail mount.

FIG. 20-F illustrates a top and profile view of an embodiment of the threaded post #63 of FIG. 20-B.

FIG. 21-A illustrates a profile view of an embodiment of a combination digital image sensor surveillance sight and multi-positionable dedicated display for same, #93. This embodiment thereof actually includes the display housing or case for same #93 as being a portion of this device that is rotatable relative to the rest of same in this example of an embodiment thereof.

FIG. 21-B illustrates a profile view of an embodiment of a combination surveillance sight and angularly adjustable display mount. This embodiment thereof includes all but a few things common with the embodiment thereof included in FIG. 21-A. Obvious differences in this embodiment thereof, as well as the embodiment of a digital image sensor sight acquiring device and angularly adjustable display mount, of FIG. 22-B being in sames employment of an angularly adjustable digital display mount #79 for the actual mounting of a digital display in this example of an embodiment thereof.

FIG. 22-A illustrates a profile view of an embodiment of a combination surveillance and target acquiring device and angularly adjustable display. This embodiment thereof, as well as the embodiment thereof included in FIG. 22-B. of which acquire accurate target acquisition, from behind other sights or scopes mounted on and sighted in, on a firearms accessory mounting rail by means of the vertical adjustment of the lens portion of the targeting digital image sensor #22 by means of the vertical adjustment of the housing for same to the same height as the targeting reticle or crosshairs, positioned above the firearms accessory mounting rail in this example of an embodiment thereof.

FIG. 22-B illustrates a frontal view of a combination surveillance sight and target acquiring device and angularly adjustable display mount. This embodiment thereof is drawn as if the vertically adjustable image transfer component housing #3, housing the digital image sensors, and other components housed in same had been removed in this example of an embodiment thereof.

FIG. 22-C illustrates profile and back views of an embodiment of the vertically adjustable image transfer component housing #3 removed from the rest of the device. These two viewpoints of same also provide a good view of a raised female threaded portion of the back side of the image transfer component housing #3 with cut off portion of the threaded rod portion threaded through same in this example of an embodiment thereof.

FIG. 22-D illustrates a disassembled blown up perspective view of the components comprising an upper portion of the this embodiment of a combination surveillance and target acquiring device as well as the end connecting portion the upper bracket portion of the angularly adjustable display mount for same, as well as the knob and threaded rod portion of same in this example of an embodiment thereof.

FIG. 22-E illustrates a profile view of an embodiment of an assembly of the components shown in FIG. 22-D. A portion of the knob portion of the combination threaded rod and knob portion of this this embodiment of same is shown as being transparent to view and gain a better understanding of the internal configuration of this embodiment of same.

FIG. 23 illustrates a perspective view of a soldier, member of a S.W.A.T. team, or other #57, that actually has two different types of the digital image sensor surveillance sights included in this application, mounted on the firearm he's employing, and employing same in conjunction with each other of which is not the normal mode of employment for either of these devices. However both were included in this drawing as well as in the drawing provided for FIG. 24. simply in an effort to provide an understanding of some of the basic functions, as well as well as one of the basic tactical modes same were devised to be employed in this example of an embodiment thereof.

Figure 24:
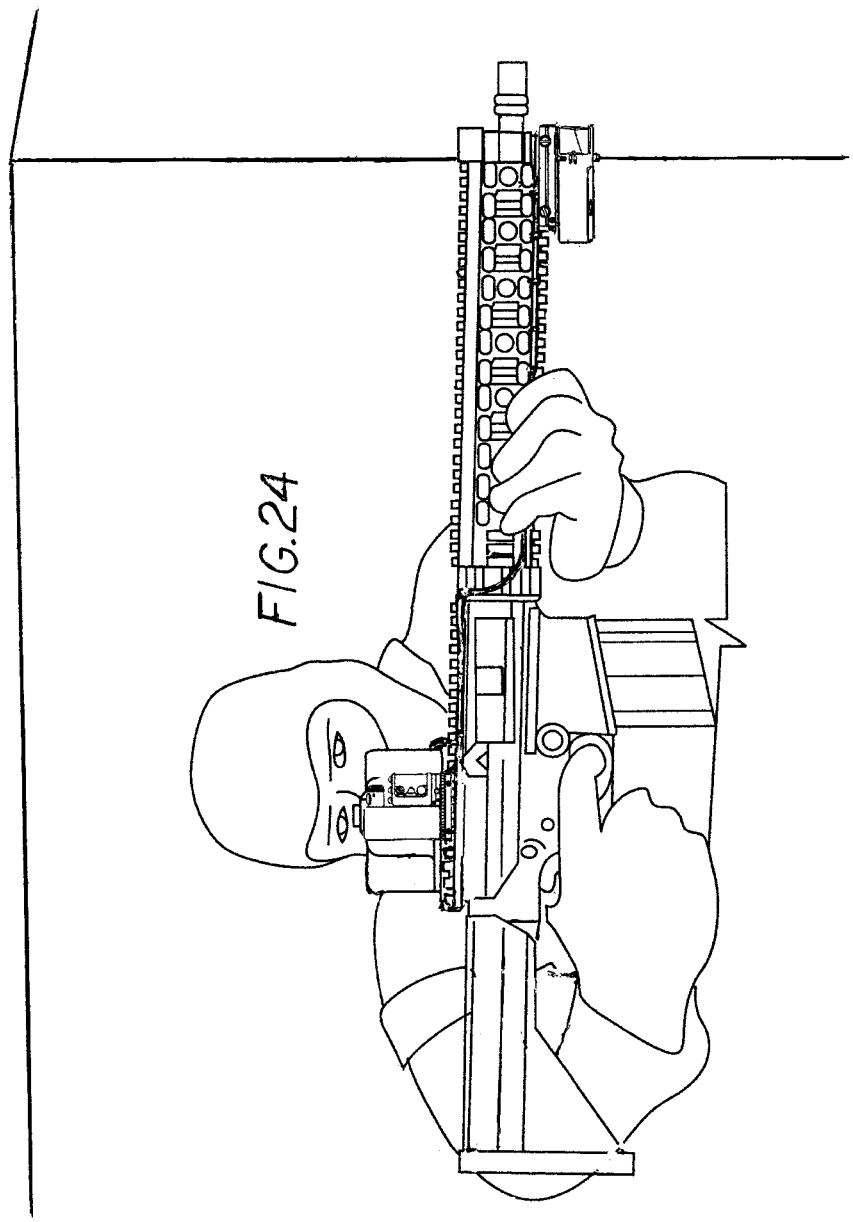

FIG. 24 illustrates a perspective view of the same soldier, member of a S.W.A.T. team, or other, employing all of the same basic equipment embodiments as is included in FIG. 23. This drawing includes the user maintaining a full surveilled visual of the area, while under heavy incoming fire, as depicted in this drawing. While mainlining full control of same from any position relative to the firearm from positions of protective cover, and totally out of the line of incoming fire in this example of an embodiment thereof.

Figure 25:
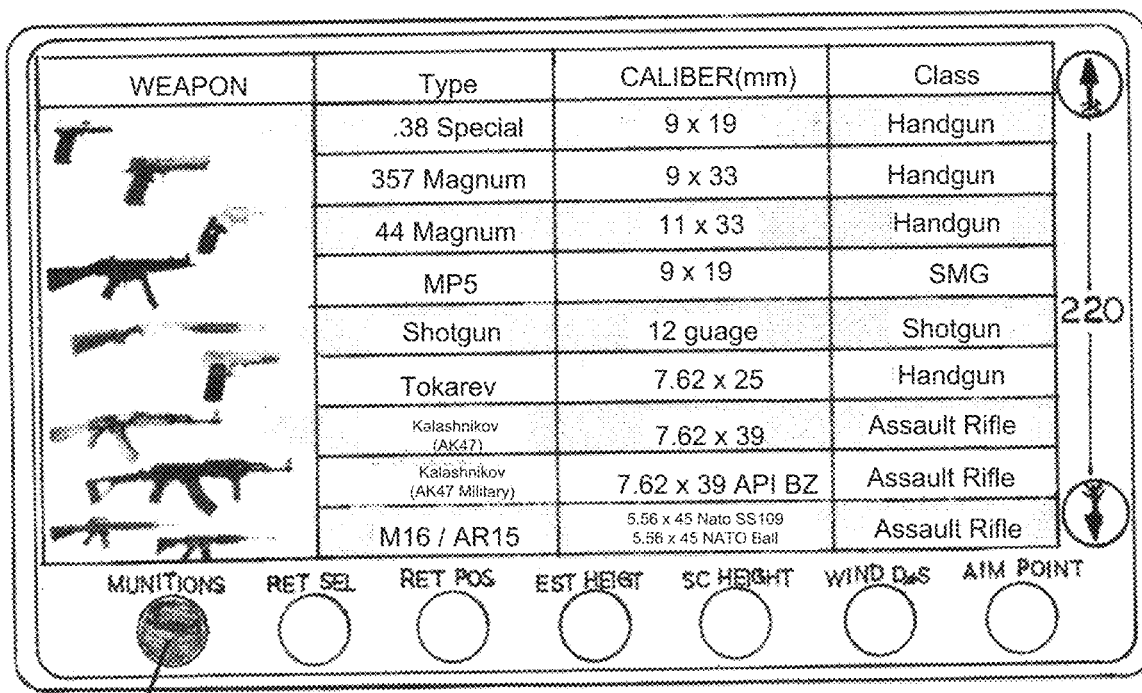

FIG. 25 illustrates a view of an embodiment of a smart digital display of a display device of a combination sighting, range finding and accurate aim-point marking mobile application depicting one of the menus wherein the user may select the weapon with which the mobile application is being used.

Figure 26:
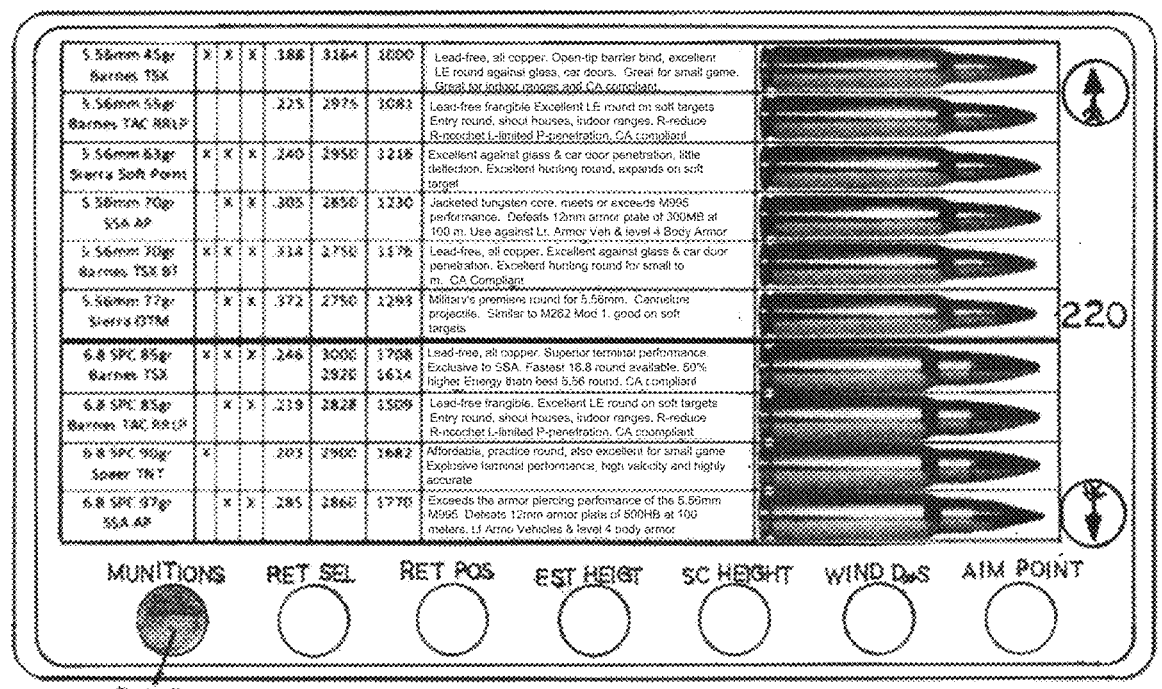

FIG. 26 illustrates a view of a digital display of the mobile application of FIG. 25 depicting a menu wherein a user may select the ammunition being used in the fire arm with which the mobile application is being used.

Figure 27:
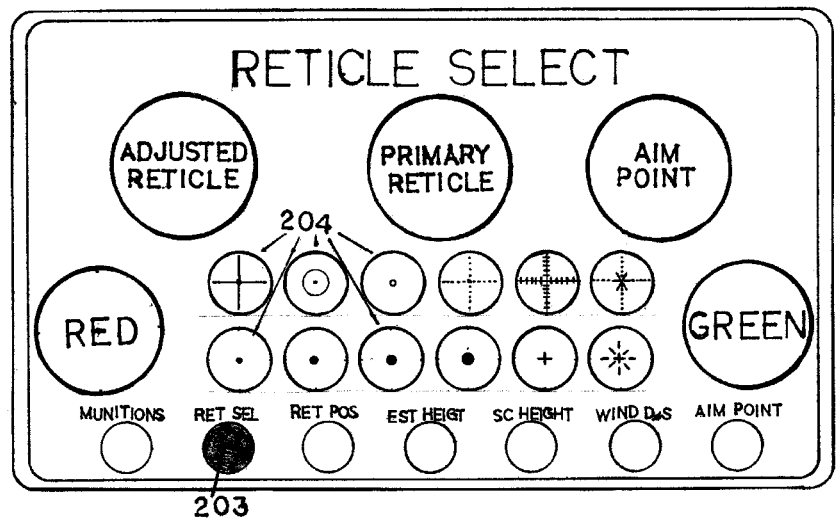

FIG. 27 illustrates a view of a digital display of the mobile application of FIG. 25 depicting a screen allowing a user to select a reticle for use with the mobile application, and allowing for selection of reticle adjustment, and aim point calculation.

Figure 28:
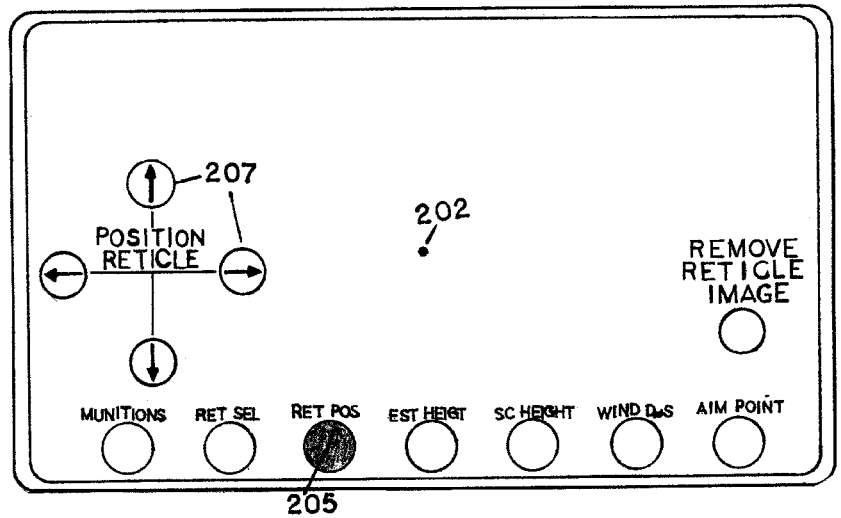

FIG. 28 illustrates a view of a digital display of the mobile application of FIG. 25 depicting reticle positioning controls #206 employable for the positioning of the superimposed target reticle #202.

Figure 29:
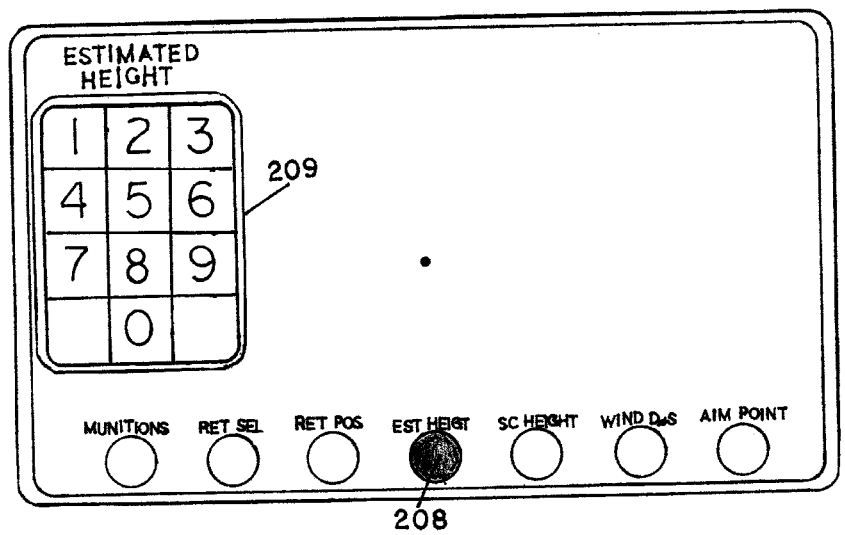

FIG. 29 illustrates a view of a digital display of the mobile application of FIG. 25 depicting an estimated height screen allowing a user to provide an estimate of the target height to the smart display device for same to be employed to accurately calculate the distance to a target.

Figure 30:
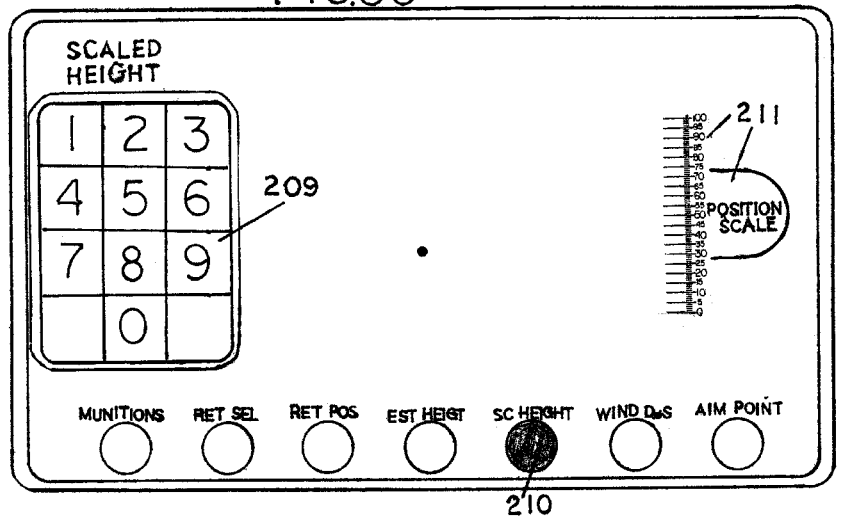

FIG. 30 illustrates a view of a digital display of the mobile application of FIG. 25 depicting a height scaling screen in which a superimposed finely numbered scale #207 is provided, as well as a numbered key pad #209 allowing the user to input scale information to the mobile application.

Figure 31:
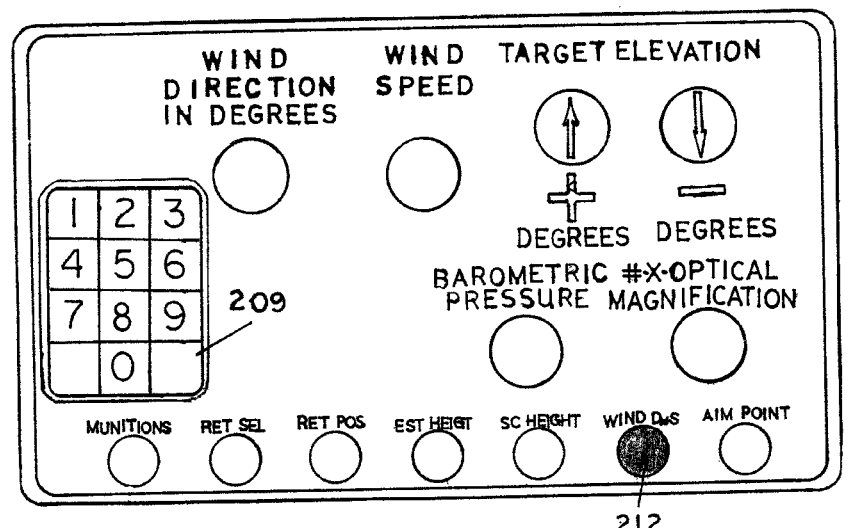

FIG. 31 illustrates a view of a digital display of the mobile application of FIG. 25 depicting a wind, atmosphere, magnification and target elevation information screen providing a numbered key board #209 and control buttons to allow a user to enter wind speed, wind direction, the incline or decline relative to the target, atmospheric pressure, and optical sight magnification information.

Figure 32:
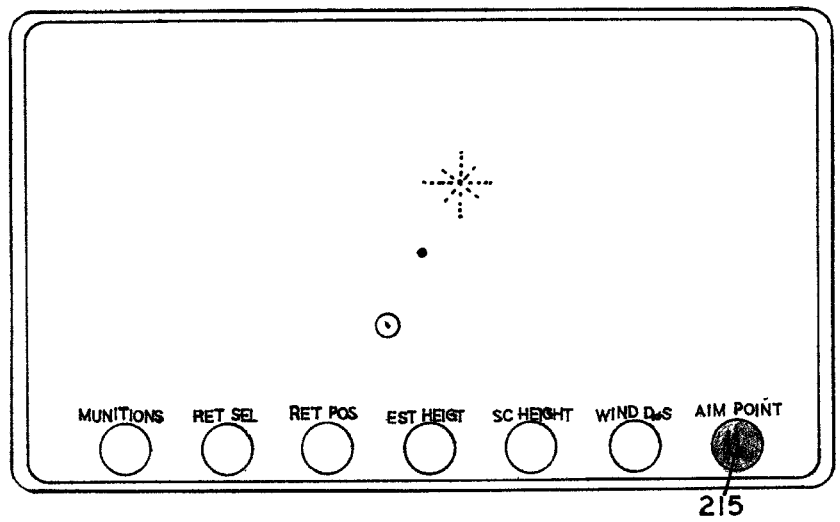

FIG. 32 illustrates a view of a digital display of the mobile application of FIG. 25 depicting an aim point screen allowing the user to activate the process of all trajectory calculations made, as well as showing the primary reticle and either or both of an adjuster reticle or an aim point, here shown as a small mark, concentric circles and anda crosshairs positionally oriented on the screen of the smart display device.

DETAILED DESCRIPTION

The following detailed description and the appended drawings describe and illustrate some embodiments for the purpose of enabling one of ordinary skill in the relevant art to make use the invention. As such, the detailed description and illustration of these embodiments are purely illustrative in nature and are in no way intended to limit the scope of the invention, or its protection, in any manner. It should also be understood that the drawings are not necessarily to scale and in certain instances details may have been omitted, which are not necessary for an understanding of the disclosure, such as details of fabrication and assembly. In the accompanying drawings, like numerals represent like components.

In an embodiment, a targeting device may include a mount capable of being secured to the fire arm and a camera capable of capturing images in a field of view including the sighting device. The camera may be adjustable relative to the sighting device such that it can be aligned with the sighting device.

In certain embodiments, the camera may include at least one infrared illuminator. In certain embodiments, the camera may include at least one thermo-optic component. In certain embodiments, the camera may include optical zoom capabilities. In certain embodiments, the targeting device may further include a transmitter capable of transmitting images captured by the camera to a display device. In certain embodiments, the transmitter may be capable of a wired connection to the display device. In certain embodiments, the transmitter may be capable of a wireless connection to the display device.

In an embodiment, a targeting device may include a mount capable of being secured to the fire arm, a first camera capable of capturing images in a first field of view including the sighting device, a second camera disposed at a first angle relative to the first camera such that it is capable of capturing images in a second field of view that is different from the first field of view, and a third camera disposed at a second angle relative to the first camera such that it is capable of capturing images in a third field of view that is different from the first and second fields of view. The first camera may be adjustable relative to the sighting device such that it can be aligned with the sighting device.

In certain embodiments, the first and second angles may be symmetrically mirrored relative to the first camera. In certain embodiments, the first angle may be 90 degrees and the second angle may be −90 degrees. In certain embodiments, at least one of the first, second and third cameras may include at least one infrared illuminator. In certain embodiments, the at least one infrared illuminators may include a first infrared illuminator for the first camera, a second infrared illuminator for the second camera and a third infrared illuminator for the third camera. In certain embodiments, at least one of the first, second and third cameras may include at least one thermo-optic component. In certain embodiments, the at least one thermo-optic component may include a first thermo-optic component for the first camera, a second thermo-optic component for the second camera and a third thermo-optic component for the third camera. In certain embodiments, the first camera may include optical zoom capabilities. In certain embodiments, the second and third camera may include optical zoom capabilities. In certain embodiments, the targeting device may further include a transmitter capable of transmitting images captured by at least one of the first, second or third cameras to a display device. In certain embodiments, the transmitter may be capable of a wired connection to the display device. In certain embodiments, the transmitter may be capable of a wireless connection to the display device.

In an embodiment, a targeting device may include a mount capable of being secured to the fire arm, a camera capable of capturing images in a field of view including the sighting device, and a transmitter capable of transmitting images captured by the camera to a display device. The camera may be adjustable relative to the sighting device such that it can be aligned with the sighting device, and the camera may include optical zoom capabilities, at least one infrared illuminator and at least one thermo-optic component.

The following detailed description includes various embodiments and types of digital image sensor surveillance sights that are actual target acquiring devices. This, as well as, embodiments of height adjustable digital image sensor surveillance and sight acquiring devices that actually acquire their targeting images from other actual target acquiring devices mounted on a firearm. This application also includes a mobile application devised to provide same with the ability to achieve extreme levels of accuracy at great distances. The present inventions are described in enabling detail in the following examples which may represent more than one embodiment of the present inventions.

FIG. 1-A Is a drawing of a profile view of an embodiment of a new type of a combination sight acquiring and surveillance device that includes a plurality of height adjustable digital image sensors and is devised to provide the user both with target images acquired from any sight, scope, or any other type of target viewing device mounted on the mounting rail of a firearm as well as to simultaneously provide the user with the surveilled images of the areas forward and to each side, as well as and partly behind and to each side of the user and provide same, to be viewed by the user, in the screen of a digital display employed by same, either by direct wire, or fiber-optic image transfer, or optionally by radio transmission.

This sight acquiring and surveillance device possesses certain elements and abilities as is included in previously submitted applications of the applicant. However embodiments thereof included in this application, not only possess a number of additional very needful abilities that embodiments hereof included in earlier applications of the applicant were incapable of performing, the differences between the two are also vast and for the most part are all inclusive, and of which may require the examination or the re-examination thereof. #1 is a mounting rail on the firearm many firearms are manufactured with rails of this nature, as part of the firearm; but most are made and sold by numerous companies as accessories which are extremely common, and manufactured in numerous configurations and mountable in one way or another, to most all types of firearms. These firearm accessory mounting rails, are employed for the purpose, of mounting basically any type of sight, scope, or other type of firearm accessory to a firearm. This drawing shows this device mounted on a standard Picatinny rail which replaced the older style weaver rail, which is the most common types of these mounting rails on or adaptable to firearms. In this example of an embodiment thereof.

Sights scopes and other target viewing devices are also all centered over these accessory mounting rails on the firearms when mounted to same, by means of the rail mount portions of thereof to said mounting rails and of which all variations thereof, mount thereto with their own viewing windows or lenses centered over the mounting rail, at various heights or distances in their relation over same.

This embodiment of this sight acquiring and surveillance device would be primarily employed by means of mounting same with the center digital image sensor portion or same behind sights, scopes or other target viewing devices such as range finders or other same are acquiring their images from, by means of the center digital image sensor #22, which is perfectly centered and aiming forward in the forward height adjustable portion #3 of this device, which is vertically adjustable to acquire and maintain perfect lineal alignment with the reticle or crosshairs centered in the target viewing device same is acquiring its targeting image from. In this example of an embodiment thereof.

This position not only being the vantage point through the sight or scope but its also the only position accurate target acquisition can be acquired from, this also being the position the user is always attempting to position his eye in relation to to acquire a perfectly accurate shot when attempting to do so in the conventional manner. In this example of an embodiment thereof.

So by means of the employment of this device not only does the user acquire a perfectly accurate shot every time, no matter what type of sight or scope he has, but he's also provided with the target image of same with the crosshairs or target reticle for same perfectly centered in the display he's employing, providing him with the ability to perfectly aim the firearm with both extreme ease and speed in that only thing needful for the user to do so, to simply put the dot or crosshairs on the target displayed in the digital display hes employing, and if the display employed consists of computer glasses, or a digital display with same mounted in, or on one of the mufti-positional display mounts of the applicant, the perfect vantage point the image of same is providable to the user at all times, no matter what position he has to position himself in relation to the firearm to remain totally behind protective cover while doing so, and if employing one of the mufti-digital image sensor devises, as included in the embodiment thereof in FIG. 1-A. This device does not just provide the user solely with the target image acquired from other sights or scopes on the firearm, but by means of digital image sensors #2 which make the surveilled images forward, and to each side and partly behind the user acquirable by same simultaneously available to the user, in separate windows of the display at the same time, or optionally with any one of these separate angles of view provided by these digital image sensors full screen and viewed separately in same. In this example of an embodiment thereof.

In turn embodiments of this device not only provide the user with extremely fast accurate and easy target acquisition, but also the ability to very thoroughly surveil the area at the same time and from the same position of protective cover. #8 is an embodiment of at battery compartment for the device, which could actually be much smaller than illustrated depending which type of digital image sensors are actually being employed in them, in that all except some of the much higher tech types of digital image sensors tested in them had a very low power consumption rating and could maintain an extended run time, with very little battery capacity. #10 is the lid for this embodiment of a battery compartment which of course could be made with the access point therefore being located either on the back, or even a side portion of same. In this example of an embodiment thereof.

This drawing as well as many other drawings, both of devices of this nature that acquire their targeting images from other actual target acquiring devices mounted on a firearm as well as others also included in this application, that are actual target acquiring devices themselves, are shown as employing antennas similar in configuration to micro omnidirectional WI-FI or F.P.V. transmitting antennas employed during the development of same. This also holds true to many other components such as radio frequency transmitting modules employed by or integral to the digital image sensors employed by earlier versions and types of same. Of which will soon be fazed out as those previously and presently employing same will include antennas, that are actually much smaller as well as same being available in many forms and configurations conducive to the employment of same, that should prove to be even easier and more effectively incorporated into same, than those employed during the development process of them. The transmitting components to effect multi millimeter wave image transference employed by 5-G technology are already available as well as the digital image sensors employed by same either as separately mountable components, or as a complete unit integrated with the components and housing for the digital image sensor for same that are not only conducive to the employment by all included in this application but same are available in similar configurations and of the same approximate size as those employed during the development process of same. Of course the digital displays employed by same will include component differences as well, simply enabling same with the ability to work in conjunction with 5-G compatible dedicated digital displays or 5-G compatible smart devices. However the employment of same will neither change or effect the operational modes of the employment of same nor the spirit of the invention in any, but rather simply employ component variations, providing the same basic contribution of services to the operational function of all as a whole. Of which holds true to all embodiments of this nature that acquire their targeting images from other actual target acquiring devices mounted on a firearm as well as others, also included in this application, that are actual target acquiring devices themselves. In this and other example of an embodiment thereof.

FIG. 1-B Is a drawing of an embodiment an alternative type of target acquiring device that includes a height adjustable digital image sensor and image transfer component housing #3 removed from the height adjustment and battery compartment portion of the device, #8 Notice the window portion of this digital image camera and image transfer component housing #3 is illustrated as employing only one digital image sensor of simply a different type than those illustrated in FIG. 1-A this digital image sensors viewing window is like that of FIG. 1-A but that still has either one optically correct window that extends across the front of the housing thereof and extends down a portion of the sides thereof, or is alternatively equipped with three flat windows with optically correct mitered and laminated connection points like that of #3 in that FIG. 1-A, thus in providing these digital image sensors employed therein with a field of view limited only by the field of view of the digital image sensor employed by them in this embodiment of a height adjustable target acquiring device.

FIG. 1-C Is an embodiment of basically the same type of height adjustable digital image sensor and image transfer component housing #3 removed from the height adjustment and battery compartment portion of the device, #8 Notice the window portion of this digital image sensor and image transfer component housing #3 is drawn as having only one window, in that sames primary role of embodiment would be that of a device to acquire target images from other sights and scopes and a digital image sensor with a much wider field of view wouldn't really be needed and a single flat window would likely be all that's needed. Notice yet another type of digital image sensor is employed in the inside of the height adjustable digital image camera and image transfer component housing #3 this is a type of digital image sensor that was employed and tested in several different types of the applicants surveillance digital image sensor surveillance sights with the test results included in one of the applicants earlier continuations, was digital image sensor made by Sony that at the time of purchase and testing although quite cost inhibitive and has a slightly higher energy consumption was adaptable to all variations of image transference as well as performed extremely well in a broad range of applications as well as possessed extreme high image quality and modifying abilities but is included in this drawing in that at the time it was purchased the widest field of view available was 90 degrees in this example of an embodiment #3 and the components housed therein same. In this example of an embodiment thereof.

FIG. 1-D is actually a bottom portion of an embodiment of a height adjustable digital image sensor and image transfer component housing #3 consisting of a slide portion thereof located on the aft bottom of the housing of a portion thereof extends outward therefrom and the slide portion being an integral portion thereof that extends upward therefrom and insert's into, and is height adjustable inside of. #37 which this embodiment thereof includes a small tube or little drilled out hole in which the wire providing electrical communication between the switches, charging ports and the battery pack is travels through and is sealed therein maintaining a water tight seal in this embodiment thereof.

FIG. 1-E is a drawing of an embodiment of #5 which in this example of an enclosed forward compartment portion of the battery compartment housing #8. This drawing shows a forward view of this housing, the two cutout portions thereof #38, allow the arm portions of #3 and #28 located on the lower aft portion of #3, and connect to the slide portion thereof #28. These arm portions in this embodiment thereof, extend through these cut out portions of this housing #5 and provide the slide #28 the ability to maintain its integral connection to the height adjustable digital image sensor and image transfer component housing portion thereof #3 to the provision of a full range of travel inside the slide housing #5 and thus also providing the height adjustable digital image sensor and image transfer component housing #3 a full range adjustability in this example embodiment thereof. The function of which will be fully understood in the definition and drawings of FIGS. 2-A, 2-B, and 2-C.

FIG. 2-A is a drawing an embodiment of a height adjustable sight acquiring device, in a configuration similar to that of FIGS. 1-B. and 2-B that includes only one digital image sensor, and employed primarily as an embodiment thereof employed solely for the purpose of acquiring target acquisition from behind target viewing devices also mounted on a mounting rail on a firearm, rather than those included in FIGS. 1-A.-2-B.-3.-5-A. 6. 7. 8. and FIG. 9. as well as a large portion of the actual surveillance sights included in this application.

Of which are drawn as examples of embodiments thereof that include more than one digital image sensor and with these examples thereof actually including three digital image sensors and digital image transfer components, that provide their fields of view either one at a time or simultaneously in the digital display employing same with a combined total field of view of the three providing the user with a broad unobstructed surveilled field of view that extends all of the way around forward, and to close angles to each side behind the user, either simultaneous, or individually in the screen of the digital display employed by same.

This embodiment of the height adjustable digital image sensor and image transfer component housing #3, houses only one digital image sensor #22 and the image transferring module or modules for same in this embodiment thereof. Digital image sensor #22 both in this embodiment thereof, as well as those including three cameras is the center digital image sensor that is hard mounted inside #3 in a position with the lens portion of #22 facing directly forward and of which is the digital image sensor that acquires target acquisition from other sights or scopes or other target viewing devices on the firearm and in turn like all others, when properly setup acquires its targeting images with the targeting reticle or crosshairs for same perfectly centered in the field of view of same. In this example of an embodiment thereof.

The additional two side viewing digital image sensors #2 included in the greatest portion of all examples of embodiments of, both the digital image sensor surveillance and sight acquiring devices as well as the greatest portion of the digital image sensor surveillance sights included in this application, of which embodiments of all would employ at least one targeting, or target acquiring digital image sensor #22, and other embodiments thereof would employ additional digital image sensors #2, that provide additional fields of view, that start forward where the field of view provided by digital image sensor #22 ends and of which would provide additional fields of view that extend around each side and back behind the device, and ending at close angles relative to the sides of the firearm same is employed on. Thus additionally providing the user both with far greater surveilling abilities as well as a far better awareness of the true battlefield demographics and the otherwise hidden dangers residing in a soldiers surroundings. The knowledge of which quite often being of paramount significance to the likelihood of his survival. These things holding true, more than ever in theaters of urban warfare.

The height adjustable digital image sensor, and image transfer component housing #3 in this drawing of an embodiment of a height adjustable target acquiring device, is drawn as if same was adjusted down and into sames lowest possible point of adjustment, in this drawing of an embodiment thereof and of which would be adjustable to a position, slightly lower than that needful to acquire lineal alignment with the target reticles of the lowest profile of the reflex or holographic type sights. The mechanical adjustment thereof affected by means of the clockwise and counterclockwise rotation of the combination knob #4 as well as the threaded rod #9 integrally connected to same. The wire providing electrical communication between the the batteries and all electrical and electronic components inside of the height adjustable digital image sensor and image transfer component housing #3 included in this drawing of an embodiment thereof, extends through a tiny sealed conduit that extends through the lower slide portion of the height adjustable digital image camera and image transfer component housing #3 that comes out through a forward cut out slot portion of a small sealed compartment #11 located between the slide housing #5 and the battery compartment #8 this sealed compartment would possess a sealed access port simply to effect assemblage and the possibility of future maintenance but would otherwise remain sealed. This wire completing the circuit between the power supply and the digital image sensors and other power needs of the device including. This including all night viewing components whether laser or L.E.D. infrared illuminator, thermal optics, or other all night viewing components housed in the small housing for same. #88 is shown as being part of or attached to the upper portion of the housing, #3, for the digital image sensors and other components. The positioning of #88 above the target image acquiring digital image sensor #22 simply ensures that the illuminating services provided by same is not obstructed by the sight or scope, or other, that this device is acquiring target acquisition from. This drawing of an embodiment thereof also shows same as employing a type of omnidirectional five-G antennas #19 housing #88 and if employed in this embodiment thereof. The cables for same would simply extend through a aft portion of the housing of #88 with the connections for same on the upper inside portions of same in this embodiment thereof would be integrally connected to either the back of a plug receptacle or a sealed wire pigtail to effect a totally sealed connection between the power supply and the components housed in the height adjustable digital image sensor and image transfer component housing #3, with the wire completing this connection having enough slack in it to effect full travel of the slide portion of the of height adjustable digital image sensor and image transfer component housing #3 in the the slide housing #5 and by thus doing guaranteeing a water tight seal between both compartments at all times in this embodiment thereof.

FIG. 2-B. Included in this drawing is a profile view of the embodiment of the combination surveillance and sight image acquiring device of FIG. 1-A equipped with with three digital image sensors housed in the height adjustable digital image camera and image transfer component housing #3, all of which illustrated as digital image sensors that provide their fields of view either one at a time or simultaneously with a combined total field of view of the three providing the user with a broad unobstructed surveilled field of view that extends all of the way around forward, and to close angles to each side behind the firearm same is employed, at the same time or full screen individually with the center digital image sensor #22 being the digital image sensor that acquires target acquisition from other sights or scopes on the firearm in the center of its field of view as well as the area around it with the two side viewing digital image sensors #2 providing the field of view starting forward of each side and extending around to close angles to each side and behind the firearm. In this example of an embodiment thereof.

This drawing is showing the height adjustable digital image sensor and image transfer component housing #3 adjusted to its highest adjustable position, which would simply be slightly higher than needful to acquire its targeting image from the highest profile scopes needful to the acquiring their targeting images from. #7 are examples of switches effecting electrical communication by means of the completion of circuits between the power supply and the digital image sensor or individual digital image sensors as well the switching between radio transmission and direct wire or fiber optic communication and/or media converters in military applications. In this example of an embodiment thereof.

All embodiments of digital image surveillance sights and digital image surveillance and target acquiring devices included is application are shown as employing two, micro B, micro USB or micro USB type C ports. #12, which may not hold true in all embodiments thereof. However the first of these ports were included as one that would possess direct electrical communication with the batteries, housed in battery compartment #8, both for charging purposes and/or power provision for components needful of same in some embodiments included in this application. The other micro B, micro USB or micro USB type C port. #12 was included as a port possessing direct communication with the image transferring components employable by at least the targeting digital image sensor employed by same, and thus providing same with the option of direct wire communication.

However, fiber optic cable connection port #14 would likely only be included on digital surveillance sight and digital surveillance sight acquiring devices included in this application, that are employed by our armed forces. This due to mill-spec requirements restricting any components that emit an electromagnetic signature. This also holds true to many the components employed in and by same, also having to meet the strict guidelines established by mil-spec requirements of components employable in and by same, by our ground troops and as a result thereof, the applicant has been informed same will likely employ tiny fiber-optic cables for all image transference between these devices included in this application and the display devices employed by same, due to security reasons and same not emitting an electromagnetic signal of any sort. However the basic services and needful functions provided by these mil-spec components and their contributions to the over all function and employment of the digital image surveillance sights and the digital image surveillance sights, as well as the spirit of these inventions would remain unchanged as a result of the employment of mil-spec components, in, or in conjunction with any of the inventions and examples of embodiments thereof included in this application.

Now referring to FIG. 2-C. #4 is an embodiment of a height adjustment knob. #9 is the threaded rod portion of #4 of which initially extends through a hole in the center of a removable plate portion #17, of the top of the housing #5. of which is a forward portion, of the non height adjustable portion of the device. This threaded rod portion of the height adjustable knob is rotatably coupled to the plate by means of a C-clip #15. This C-clip is shown as being recessed into a bottom portion of the top cover plate #17. A small round countersunk upper portion of the top plate, #17, in this embodiment thereof contains small tapered spring #23, that actually compresses to one coil thickness in that the coils get progress-ably smaller and compress inside each other. This could also easily be replaced with a small disk spring on top of which in the partly cut out open center thereof rest a small stainless steel ball that of which the disk spring #23 maintains comprehensive pressure on between the ball #24 and the bottom of the knob. This embodiment of a height adjustment knob #4 includes a series of indents #25 or ridges around the outer bottom portion thereof, of which the stainless steel ball pops in and out of to maintains the knobs position of rotation once adjusted. The threaded rod portion thereof once the plate is mechanically fastened and sealed is centered inside the slide housing #5, and with the threaded rod #4 threaded into and through the lower slide portion of the height adjustable digital image sensor and image transfer component housing #3 with the outside shape of the lower slide portion of #3 thereof being of the same shape and configuration as the inside shape and configuration of a slide housing #5 and in close tolerances but slightly smaller diameter thereof as to allow same to slide freely but securely therein so that by means of the clockwise and counterclockwise rotation of the knob portion of #4 the height adjustable digital image sensor and image transfer component housing #3 is height adjustable to acquire the perfect lineal alignment of the target acquiring digital image sensor #22' lens housed therein, with the target reticle or crosshairs of the target viewing device same is working in conjunction within this example of an embodiment thereof.

FIG. 3 Is a view of an optional embodiment of the combination surveillance device and sight image acquiring device, as if turned upside down with the removable cover #27 of a portion of he height adjustable digital image sensor and image transfer component housing #3 is removed. This device is equipped for full surveillance purposes as well as target acquisition employing three digital image sensors and is the same device and operates in the same manner as described and illustrated in drawings 1-A and 2-B. These digital image sensors as well as the drawings of the different variations of them in some of the following as well as all previous drawings, as well as the different configurations thereof illustrated, are simply representation of the many types employed and tested during the development of all surveillance sights and devices of this nature devised by the applicant, both in this application as well as others previously submitted by the applicant. The different types illustrated for the most part are not actually different types of digital image sensors, but are more illustrated as digital image sensors that employ electronics of varying complexity and abilities as well as those that transfer and/or transmit their digital video images they capture at different radio frequencies and/or by different means in that all are employable, or employed, with only slight variations of actual digital image sensors. All employed and tested in prototypes during the development process of same were equipped with image transference components capable of providing an optional modes of direct wire communication as well. Of course, components needful both to their incorporation of 5-G technology for the employment of same by law enforcement homeland and homestead security national defence secret service and others. As well as things needful to their employment by our armed forces, such as the employment of either multi-band transmission or fiber-optics, image transference will be will be supplemented or solely employed in the future production of embodiments of same.

5-G. radio transmission actually employs several types of very high radio frequencies, at much shorter radio wavelengths as well as slight differences in components to the effect of 5-G technology, and the image transmission of same. Mill-spec requirements for those employed by our troops will also likely require the employment of tiny fiber-optic cables for all video communication, instead of direct wire video communication, or radio transmission to be mil-spec complaint, however all are actually employable, or employed, with the same basic variations of actual digital image sensors, although the applicant has been informed that those employed by our armed forces would be additionally equipped with much higher tech night viewing components as well. In this example and other embodiments thereof.

However all capture their surveilled and targeting images in the devices their employed in, in the same manner and provide the target and surveilled images they capture to the user in the same basic modes. They all simply employ slight variations in the components they employ primarily for the purposes of the transmission of the different radio frequencies and/or modes employed by same for the video transmission or video transference of the video images captured by same but all work in the same basic manner and share the the exact same operational modes of the employment of all, and of which also holds true for all variations of embodiments of same.

Of course all providable to law enforcement and will be equipped with 5-G digital image sensors and transmission components as they become more available, both to take advantage of the quality, range and level of services providable by the advanced technology they possess, especially in that of point to point or device to device communication providable by fifth generation technology along with the ultra high wave bands it employs eliminating latency issues altogether, and even though neither is reliant on the internet in any way to do so. The employment of 5-G technology of-course also being a necessity due to 4-G technology the applicant has been told will be completely phased out within the next couple of years, although the applicant been informed by those that actually develop video communication systems for our armed forces, that these things make very little difference to the mode of video communication presently requisite to the employment of video communication by same to our troops, in that all forms of video communication employed by 5-G still possess possible vulnerabilities and security risks, and although less still emit a small electromagnetic signature, which is why even direct wire communication, which has always been an alternative mode of video communication of all surveillance sighting and sight acquiring devices of the applicant was unemployable due to the small but yet possibly detectable electromagnetic signature they emit. This also being the reasoning behind the military's insistence that all surveillance sighting devices of the applicant employed by our armed forces will likely be equipped with fiber-optics image transference modules as their mode of video communication. employed in this and other embodiments thereof.

This drawing of the embodiment included in FIG. #3 shows both the rail mounting portion thereof #29, of which all rail mountable firearm accessories possess and of which there are many optional types employable with the type illustrated being a type that may, or may not be employed. These rail mounts simply compress-ably secure the accessory to the mounting rails on a firearm. This device as well as most drawings in this application showing the rail mount #29. The rail mount portion of this device provides only one function,t his being simply to effect the mechanical attachment of the device to a Picatinny or other type of mounting rail on the firearm, and is not sight adjustable in any way, like many types of the applicant's actual surveillance sights. This drawing, like many others in this application show this clamping plate #29 portion of the rail mount as employing thumbscrews #28, integral to screws or threaded rods to effect the devices mechanical securement to a mounting rail. #27 is a removable and mechanically fasten-able cover to effect both the easy assemblage as well as to effect easy maintenance of any and all components housed inside the height adjustable digital image sensor and image transfer component housing #3. This removable cover is sealed either by means of a silicone sealant after initial assemblage and resealed in the same manner if ever removed, or optionally equipped and sealed by means of a neoprene o-ring insertable into a cove shaped bottom lip portion, of the height adjustable digital image sensor and image transfer compartment housing #3 with the cove portion thereof located just inside the screw holes and extending around, and just inside the periphery thereof. The seal between plate #27 and the height adjustable digital image sensor and image transfer compartment housing #3 being effected simply by means of the mechanical fastening of cover #27 thereto with machine screws #30 in this embodiment thereof.

This drawing shows this embodiment of #3 showing the digital image sensors and digital image image transferring modules or components #6 housed inside of the height adjustable digital image sensor and image transfer compartment housing #3. These digital image sensors are drawn as those similar in configuration to one of the standard spy type digital image sensors employed and tested in some of the applicant's very first rough but functional surveillance sight prototypes.

This drawing shows the lenses of both the targeting digital image sensor #22 and the other two surveillance digital image sensors #2 all mounted inside the housing of #3 with the view points of all acquired through the one optically correct curved window, which could easily be configured and equipped with three seamlessly joined flat windows as well while maintaining the ability maximize the fields of view of same as well as the ability to seamlessly tie the fields of view of same together, of which according to calculations provides the absolute best images to all.

All digital image sensors illustrated as employed and employable. In this as embodiment of the applicants surveillance sights are of the same basic configurations of those employed during their development process but basically any portable D.C. powered video digital image sensor that meets the physical size requirements are employable in any of them, and of course are equipped with components to provide their captured surveilled and targeting images to the digital displays in which they are viewed, either by means or radio transmission or optionally by means of direct wire communication of which all employ, or are employable with. This of course with the exception of those employed by our armed forces, not employable by these standard modes of video communication due to security and other vulnerabilities inherent to embodiments thereof.

The specific physical differences in the mill-spec complaint components are not illustrated as such in any of the drawings in that other than shielding and other modifications essential to their employment and their ability to provide their images by means of a tiny fiber optic cable and other component differences essential to image provision or modification desired or essential to their employment by our armed forces. Although none of which would change their basic mode of function or operational mode of employment in any way, nor would they change the spirit of the original inventions in any way. in any and all embodiments thereof included in this application.

FIG. 4 Is a drawing of another view of an embodiment of an optional design of the a target image capturing and transferring or transmitting device as if turned upside down with the removable cover #27 portion of he height adjustable digital image sensor and image transfer component housing #3 removed showing this device equipped with only one digital image sensor and employed solely for the purpose of acquiring and maintaining perfect lineal alignment with the crosshairs and target reticles of sights and scopes mounted on the firearm and acquiring accurate target acquisition and transferring or transmitting same to a digital display for the viewing of the digital images captured captured by same and although similar flat window prototypes of this basic type as well as the applicant's regular surveillance sights constructed by the applicant employed digital image sensors that possessed and maintained a very clear 140 degree field of view and greater and mainly employed same from a several inches behind the target viewing device where a wide view of the area could be maintained, while additionally maintaining a perfect vantage point through the target viewing device and quick, easy and accurate target acquisition at the same time. In this example of an embodiment thereof.

However digital image sensors equipped in embodiments of many target acquiring devises of the applicant, may possess a much narrower field of view in those commonly employed in a very close proximity behind targeting device's, same are employed in conjunction with and capturing images from. The actual digital image sensor #22 illustrated in this this embodiment of the device is drawn as close to the basic configuration of some of the lower end digital image sensors referred to as an F.P.V. cameras, of which the digital image sensors themselves are of the same basic type as many others employed during the development and testing of others. These digital image sensors referred to as F.P.V. cameras are very popular and commonly employed in many remotely controlled drones and other applications simply in that most of them are equipped to operate at radio frequencies and types that experience reduced latency, although they utilize different frequencies as well as either analog or digital video communication. All digital image sensors employed by all surveillance sights of the applicant are either equipped or equip-able to operate in a full range of operation any where in the world, in at least two modes of point to point, or what is also referred to as, device to device communication, which neither require a service or internet connection of any kind. However this particular type of camera unless equipped with a signal converter, presently has to be converted to Wi-Fi in most applications, to be routed through a service or the internet where they also operate in full real time with the additional abilities providable by the internet. This can also be easily accomplished with them simply by means of a frequency converter that are available in sizes of approximately two inches long an inch wide and a quarter of an inch thick, and only cost about 10 dollars as well as some recently found much smaller but not nearly as cost effective, if not Incorporated therein by the manufacturers of them which provides them the ability to operate in the same manner as comparable W.I.F.I. digital image sensors operating in that mode, with both operating in real time if employing a smart device and using same as a hot spot and thereby also having full internet access and providable with all other services and additional abilities providable by the internet in this embodiment thereof. However the employment of 5-G. compatible video transmitting modules, along with 5-G smart devices or 5-G compatible dedicated digital displays, in those employable outside of any military employment will not only all but eliminate latency, when employing same in direct device to device communication, as well as provide same with a broad range of additional needful services and abilities as well. In this and other examples of embodiments thereof included in this application.

However all radio frequencies and electronics employed to effect video communication employed during the process of almost in the greatest percentage of all surveillance sights entire development, for the most part will be rendered as obsolete, as same will simply be employed with 5-G compatible cameras and transmission modules. Of course the employment of all variations or adaptations of all others, equipped for the employment of same by our armed forces will have to be equipped with components that meet or exceed mil-spec requirements requisite to the image communication for the remote viewing of the digital images captured by same. In this example of an embodiment thereof.

FIG. 5-A includes a drawing of an overhead view of an embodiment of a target acquiring and surveillance device device. This drawing shows the top portion of the slide #28 which is actually a portion of the height adjustable digital image sensor and image transfer component housing #3. This drawing also shows the very top of the slide housing #5 with the height adjustment knob #4, and removable plate #11, to reveal the inner portion of this embodiment of a slide housing #5, housing, as well as the upper surface portion of slide #28 which is actually the aft lower portion of the height adjustable digital image sensor and image transfer component housing #3 which is height adjustable by means of the raising and lowering the slide #28 portion of #3, inside the slide housing #5 by means of the clockwise and counter clockwise rotation of the height adjustment knob #4 portion of the height adjustable threaded rod #9 view-able in FIG. 2-C to acquire the perfect lineal alignment of the target acquiring digital image sensors lens housed therein, with the target reticle or crosshairs of the sight or scope this embodiment of same would acquire its targeting images from. In this example of an embodiment thereof.

This drawing also shows an embodiment of a battery compartment with the lid thereof removed and not shown. This drawing also shows the top of the small compartment #11 that houses a small section wire #44 with enough slack therein to allow a full range of travel to the slide portion of the digital image sensor or digital image sensors and components housing #3 in this embodiment of the device.

This tiny compartment #11 would normally be sealed but is illustrated with the cover plate thereof removed. This embodiment of this compartment houses a section of wire #44 providing electrical communication between the battery pack #20, and the charging port for same as well as power to all switches providing selective power distribution to the individual digital image sensors as well as in the selection of image transfer modes and other components needful of same. In this example of an embodiment thereof.

FIG. 5-B Is an embodiment of a battery pack #20 removed from the battery compartment which is simply done in this manner in this embodiment thereof for several reasons, the first of which being simply so that all batteries whether by means of an access door on top as illustrated or from a door or cap on the back of the device, the entire battery pack #20 could be very quickly and easily removed and replaced, with the batteries being all together as one unit, with a wire pigtail #34 and connector as well as the device itself possessing an external charging port, either the separated battery pack, or the device it self could simply plugged into a separate charger back at the base, bivouac or other. Another viable alternative design, or variation of both this type of combination surveillance and sight acquiring devices as well as all of the variations of the applicant's surveillance sights would be to remove the battery compartment all together, and manufacture an alternative design of them without a battery compartment at all. The advantages being that of reduced weight, and that of portability as well as to broaden its range of versatility and applicability. These models of them would likely or primarily be manufactured for military applications, where same could have access to another power source such as a battery pack #20 carried by or mounted on the soldier or firearm powering other equipment employed by him, or employed solely for the powering of the surveillance and sighting device. These variations of them would also far better lend themselves to applications such as weaponized drones as well as all other applications where space or even a few ounces of weight is a factor. In this and other examples of embodiments thereof. Included in this application.

Fig Includes a drawing of an embodiment of 5-C Of which is an overhead view of #17 which is the top of the removable plate that is mechanically fastened and sealed on to the upper edges of the outer periphery of the slide housing, that the rod portion of the height adjustment knob #4 extends through and in turn threads through the center of the slide portion, #28 of the height adjustable digital image sensor and image transfer component housing #3. In this example of an embodiment thereof #19 is an extremely low wattage circularly polarized Omani directional antenna. These antennas are mounted on the exterior of the housings to allow the housings of all surveillance sights to be made totally of a metallic instead of a composite, however the antennas employed by the radio frequencies employed by 5-G technology employ a completely different type of antennas, and it is also highly likely that all those employed by our military may not be equipped with antennas of any sort, in that the applicant has been informed that image transmission for same will likely be accomplished by means of tiny fiber optics cables, rather than by means of radio transmission.

FIG. 6 Is a view of an embodiment of an optional design of the device as if turned upside down with the removable cover portion #27 of the height adjustable digital image sensor and image transfer component housing #3. removed to view the contents therein. This device like most illustrated in this application is equipped for full surveillance purposes as well as to the acquisition of targeting images from any of the sights or scopes on the firearm by means of the three height adjustable digital image sensors mounted therein with the only real differences thereof being that of the positional arrangement of the digital image sensors providing the same or possibly even a wider providable field of view to the digital image sensors employed as well as providing manufacturing options of making a more compact device. Notice this device is also illustrated as employing three flat windows with laminated perfectly mitered laminated seams making optically correct points of connection, in this embodiment thereof, instead of one optically correct curved window.

FIG. 7 is a profile view of an embodiment of one of the devices mounted on a Picatinny mounting rail #1 in a configuration similar to that of FIGS. 1-A and 2-B. This drawing shows the digital image sensors employed in the height adjustable digital image sensor and image transfer compartment housing #3. Drawn as similar to a type of high-end spy digital image sensors tested along with many others during the process of developing the many types of them developed by the applicant and may well better resemble those that will be employed by our armed forces in that in ways they resemble portions of a type shown to the applicant, or for that matter they may well better resemble those equipped for the higher frequency type of video communication needful for their conversion to 5-G technology In this example of an embodiment thereof. in that the exact configuration of both being total speculation at this point, and of which being determined more by the manufacturers than anything else. This simply being due to the digital image sensors as well as the little module or modules employed that convert and send the fiber optic signals and other modes employed by our armed forces as the digital image sensors and the little module or modules employed that send the high frequency signals or by hardwire communication employed by 5-G technology is determined both by the actual configuration of the components possibly employed by them, as well as whether the digital image sensors and modules or other components for them are manufactured as single units or separately mounted and hardwired together, as well the basic configuration of either, being determined either by the manufactures of them, or specified by those having them manufactured for them. But this particular design of an example of an embodiment thereof. is illustrated as employing three digital image sensors although the number of digital image sensors employed as well as their configuration, or their mounting positions for that matter, being more a choice made as an executive decision by the manufacturers of the particular embodiments of a target acquiring or the combination target acquiring and surveillance devices, or as specified by our armed forces, as most preferable or needful to their particular application or need, In that this example of an embodiment thereof, includes configurations more closely resembling an embodiment thereof constructed for testing purposes during the development process of same, but all digital image sensors employed provide their fields of view either one at a time, full screen, or simultaneously with a combined total field of view or in separate windows simultaneously and than brought up separately in the screens of the displays they employ, with the arrangements and many modifications thereof providable, by means of the displays or the devices display they are employing. In this example of an embodiment thereof.

This drawing shows this embodiment of this device as being one of the combination surveillance and sight acquiring devices, with same employing three digital image sensors that provide their images the various types of displays employable by same, in a manner that provides the user with a combined broad unobstructed surveilled field of view that extends all of the way around forward, and to close angles to each side behind the user, at the same time with the center digital image sensor #22 being the digital image sensor that acquires target acquisition from other sights or scopes on the firearm in the center of its field of view as well as the area around it with the two side viewing digital image sensors #2 providing the field of view starting forward of each side and extending around to close angles to the side and behind on each side of the the firearm.

Additional embodiments of this device, as well as all other surveillance sights of the applicant could be made in many optional configurations and designs as well, such as with the digital image sensor housing portions and windows thereof extending out beyond the outer periphery of the battery compartment with the side windows or portions thereof angling back and inward to the battery compartment portion thereof. This as well as the side viewing surveillance digital image sensors inside the housing mounted perpendicular to the windows with the lens portions thereof positionally oriented to acquire an even greater surveilled field of view to the sides of the user in this, or additional embodiments thereof.

FIG. 8. is a drawing of a soldier, member of a S.W.A.T. team, or other, actually employing embodiments of two of these devices with the device mounted behind the high powered scope #51 on the top rail #1, providing its single image to the display, #50 and the other device mounted behind a regular reflex sight, #52 on the bottom rail #1 of the firearm extended just beyond the edge of the corner of the building #54 or other he is taking cover behind, where the digital image sensors mounted behind the viewing window, or windows of the device can attain a full view of the area. Thus in turn providing the user with many viewing options, in that this drawing is depicting all images from both devices employing the same display where all surveilled and targeting images, displayed or displayable in the screen of the display their employing are either displayed simultaneously, in separate windows or blown up individually full screen. Naturally this device's variations devised for employment options most advantageous to their application in various embodiments thereof, as well as any device of this nature simply devised to capture and transfer or transmit the images it captures, simply avails it to numerous display employment options, but this particular drawing as well as the drawing of an embodiment thereof included in FIG. 9 shows these images being displayed and viewed by a soldier, member of a S.W.A.T. team, #57 or other, in the screen of a display #50 mounted or made as integral portion of one of the applicant's multi-positional display mounts #55, not included in this application but devised to optionally work in conjunction with many of the surveillance sight type inventions of the applicant, of which along with many other types of the applicant's surveillance sights, are not actually included in this application. This particular display mount #55 like others of the applicant is multi position-ably adjustable to any vertical or horizontal angle of rotation with one quick easy fluid motion, with one hand that re-locks solidly once released into its newly desired position or angle of adjustment, or optionally solidly back into its position of non deployment flat up against the left side of the firearm. These display mounts whether one of the helmet or firearm mountable versions provide the users thereof with the perfect vantage point of all images provided by the surveillance sighting devices as well as as an additional image providable by means digital image sensor portion of a positionally adjustable armature that once adjusted additionally provides and maintains an unobstructed view of the area behind the user at all times as well with the combination of all providing the user with a fully unobstructed 360 degree view if the user's entire surroundings as well as a full and undiminished accurate use of the firearm from any position the user would have to position himself in relation to the firearm, to the effect of maintaining a position of his entire body remaining behind cover and out of the line of fire while doing so. In other words, this drawing, as well as the drawing in FIG. 9 are simply showing one choice of, actually any optional positions availed to him in his relation to the firearm, to the exact same and undiminished effect, without ever having to expose even the slightest portion of the user's body to incoming fire while doing so. In this example of an embodiment thereof.

FIG. 9 Includes a drawing of the same soldier, member of a S.W.A.T. team, or other, employing all of the same basic equipment as described and illustrated in FIG. 8, with the user employing same remaining behind protective cover and out of the line of fire, where all sighting and surveilling abilities as well as the ability to engage targets, if under attack and the order is given to do so, and whether from a common position as this drawing depicts, or literally from any position he has to position himself in relation to the firearm to do so, to remain out of the line of fire, and whether the user has to do so with his back flat up against the wall, and no matter from what side or with the firearm or the user roiled to either side, whether engaging targets or surveilling the area from overhead, or over the user's head such as out of a trench, over a berm, whether clearing buildings of snipers or other hostile combatants and having to look down halls, into rooms and other hiding places and whether on reconnaissance or simply traversing from one position to another and having to view around buildings or other obstacles to properly surveil down allies or other areas to see if the path needed to take is safe to do so, as well as countless numbers and a broad range required of our troops on a daily basses requiring them to put themselves in harm's way to do so and from literally any position the user would have to position himself in relation to the firearm to remain behind protective cover and totally out of the line of incoming fire while doing so. In this example of an embodiment thereof.

With all aforementioned, and far more very easily and safely achieved, as well as maintained, with no more than the muzzle and enough of the firearm extended beyond the edge of a wall, tree, armored vehicle or other, to expose the surveilling and target acquiring device's viewing window, where a very broad and full and unrestricted field of view of the area can both be acquired and easily and safely maintained. In this example of an embodiment thereof.

The following descriptions and drawings included in FIG. 10 through FIG. 24 have been added to for documentation purposes of various modifications and design changes endured by several optional embodiments of the various types of actual surveillance sights of the applicant achieved by means of his ongoing efforts to ever enhance, improve and broaden the level of safety, control, and overall service providable by embodiments thereof.

The improvements In these examples of an embodiments thereof ranging from things like component orientation or that of configurational modifications to the shape of their housings or the number or shape of the windows they employ, with the modifications endured by specific types of them, of all broadly varying from one type of surveillance sight to the next, as well as others that pertain to all types of the applicant's surveillance sights also included in the following, of which will be referenced as such, in the following descriptions and drawings. However none of these improvements or modifications actually adding any abilities, or deviating in any way from their original modes of acquiring their surveilled or targeting images or their modes of employment, nor do they deviate in any way from the parameters or the spirit of the original inventions patented, but rather enhance abilities embodiments thereof already possess.

All embodiments of the various surveillance sights and sight acquiring surveillance devices of the applicant have also always supplied their surveilled and targeting images to digital displays, or devices with digital displays, for the portable and separate viewing thereof, in the exact same basic manner. All have also always possessed modes of real time point to point or device to device digital image communication, that neither require a service or internet connection of any sort. In other words all have always been fully operational any where in the world. All have also always possessed more than one mode of doing so as well as the optional ability to connect to and take full advantage of numerous additional abilities and applications providable both by means of same's employment of the internet, as well as numerous stand alone applications simply providable by means of the employment of same, in conjunction with the with the employment of a smart device as a viewing screen for same. These including applications, providing things such as motion detection or a superimposed reticle, this as well as a broad range of image enhancing and modifying abilities, which have also always been available and employable by all of the applicant's camera sights and combination surveillance and camera sighting devices. All have also always been capable of working in conjunction with, or employ any number of digital display options such as a computer watch, or glasses' wrist mounted smart phone or its own dedicated display, or even the much larger screens of lap tops or other when sighting them in same, either by means of manually sighting same in at a firing range by means of the sight itself or optionally by means of an electronic bore-scope with the digital image provided by same, viewed at the same time and along with the digital video targeting image provided by the surveillance sight itself in the display of a laptop or other, as well as additional options and abilities providable by means of the employment of displays or devices with displays employing 5-G technology, that promise even additional highly efficient modes of real time point to point or, device to device digital image communication. In various embodiments thereof.

Included in the following descriptions and drawings are many examples of embodiments of various types and variations of the applicant's surveillance sights that have undergone modifications, including things like component placement, or configurational modifications of the shape of their housings or the number or shape of the windows employed In embodiments thereof. However none of which actually adding any abilities, or deviating in any way from their original modes of acquiring their surveilled or targeting images or their modes of employment, nor do they deviate in any way from the parameters or the spirit of the original inventions patented, but rather enhance abilities they already possess.

Surveillance sights included in the following descriptions and drawings that include modifications to many types of surveillance sights developed by the applicant, including the very first and most simplistic type devised by him, of which the first functional prototype was initially constructed by means of taking a tiny spy digital image sensor, radio transmitting module and a couple of digital image sensor batteries, on/off switch and charging port all wired and held together in a section of heat shrink tubing, then installed same inside a regular tube type reflex sight housing, with the lens of the digital image sensor in close proximity to the forward viewing window where it could acquire a very wide field of view after gutting, re-engineering and rearranging some of the internal components thereof, then mounted and tested same on the bottom of a pistol, then on rifles with different types of displays which worked extremely well, but the applicant's ongoing efforts to ever advance and maximize their field of view, accuracy, and overall level of providable of service by them, as well as their ease of maintenance and assembly, etc. has brought them to where they are now, of which is represented in the description and drawings of embodiments thereof included in FIG. 11 as well as those in FIGS. 14-A. through FIG. 16-B.

All single digital image sensor surveillance sights of the applicant in this application as well as others of the applicant not included in this application are additionally devised to be optionally manufactured as an integral part of a multi-positional mount, seen in FIG. 19. This includes any of the single digital image sensor, multifunctional types of surveillance sights devised by the applicant that provide both their targeting and surveilled image in two different modes both as a digital image sensor type surveillance sight as well as a regular reflex or holographic type sight either simultaneously or optionally in either mode, one type of which is included in drawings and descriptions in FIGS. 18 and 19 with FIG. 19 showing this multifunctional type surveillance sight made as an integral portion of the applicant's multi-positional mounts and employed for full surveilling abilities with the added advantage of its broader or optional roles of employment, such as that of training purposes with the instructor's ability to view the same targeting image as the shooter at the same time.

Also included in this application are several variations of the applicant's more recently devised multi digital image sensor types of surveillance sights, that provide the user with fully unobstructed visual in all angles of view of his surroundings in either full screen individually, or simultaneously in different windows of the display its employing, that when mounted and sighted-in out towards the muzzle of a firearm either on the top or bottom rail thereof, thus providing the user the full ability to maintain the surveillance of his entire area simply by means of sticking the end portion of the muzzle of the firearm with the sighted in surveillance sight mounted on either the top, but primarily of the bottom mounting rail out towards the muzzle of the firearm, which provides the user with the ability to extend just the very end portion of the firearm out to a point where the surveillance sight's viewing window is extended out just beyond the edge of a wall, building, vehicle, or other, that the user is taking cover behind, which provides the user with an ongoing unobstructed 360 degree view of his entire surroundings, no matter what position the user would have to place himself in relation to the firearm, which will prove as extremely efficient with the display mounted in one of the applicant's multi-positionable digital display mount (not included in this application), but that quickly adjusts and solidly locks into any position or angle of view with one quick easy motion with one hand, this mount also solidly locks into its newly desired position once released, of which all of the applicant's surveillance sights are devised to optionally employ.

All types of the applicants surveillance sights provide the user with the ability not only maintain a visual of his surroundings from any position they would have to position themselves to maintain all portions of their body behind protective cover and out of the line of fire along with the ongoing provision thereof even when under heavy incoming fire, as well as the ability to return accurate fire, if the order is given to do so, no matter what position the user would have to position himself in relation to the firearm to remain out of the line of fire with the numerous variations thereof simply providing them with a much higher level of versatility adaptability and range of providable service to the overall need of the various types of firearms of their employment.

All are also devised to be mounted on and employed on any firearm employed by our armed forces as well as all branches of homeland security, law enforcement such as S.W.A.T., first responders, secret service, or in other words, all those defending this nation and the people thereof.

Also included in this application include slight modifications needful for the applicant's surveillance sights compatibility, and their working in conjunction with devices employing 4-G technology, which they all presently possess, to their employment of components needful to their compatibility, and their working in conjunction with devices employing 5-G technology, which all devices now employing, or working in conjunction with devices employing 4-G technology will soon have to be equipped with as 4-G technology is phased out and 5-G technology takes its place. In that 5-G technology, among other things, requires a higher frequency transmitters and a different antenna arrangement.

Also included in this application are slight modifications requisite for the applicant's surveillance sights employment by our armed forces as well as for their compatibility, to work in conjunction with displays and other mil-spec electronics devices employed by our armed forces.

These differences include things like the employment of a tiny shielded fiber optic cable for video image transmission, instead of wire or wireless video image transmission variations, like all of the applicant's surveillance sights presently employ, all other components employed by them also have to both meet all mil-spec code compliance requirements, not only those relating to durability, but also to numerous mil-spec code requirements relating to their either being detectable by the enemy such as components that create electromagnetic signatures or possess other vulnerabilities or security risks possibly exploitable by the enemy.

Also included in this application are referenced slight modifications needful for the applicant's surveillance sights compatibility, and their working in conjunction with devices employing 5-G technology. All presently possess the ability to, and work in conjunction with devices employing 4-G technology, simply in that components presently on the market and employed in them are manufactured to do so, and of which will surely hold true as 4-G technology is phased out and 5-G technology takes its place, those available in the feature will be manufactured as compatible with 5-G technology although some of which still remains unknown but for the most part the only known modifications needful to effect the applicant's surveillance sights to their compatibility with 5-G technology would include their employment with higher frequency transmitting modules than those employed by 4-G as well, and a different antenna arrangement and type. But all components needful to do so serve the same basic purposes and provide the same basic services as all components employing 4-G compatibility that have been employed and tested since the initial inception of all types of the applicant's surveillance sights.

All modifications and design changes endured by many of the applicant's surveillance sight inventions included in the drawings' detailed description that follows were devised as a result of the applicant's ongoing efforts to ever enhance and maximize all variations of them to the absolute highest level of safety and control providing abilities, as well as their highest level of operational efficiency, versatility and overall provision of needful services and abilities possible, as well as all digital image sensors and components meeting all mil-spec code requirements and deemed as most advantages and essential to their employment by our ground troops, as well as both all known and unknown essential to their employment of fifth generation technology of which all devices of this nature will have to be equipped to employ with as 4-G technology soon to be completely phased out. All are employed in all surveilling and sighting devices of the applicants, to the provision of their same basic individual contributions of all, and with all doing so to the same basic unique effect as all previously employed. This, as well as, with the joint contributions of all producing the same basic unique and desperately needed services and abilities they all possess, with all also providing and producing their same individual and joint contributions to all variations of them, to the joint contributions of all enabling the same basic services that all variations of them possess exclusive unto themselves, and as those that have, since the initial inception of all original apparatuses patented, as well as all systems and modes of their employment, all were initially devised to accomplish by the applicant.

The drawings in this application also show several physical differences and variations in the arrangement of their internal components as well as that of structural shape and configuration differences from those of their original design. However all variations included in this application, and employed during the development of all, as well as all components requisite their employment by our armed forces as well as those enabling video communication with devices or displays employing 5-G technology, provide the same basic individual functions and contributions, to the to the same basic overall effect and functions of the joint contributions of all, as well as the joint contributions of all enabling the same basic services in, and to, all variations of them.

Also included in the last portion of the following are descriptions of application software devised by the applicant to even further his surveillance sight's level of safety and control providing abilities, as well as their overall level of accuracy and sighting abilities providable by means of said applications devised by the applicant to be downloaded into smart devices when employed by the applicant's surveillance sights and surveillance and sight acquiring devices to effect the overall level of service and abilities providable by the advanced computing abilities employed by all of smart devices. The applicant has always realized the potential and broad range of abilities of smart devices of all kinds, with all actually being very high tech programmable computers with digital displays, and of which had always optionally employed and extensively tested them along side other types of displays during the development of all of the applicant's surveillance sights, dating back to shortly after his initial inception of his very first type of them. Along with the applicant's ongoing efforts and commitment to his surveillance sights being developed to the full extent of their provision of any and all services and abilities needful to the advancement of their surveilling, sighting and safety providing services, and sighting abilities possible, he spent a tremendous amount of time in deep thought directed towards viable solutions to even further all of the needful services and advanced abilities of the applicant's surveillance sights providable by means of the mobile operating systems and computing abilities of smart devices, and to do so to the full parameters of their almost limitless developable abilities, of which is described and will be easily understood by means of the detailed descriptions of same included in the last portion of the following detailed descriptions.

FIG. 10 is a profile view of one of an embodiment of one of the applicant's more recently devised multi digital image sensor surveillance sight, with one of many optional positional arrangements of the digital image sensors, that possess certain advantages to each other, whether in field of view attainable, natural image stitch ability, or other. Many optional digital image sensor position mounting arrangements and housing configuration options provide the digital image sensors a field of view, limited only by the field of view of the digital image sensor or digital image sensors employed in them.

This drawing is showing a digital image sensor configuration, with advantages to their provision of a broad unobstructed surveilled field of view that extends all of the way around forward, and to close angles to each side behind the user, at the same time in this embodiment thereof, with the center digital image sensor #22 being the digital image sensor that acquires target acquisition with a perfectly centered target reticle in the digital video images provided by same, in all display modes and accessories employed to work in conjunction with same.

Modifications and improvements endured by this type of surveillance sight of the applicant represented in this drawing and in this particular embodiment of them, include things such as the positioning of the target reticle projection unit #21 being positionally oriented much closer to the targeting digital image sensor itself thus allowing for a more favourable reticle beam angle in its relation to the surface of the surveillance sights viewing window, thus providing two distinct advantages, the first of which being a more sharp and clearly defined target reticle, but also this drawing as well as all others show the mounting platform for the target reticle projection unit, #21 as either manufactured as an integral portion of forward facing mounting base for the targeting digital image sensor, #22 which is also an integral portion of the surveillance sight housing itself #35 for the targeting digital image sensor, #22 or alternatively manufactured as as an integral portion of the targeting digital image sensors housing itself, at the perfect angle for its reticle light beam #26 to reflect off of the the portion of forward viewing window in perfect lineal alignment with the targeting digital image sensors lens, in which its relation to which would never change, in that although another type of the applicant's surveillance sights included in an earlier patent for them is sight adjustable by means of the targeting digital image sensor itself being sight adjustable in its relation to a stationary targeting reticle, or crosshairs as well as another that includes an internal tube not unlike many conventional reflex sights, but with the digital image sensor and reticle light both mounted together in same, thus same are also sight adjustable together, by means of sight adjustments to the tube both are housed in which all could be more easily manufactured in this manner as well.

However, this surveillance sights design as well as most other examples thereof the applicant are drawn and described as possessing sight adjustable rail mounts which although adjust all digital image sensors simultaneously, the only one actually being adjusted to the target along with the target reticle is digital image sensor #22 which is actually sight adjusted by means of the sight adjustable rail mount. Digital image sensors #2 provide the greatest portion of the surveilled images to the user, all of which provided to the user in the optional variations of the screens of the digital displays, where the presentational arrangements and modifications are provided by means of both functions of the displays or devices employing them as well as apps available or developable.

The rail mounts sight adjustability is accomplished by means of the two adjustment screws or knobs #39 located on a lower portion of the surveillance sights housing itself #37, with the upper portion thereof #35 being mechanically fasted thereto, and thus becoming a portion thereof. This adjustment screw or knob #39 controls vertical adjustability. #40 located on the rail mount itself controls the surveillance sights lateral sight adjustability, allowing the target reticle and and targeting digital image sensor to be simultaneously sighted in to the target it self, in this embodiment thereof, of which is engineered in a manner that allows for much more refined level of adjustability when sighting in the device allowing for a much more precise level of sight adjustability and a higher level of accuracy accomplish-able. The internal mechanical components enabling same in this embodiment thereof as well as many other examples of embodiments thereof included in this application, are included in the descriptions drawings thereof included in FIGS. 20-A through FIG. 20-E. This refined and more precise level of sight adjustability should prove as most needful and effective in the level of accuracy achievable with surveillance sights with a very small mounting footprint such as those included in the description drawings included in FIGS. 17-A through FIGS. 17-D. Additional modifications included in this design or type of surveillance sights consisting of engineering differences that could prove as advantageous to the ease of assemblage, as well as a slightly higher level of ease pertaining to component accessibility in the possible case or need of future maintenance or repairs to same. The effects of which as well as the engineering enabling same will be explained and fully understood by means of the description and drawings included in FIGS. 14-A through FIGS. 14-D.

FIG. 11 is shows some of the modifications endured by this example of an embodiment of one of the more simple single digital image sensor surveillance sights that actually possesses a great many advantages and employment options, such as employed as included in this drawing of same, or alternatively manufactured as an integral portion of one of the multi-positionable rail mounts that are adjustable to a full radius of 360 degrees of angular adjustability relative to the weapon's rail of the firearm in which same is employed and that is solidly re-lockable back into its perfectly sighted in position parallel with the weapons rail, as seen in FIG. 19 that includes another type or variation of a digital image sensor surveillance sight of the applicant, drawn as being manufactured as an integral portion of, or mechanically adaptable to one of the rail mounts of the applicant, that provides same with a full horizontal radios of 360 degrees of angular adjustability of which transforms same into a highly versatile and effective tactical surveillance sight.

Another very advantageous mode of employment for this basic type of surveillance sight is that of being mounted on the bottom rail of a service pistol, firstly, in that it can be made even with an extended run time in very small sizes that would neither hinder the normal operating abilities of the pistol, as well as remain easily holsterable, as well as remain almost unnoticed mounted on the bottom rail of a service pistol, while availing the user with not only with extremely fast, accurate and easy target acquisition, but also profoundly effective tactical and safety providing abilities, if under attack as well. This due to the user's provision of the ability to take protective cover behind the corner of a building, wall, vehicle or other, with just the barrel of the pistol with the the little surveillance sight mounted and sighted in on the bottom rail thereof extended out from behind same. This can also even easily be accomplished along with the user's hand rolled to an angle slightly inward so that absolutely all portions of his body remains behind total protective cover. Thus not only providing the user with the full ability to take and maintain total control of a fire fight from behind protective cover, but also with the ability to maintain a full wide visual of the battle and the area around same with almost the same level of efficiency in some applications and roles of employment as the applicant's slightly larger multi-digital image sensor surveillance sights that provide the user with surveilling abilities of several viewpoints of the users surroundings at the same time. This same basic type of single digital image sensor surveillance sight along with several variations of same and both provided with a target reticle by means of a reticle beam selector and projector, as well as same employing a reticle provided by means of an available smart device application, which also worked but with a radically reduced level of accuracy than same employing a more light generated reticle. In fact the very first surveillance sights of the applicant were initially devised for the primary purpose of, and extensively tested same employing them in this manner, primarily due the applicant's knowledge of the all new challenges faced by our ground troops in urban warfare and the added provisional level of safety providable to them by same, of which has maintained the driving force in the applicant's development of all included in this application.

All variations and embodiments of the applicant's surveillance sights are devised in the manners they are to provide them with additional or specifically advantageous abilities unique unto themselves, to the effect of broadening their level of versatility and range and level of needful services providable to the numerous types of firearms and services needful in the various roles and applications of their employment.

All variations and types of the various embodiments of the applicant's surveillance sights are devised in the manners they are, not only to the provision of sames fast, easy and accurate target acquisition, of which all possess, but all were actually devised for the tactical and safety providing abilities providable by all, that enable the user in various ways with the ability to calmly take and maintain total control of a battle while maintaining a fully unobstructed and broad visual of his surroundings and the existing or the development of potential dangers therein, even while under heavy incoming fire while also maintaining with their entire body remaining totally out of the line of fire from positions of protective cover while viewing all in the screen of one of the types of displays its equipped to employ whether this being a dedicated digital display for same, or the display of a smart watch, glasses or the display of a smart phone held in the other hand. All of which being perfectly employable by law enforcement such as S.W.A.T., secret service, homeland security or any other government agency, or in one of the display options employable by those, equipped for employment by our military, equipped with mil-spec compatible components, that neither pose a security threat or vulnerability to the enemy, of any sort, which require the images received by digital image sensors employed in same, to be converted and transferred, to the mil-spec display devices equipped for their employment by same, to be transferred by means of a mode or modes, that meet or exceed all mil-spec requirements requisite the employment of same by our armed forces, of which the applicant has been informed will likely include fiber optic image transference and the employment of tiny fiber optic cables instead of converting and transmitting their signals of images captured by same by means of radio frequency transmission modules, or the option of direct wire image transmission, employable by those, not equipped for the employment by our armed forces, whether the displays employed by same are of the type that is mounted in or integral to its own multi-positionable display mount, wrist mount, visor or other night viewing equipment employable by our armed forces. All surveillance sights of the applicant still acquire and provide their surveilled and targeting video images as well as acquire and provide all of the unique and desperately needed abilities they all possess in the same basic manner they always have, no matter what actual type of components or what mode they employ to transmit or transfer the surveilled and targeting video images they capture, and no matter what type displays are employed by them, to display the surveilled and targeting images provided by same.

Modifications this type of sight has endured since its initial inception simply include things like modifications in their physical shape or structural configuration allowing for easier assemblage and better access to components in the possibility of need for maintenance of any kind but primarily the configuration of the surveillance sights housing along with the size and or number of its viewing windows #42 providing the lens of the digital image sensor #22 the ability to be mounted farther behind the forward viewing window, or the forward portion of the viewing window creating a greater distance between the digital image sensors lens and the image of the target reticle reflected off of the partially reflective inside surface of the forward viewing window #42 and still acquire a full wide field of view therefrom, of which in most embodiment's thereof is limited only by the field of view of the digital image sensor employed by same, which provides these surveillance sights several advantageous designs of earlier embodiments thereof. The first of which being embodiments of this nature's ability to be more accurately sighted in, of which may even further improve their already advanced attainable level of accuracy, as well as the placement of their reticle beam light #26 and projector #21 projecting the reticle beam thereof at a much better angle allows for a much sharper and more uniform reticle in that these surveillance sights of the applicant were devised in a manner that always maintains the digital image sensor's lens in perfect alignment with the target reticle, thus not only eliminating all effects lateral parallax caused by the shooter's vantage point of the target and the positional alignment of same to the target reticle, but also ensuring both that the target reticle always remains perfectly true to the target at all times, while totally eliminating the need for a reflective parallax correcting reticle lens of any sort, but does so in a manner that provides the image of same to the display its employing with the target reticle perfectly centered both in the screen of the display its employing, as well as in the digital image sensors field of view, at all times, thus not only providing the user with a full wide view of the area and the ability to instantly locate the target but also with ability to instantly return accurate fire, in that the only thing required of the user to do so, is to simply put the red dot of the target reticle that's always perfectly centered in the screen of the display its employing, on the target with the firearm, which in field tests has proven to be as fast and easy as one could physically point at the target.

Another modification all types and variations of surveillance sights and embodiments of the applicant have endured has been in both the type as well as the positioning of antennas employed by them. Almost all drawings of surveillance sights and sight acquiring surveillance devices in this application are drawn as employing micro omnidirectional transmitting antennas #19. This drawing shows the the antenna as being mechanically fastenable and removable to an antenna coupling that would be extended through the housing remain as sealed and mechanically fastened by means of a retaining nut, on the inside of the housing of the surveillance sight the antenna wires extending between the threaded portion of the antenna coupling and the radio transmitting module as well as some of the other internal components will be viewable in FIGS. 14-A as well as 15-B although the drawings of all internal components included in this application vary in shape and orientation, simply in that they where all drawn as to resemble some of the various digital image sensors employed during the development of the various types of digital image sensor sights, included in this application and of which will probably play little or no part in the future development of same.

For instance, this drawing is drawn to closely resemble the same type of digital image sensor included in the drawings of FIG. 1-C, FIG. 14-B, and FIG. 15-B. This type of digital image sensor was also employed during the development of pretty much all of the various types of digital image sensor sights of the applicant, of which many modes of their employment and applications of them, as well as modifications of the components for them, done by the applicant to better effect various applications of them, were included in earlier surveillance sight applications of the applicant and although the employment of these digital image sensors field tested extremely well, they were were used much more for bench-testing purposes in that at the time they were only available in somewhat larger models than others employed by the applicant although the applicant was assured by dealers for them at the time that they where being manufactured in very small sizes for mini drone applications and would soon be, and now are, widely available in much smaller models. These digital image sensors, like many others employed and tested, were manufactured as complete units with the digital image sensors as well as all video communication components manufactured together these particular digital image sensors were employed at the time for two reasons both because they possessed extremely high image quality and image enhancement options. They also just lent themselves well to many employment options simply due to the fact that by means of the removal of the housing for them most of their components consisted of tiny circuit boards connected and wired to and between each other by means a tiny ribbon wire, meaning that not only did this open up many positional mounting options of their components which at the time proved as advantages in some types of surveillance sights of the applicant, they also lent themselves well to testing purposes in that they were adaptable with interchangeable tiny circuit board image transfer and frequency component options availed by their manufactures as well as available schematics for them as well as image and field of view options, and advanced features and level of quality. This type of digital image sensor as well as all other mentioned and drawn of the various types included in this application are simply types availed to the general public and employed during the development and testing of the various types of surveillance sights of the applicant. The various types of digital image sensors as well as those that possessed the variations in lens types and fields of view as well as well as the various types and modes of image transference and radio frequency transmitters were all employed and tested in different ways, simply in his efforts to explore all options and possible advantages attainable by means of the employment of same.

However, the applicant has been informed that those being developed for our armed forces will most likely not be employing antennas of any kind, and all future surveillance sights produced for non military employment will be transferring their video images primarily by means of radio transmitters compatible with the 5-G technology of which do so by means of several, much higher radio frequencies, and of which employ a completely different type of transmitting antenna with the optional configurations employable by same being very small and encase-able in types of plastic. Those employing 5-G compatibly will also remain capable of alternately doing so by means of direct wire communication in the same manner as they always could but most likely the only type of surveillance sights of the applicant that employ their own display such as those seen in FIGS. 21-A and 21-B as well as those included in FIGS. 22-A through 22-E. This drawing shows this surveillance sight equipped for military employment with the fiber-optic cable #41 plugged into its port #14 in the housing #35. This drawing as well as most others in this application are drawn as far more generic in nature in that those employed by our armed forces most likely would not be equipped for direct wire or radio video transmission, nor would those employed for homeland security or other be equipped for fiber-optic video signal transmission but simply for the purpose of avoiding necessary redundancy these drawings are shown as employable with both. One of the micro USB and UTD ports #12 would be employable for the option of direct wire video communication with the other employable as a charging the switches #7 simply employed to complete circuits to effect electrical communication between the power source and the digital image sensor and other electrical or electronic components employed by the surveillance sight.

FIG. #12 is a profile view of an embodiment of one of the applicant's more recently devised multi digital image sensor surveillance sights which is actually the exact same type of surveillance sight as described and included in the drawing of FIG. 10 with the only difference between the two being the infrared illuminators #33 incorporated into the housing in this embodiment thereof, directly over, and in lineal alignment with the viewing angles of the surveillance digital image sensors #2 and the combination surveillance and targeting digital image sensor #22. The employment of infrared illuminators #33 in conjunction with many types of surveillance sights of the applicant date back to some of the first provisional applications for the very first patent for them, in that almost all of the digital image sensors employed in them dating back to the very first functioning prototype for them had infrared viewing capabilities, and as a result thereof, the applicant tested them at night with various types of separately mounted infrared illuminators, and of course some digital image sensors as well as some infrared illuminators tested performed far better than others. However some combinations thereof worked amazingly well, with the documenting thereof included in many of the applicant's earlier patent applications for them, as well as their abilities to be Incorporated with alternative night viewing and thermal optic technologies of which of course basically employable by any type of sighting optics, and of which the applicant has been informed will be included in those produced for our armed forces, However the simple employment of the right type and quality of high powered laser or L E D infrared illuminators which are also very energy efficient, along with the right infrared viewing digital image sensors, provides these surveillance sights of the applicants with some less expensive yet quite impressive night viewing abilities. Notice that the LED or laser beam reticle projector #21 that houses the light source and/or directs the beam of light #26 that's reflected off of a slightly reflective inside surface of the viewing window #42 in direct lineal alignment with the lens of the digital sensor #22 of which in this embodiment thereof is actually attached to or integral portion of the digital image sensors housing itself in a fairly close proximity to the digital image sensors lens while being at an angle that would not reflect back into it, thus not only providing the surveillance sight with a sharp non distorted image thereof but also enabling the manufactures of same with the ability to perfectly set the angle of same before installation. But also ensuring that the angle thereof remains constant in its relation to the lens of the targeting digital image sensor #22, in this embodiment thereof.

FIGS. 13-A.-B.-C.-and D include drawings of a partly disassembled embodiment of the single digital sensor sight included in FIG. 11. This drawing simply showing how an embodiment thereof, comprised of similarly configured components could be not only very easily manufactured and assembled, but could also be engineered in a way that would provide very easy access to all basic components comprising same, in the case of maintenance or needful repairs having to be performed on same when deployed.

FIG. 13-A. includes a drawing of an embodiment of an assembled rail mountable portion #37 of the digital sensor sight, mounted to a mounting rail #1 of a firearm by means of two screws #28, as well as the lower housing portion of the sight #38 mechanically fastened to and both vertically and laterally adjustable thereon by means of the adjustment knobs or screws #39 and #40. Embodiments of this rail mount are also included in the drawings FIGS. 20-A-B-C-D-and E. and will be easily understood by means of the drawings and descriptions of same.

FIG. 13-B Includes a drawing of an embodiment of an upper housing portion of this embodiment of a single digital image sensor surveillance sight, that's shown as if same had been manufactured as being mechanically fastenable and thus removed from the lower portion of the housing #38 included in FIG. 13-A for same, by removing the mechanical fasteners #30 included in FIG. 13-A, previously securing the upper housing portion of the sight #35 to the lower portion of the housing for same #38 and the rail mount portion of same, #37 also included in FIG. 13-A.

This drawing shows the upper housing portion of the sight #35 as if same had been laid over onto its side with the battery compartment cover #10 as seen in FIG. 13-D along with the battery pack #20. as seen in FIG. 13-C, previously housed in the battery compartment portion of the sight #8, for same removed. This drawing of the upper housing portion of the digital sensor surveillance sight provides a view of same, from under the open and now exposed and accessible underneath portion of this embodiment of a digital image sensor surveillance sight, of which devised and engineered in this basic manner in this embodiment thereof, to provide same with the ability to be very easily assembled as well as to provide same with easy accessibility to all internal components comprising same, in the possible case of needful repairs having to be performed on same.

This digital image sensor sight would also likely be equipped with an infrared illuminator (not viewable from this viewing angle) or other night viewing or thermal imaging components simply due to the size of the battery pack employed in same. In that the actual power consumption of almost all of the digital image sensors as well as the different types of image transferring or transmitting components employed and tested in them during the development process of same, had a very low energy demand and could run for an extended period of time on a much smaller battery pack. This drawing also provides a good view of the digital image sensor #22 which in and of it self would be equipped with its own internal image transferring and, or transmitting equipment, which was the case in many of the digital image sensors employed and tested during the development process of same. All of which also not only possessed inferred viewing abilities, but also possessed other very useful abilities as well, such as motion detection and other abilities that will doubtless prove of use in various roles of the employment of same, and the applicant reserves the right to employ all applicable components equippable or employable by same, providable by means of advancements in technology, both present and future to the betterment or advancement in the level of service and abilities providable by any and all of the equipment included in this application as well as those previously submitted by the applicant.

FIG. 14-A includes a drawing of an embodiment of an upper housing portion of a multi digital image sensor surveillance sight, engineered much in the same manner as the partly dissembled version of the single digital image sensor surveillance sight included in FIGS. 13-A-B-C and D. This drawing of an embodiment of a multi digital image sensor surveillance sight shows only the upper housing portion the surveillance sight #35 as if same had been removed from the lower housing and rail mount portion of same, (not shown.) The view of same provided in this drawing thereof, being a view from under the open and now exposed and accessible underneath portion of this embodiment of a multi digital image sensor surveillance sight shown as constructed in this optional manner simply to provide same with easy assemblage and accessibility of the internal components comprising same. This drawing an embodiment thereof also provides a much better view of some of the internal components of this embodiment of a multi digital image sensor surveillance sight. Such as the center digital image sensor #22, being the digital image sensor that acquires target acquisition, with the target reticle beam light #26 in the configuration and color of the target reticle selected by means of the reticle selector #31 with the image of same reflected off of the partly reflective inside surface of the surveillance sights viewing window #42 and of which is sighted into the target, when initially sighting in on the firearm, same is employed on, by means of the vertical and horizontal sight adjustment knobs or screws #39 and #40, thus providing the image of the target reticle or crosshairs perfectly centered in the field of view provided by the target acquiring camera #22 and thus perfectly centered in the image provided by same in the screen of the dedicated display or smart device employed by same, and as previously referenced the additional two digital image sensors #2 in this embodiment thereof provide additional surveilled fields of view starting forward on each side, and extending around to close angles to each side and behind the user, either simultaneously, in separate windows, or individually brought up full screen, in the the dedicated display or smart device employed by same, with the digital images captured by means of the various types digital image sensors employed or employable in the various types and embodiments of the surveillance sights and sight acquiring devices included in this application are converted and provided to the dedicated displays or smart devices employed by same, by means of digital image transmitting and/or digital image transferring components which were included and housed internally along with the digital image sensors in many of the digital image sensors employed during the developmental process and testing of same, and others were included as tiny separate modules or components included to perform the task. This drawing includes separately mounted digital image transmitting and/or transferring modules #13 to perform this task in this embodiment of same.

All basic functions, modes and components enabling services providable by means of this embodiment of a multi digital image sensor surveillance sight, are shared as common or employable by all multi digital image sensor surveillance sight embodiments included in this application.

Optional positional arrangements of the digital image sensors provide different embodiments thereof with certain advantages to each other, whether in field of view, natural image stitch ability, or other advantages. Such as many optional position mounting options provide the digital image sensors with a field of view if needed, limited only by the field of view of the digital image sensor or digital image sensors employed and other arrangements employed or employable provide same with advantages more specific to a more specialized role of employment, or advantages to the type of digital image sensor or digital image sensors or other or additional components employed, or that are most advantageous when employed in conjunction with other accessories, invented by the applicant, (that are not included in this application) but, of which optionally work in conjunction with them, and provide the user with an additional unobstructed field of view behind the user at the same time and displayed in the same digital display they optionally share. This drawing is showing a digital image sensor configuration, advantageous to their provision of a broad unobstructed surveilled field of view, that extends all of the way around forward, and to close angles to each side behind the user, at the same time.

FIG. 14-B simply includes a battery pack #20 for this embodiment of a digital image sensor surveillance sight as if same had been removed from the housing portion of the sight for same. #44 is simply the wire and plug for same providing a connection to and electrical communication between the battery pack #20, and the charging port for same, as well as power to all switches providing selective power distribution to the individual digital image sensors, as well as to the individual infrared illuminators as well as in the selection of image transfer modes all other components needful of power providable by same, excluding the reticle beam and selector switch for same #31 which is powered by means of its own button battery in this example of an embodiment thereof.

FIG. 15-A includes an overhead view of an embodiment of a multi digital image sensor surveillance sight, in which the lower portion of the digital image sensor sight's housing #38, (not shown in this drawing) and the upper portion of same #35 would simply be manufactured as one piece. This simply due to this embodiment thereof is simply constructed in a manner in which all components needful of access both for assemblage as well as for the possible need, to later re-access same, for maintenance, or repairs could be easily accomplished simply by means of the removal and reinstallment of the digital image sensor and reticle beam projector mounting plate #58, as seen in FIG. 15-B comprising same. This drawing shows the forward portion of the housing for same as being transparent simply to show wire #44 from the battery pack #20 as seen in FIG. 15-C to and providing power to all switches providing selective power to all components needful of same. The wires and plugs #59 for same coming from the switches and providing selective power to the digital image sensors and image transferring and/or image transmitting components as well as the wire and plug for the reticle beam projector coming from the reticle beam selector for same, in this embodiment thereof, shown as coming through the opening provided by means of the removal of the digital image sensor and reticle beam projector mounting plate #58 from the cleat (not shown) for same extending around an inner forward portion of the battery compartment #8, or the aft portion of the digital image sensor housing portion of the surveillance sight in this example of an embodiment thereof.

FIG. 15-B includes overhead view of an embodiment of a removable plate #58, with the combination digital image sensors and digital image transmitting and, or transferring components comprising same included as complete units, along with the led or laser beam reticle projector #21 that houses the light source and/or directs the beam of light that's reflected off of a slightly reflective inside surface of the viewing window #42 in direct lineal alignment with the lens of the digital sensor #22 of which in this embodiment thereof is actually attached to or made as an integral portion of the digital image sensors housing itself #22. This plate would be mechanically fastened by means of mechanical fasteners #30 and sealed to an inner flange or cleat extending around the inner aft portion of the forward portion of the sight that houses the digital image sensors and other components needful for the operational employment of same, and the forward inner portion of the battery compartment in this example of an embodiment thereof.

FIG. 15-C. Simply includes overhead view, of an embodiment of a removable battery pack #20 as well as the wire and plug for same #44

FIGS. 16-A. Simply includes a drawing of an overhead view of an embodiment of the same basic type of multi digital image sensor surveillance sight as is included in FIGS. 15-A, 15-B, and 15-C with all except the battery compartment cover for same re-assembled with is drawing of same also including the infrared illuminators #33 and the beam width adjusters #32 as well as the switches for same #34 also included in this drawing of same in this example of an embodiment thereof.

FIGS. 16-B. Simply includes a drawing of an overhead view of an embodiment of the same basic type of multi digital image sensor surveillance sight as is included in FIGS. 15-A, 15-B, and 15-C with the exception of this embodiment thereof being a single digital image sensor surveillance sight. This drawing like the drawing of the embodiment included in FIG. 16-A also includes all components comprising same, except for the battery compartment cover for same, re-assembled, with this drawing also including the infrared illuminators #33 and the beam width adjusters #32 as well as the switches for same #34 in this example of an embodiment thereof.

FIGS. 17-A. Through FIG. 17-D. Include drawings an embodiment of a very compact yet versatile surveillance sight that would employ, or be employable with versions of the same basic type of components as employed by other embodiments of surveillance sights included in this application, with various embodiments of this same basic type of digital image surveillance sight also being equipped with infrared illuminators, thermal optic or other night viewing components, as well as others manufactured as fully self contained embodiments of same equipped with with their own power supply. However these drawings thereof include a multi digital image sensor surveillance sight version of same, that would actually be provided with its power, to supply all needful components comprising same, by mean of an external power source, such as a separate battery pack employed by and carried by our ground troops, providing power for same, as well as power for additional equipment employed by them. This particular example of an embodiment of same is also shown as being employed as an integral portion of surveillance sight of the applicant that includes not only a power source for same but also a multi-positionable display or display mount for same providing the user with a perfect vantage point of the the surveilled and targeting images provided by the surveillance sight and displayed as viewable by the user the screen of the display portion, or dedicated display, or smart device employed by same, from literally any position the user would have to position himself to remain in full control of a firelight, from behind protective cover.

FIG. 17-A Includes an example of an embodiment of this type of very compact, yet versatile multi digital image sensor surveillance sight, with the forward housing portion #35 of same as seen in FIG. 17-B with the windows of same, shown as being removable and thus removed simply by means of removing a series of tiny machine screws, around the outer periphery of the base and aft portions of same and thus removed from the rest of the embodiment of this surveillance sight, wherein all of the inner components employed in same a exposed, and thus rendering this embodiment thereof not only very easily manufactured but also provides this multi digital image sensor surveillance sight, with easy accessibility to all inner components comprising same, in the event that same would be in need of future maintenance or repairs. This drawing shows the controls for the components housed therein such as the surveilling digital image sensors #2 as well as the main target acquiring digital image sensor #22 along with all image transmitting or transferring modules #13 for same and well as the laser or LED reticle beam projector #21 housed therein and all switches, and controls for same mounted of the back vertical extrusion or wall portion of same, in this particular embodiment thereof. An embodiment of this nature could and may well be provided with night viewing or thermal optic components as well as its own power supply simply by means of the incorporation of components needful as well as the provision of configural modifications to accommodate same, in alternative embodiments thereof.

FIG. 17-B simply includes a drawing of this embodiment of the multi digital image sensor surveillance sight's housing removed from the rest of same, previously referenced in the description included for FIG. 17-A along with both the side windows, as well as the forward window for same #42, in this embodiment thereof.

FIG. 17-C. Simply includes a drawing of the embodiment portions of the multi digital image sensor surveillance sight, included in FIGS. 17-A. and 17-B. re-assembled with this drawing the surveillance sight shown as if same was was in service, with the reticle beam #43, projected from the reticle beam projector #21, reflected off of a slightly reflective inner surface portion of the forward window, portion of same, in direct linear alignment with the lens of the target image acquiring digital image sensor #22, with the alignment of same to the target when initially sighting same in, on the firearm in which same is employed on accomplished by means of the clockwise and counterclockwise rotation of both the vertical sight adjustment screw #39 and the horizontal or lateral sight adjustment screw #40 in this embodiment thereof, of which will be fully described and easily understood in the drawings and definitions provided in FIGS. 20-A through FIG. 20-E. of which includes a type of sight adjustable rail mount, that enables very precise sighting adjustments to be made when employed on digital image sensor sights included in this application even when same possess a very short linear footprint.

FIG. 17-D includes a drawing of a view of the back side of the same multi digital image sensor surveillance sight, included in FIGS. 17-A, 17-B. and FIG. 17-C., all switches, and controls for same are mounted on the back vertical extrusion or wall portion of this embodiment thereof. #31 is the reticle switch and selector which is of a standard type employed of almost all conventional red dot an holographic sights and of which provides the user with a choice of reticle sizes shapes and usually even a choice of colors of either red or green. This drawing also shows this embodiment thereof as possessing both a fiber optic receptacle #14, which would likely be included on those employed by our armed forces, as well as a single pin power receptacle and micro USB or OTG receptacles #12 as well which would be employed more in non military applications as a hardwire-able alternative for the purposes of direct wire communication and/or power transference. This drawing simply includes all simply to show same.

FIG. 18. and FIG. 19 Include a slightly modified version of an embodiment of a single digital image sensor sight of the applicant that provides the user with both the use of a regular reflex or holographic sight as well as that of a single digital image sensor sight with the digital video targeting images captured by same viewable in the screen of the digital display accessory employable by same at the same time. This same embodiment of a single digital image sensor sight of the applicant is also included in FIG. 19, with same made as an integral portion, or mechanically fastened to the upper surface portion of an angularly adjustable rail mount of the applicants, with earlier versions of same, referred to as tactical angularly adjustable rail mount 4000, made as integral to a variety of the applicant's digital image sensor sights included in the first non-provisional application of the applicant for these sights, with this sight of the applicant also referred to as another of these sights that fit into this same group of them referred to as a group 1000 in the first non-provisional application of the applicant for same.

FIG. 18-A includes an embodiment of the aforementioned single digital image sensor sight of the applicant, that provides the user with both the use of a regular reflex or holographic sight along with the provision of services providable by a single digital image sensor sight of the applicants, with the digital video targeting images captured by same optionally viewable in the screen of the digital display accessory employable by same at the same time. The cowling covering #45, covering the actual digital image sensor #22 as well as the reticle beam projector #21, for same. This particular embodiment of a digital image sensor surveillance sight includes a window in which these components comprising same, in this embodiment thereof are employed from positions behind and from inside the aft cowling #45 portion of same once mechanically fastened and sealed around the base mounting platform portion of this embodiment of a digital image sensor surveillance sight, in which the digital image sensor, reticle beam projector and cable for the omnidirectional radio antenna #19 component portions of same are mounted to and sealed inside this aft cowling portion of this embodiment thereof. This drawing includes dotted lines indicating optional locations in which the battery compartment #8 and lid for same #10 housing the battery or batteries #20, included for the provision of power to all components needful of same, as well as dotted lines indicating the optional placement of the image transferring and/or transmitting components #13. Additional embodiments of this type of digital image sensor sight of the applicants, would include different configurations of same and include larger battery compartments to provide adequate power storage to power night viewing components employed by same. #39 and #40 are the vertical and horizontal sight adjustment knobs or screws included or this embodiment thereof #7 are switches providing selective power to components needful of same and #31 is the reticle selector and controls for same in this embodiment thereof.

FIG. 18-B includes a drawing of the aft cowling portion of the embodiment of FIG. 18-A as if the mechanical fasteners and sealant securing same had been removed and positioned in a manner in which the forward window #42 as well as the omnidirectional 5-G antenna #19 employed in this embodiment thereof could be viewed.

FIG. 19 includes an embodiment of the same basic type of surveillance sight as is included in FIG. 18, with the only real exception being in mechanically fastenable aft cowling, that covers digital image sensor #22, as well as the reticle beam projector #21 and the omnidirectional radio antenna portions of same, has no actual window in the forward facing portion of same, and thus rendering these components as being partially exposed to the elements. However the window located under the forward cowling portion of this digital image sensor surveillance sight (not viewable from this angle) in which the target is viewed through and target acquisition is acquired by means of the alignment of the reflected image of the reticle light beam #43 reflected off of a slightly reflective inside surface portion of same to the target is also partially exposed to the elements with only the forward cowling covering same, of which does so in the same basic manner, only in this particular embodiment thereof. This actually holds true for all of these same basic types of conventional reflex and holographic type sights, and of which to the applicant's knowledge have suffered no problems, nor have sames level of efficiency been hindered in any way by doing so, with the exception of the lower rail mountable portion of same in this embodiment thereof either fastened to, or made as an integral to an upper disk or plate portion of a an angularly adjustable rail mount, optionally made as an integral portion of any of the single digital image sensor sights of the applicant, that literally transforms them into profoundly effective and highly efficient tactical digital image sensor sights. This rail mount is devised and engineered in a manner that provides the user with the ability to rotate and lock the digital image sensor sight employed on, or manufactured as a portion of same, into numerous positions or angles in relation to the rail mount on the firearm. These rotatably position-able and angularly adjustable mounts, when made as an integral portion of any of the applicant's single digital image sensor sights of the applicants, literally transforms same into a whole new line of profoundly effective and highly efficient tactical digital image sensor sights. This along with same maintaining all of the unique service providing abilities that the various types of them were devised to provide, and thus fulfilling a greater range of need to their specialized applications, by providing them with the ability to provide the same basic services and close to the same level of surveilling and safety providing abilities as is performed by the multi digital image sensor surveillance sights of the applicant.

These angularly adjustable mounts, are devised in a manner that not only provides them with the ability to quickly and easily adjust angularly to a newly desired angle of adjustment in relation and to the firearm same is mounted on simply by means of grasping the housing, the sight itself along with rotational mount latch at the same time, and with one motion rotating the sight into its newly desired angle of adjustment, that when released, the sight locks solidly into its newly desired angle of view to surveil areas of concern, which can be accomplished numerous times very quickly and easily as desired. Then simply by reversing this process and rotating the sight back into its position parallel to the weapon's rail same is mounted on same locks solidly back into its perfectly sighted in position every time.

The employment of these abilities along with the abilities providable to all of the applicant's digital image senor sights, by means of numerous types of multi positionable display mounts included in other applications and patents of the applicant, as well as other means capable of maintaining the targeting and surveilled image or images provided by same ad availed the user regardless of his position relative to the firearm, in turn provides the user, especially in the case of the employment of same by our ground troops, with tremendous safety and control providing abilities, never previously availed to them.

FIGS. 20-A through FIGS. 20-E. include embodiments, of a type of sight adjustable rail mount capable of providing and maintain very minute and precise sighting adjustments to the various types of digital image sensor sights of the applicant, with the primary reason same were developed in the manner that they were, was to create a sight adjustable rail mount that could enable the various digital image sensor sights of the applicant with the extreme levels of accuracy, that they are all actually capable of achieving.

FIG. 20-A. Includes a drawing of an overhead view of an embodiment of a bottom surface portion of a surveillance sight housing, #38 the opposite side, of which in some embodiments thereof being mechanically fastenable to the lower open outer periphery portion of an upper portion of an embodiment of a surveillance sight's housing #35. This portion of the surveillance sight, is both vertically as well as laterally adjustable relative to the actual rail mount portion of this embodiment of a surveillance sight. #38 included in FIG. 20-B However this portion of the housing of same, is actually made as an integral portion of the tactical digital image sensor sights themselves, in the embodiments thereof included in FIGS. 15-A through FIG. 16-B.

However all variations and examples of embodiments the various digital image sensor surveillance sights and sight acquiring devices included in this application are simply included, as examples of them, that offer optional modes of constructing same that are devised and engineered in ways, that offer certain benefits, relative both to that of assemblage as well as to the future possible need to access internal components for the repair or replacement of same. However these examples thereof are simply offered as several of many optional configurations and modes of constructing same.

This drawing included in FIG. 20-A includes an embodiment of the components that provide the surveillance sight with vertical adjustability, relative to the the lower rail mountable portion of same. This embodiment thereof accomplishes this task by means of a second end portion same being pivotably fastened to a second end portion of the lower and rail mountable portion of same by means of mechanical fastener #71, and the first end of each being vertically adjustable in part by means of the components countersunk or inset and housed inside inner portions of this embodiment of a lower portion of #38, in the housing for same.

These components housed in the countersunk or inset portion of same, including a vertical sight adjustment screw #39 of which is actually the outer portion of a shaft that additionally includes a spiral thread referred to as the worm #61 portion of a worm gear set, that engages and mesh with teeth in the outer periphery portion of a wheel or the worm gear #62 portion of the worm gear set. The inner open portion of this gear #62 includes threads that engage and mesh with outer thread portions threaded a threaded post #63, in the lower portion of the rail mount #37. Cover plate #64 is provided in this embodiment thereof and viewable in this drawing, as if same had been turned over to view the inner configuration of same. such as the recessed or inset portion thereof #65 recessed in same to accommodate the worm portion of the worm gear set.

The three raised portions #67 in the inset portion of #38, that fit into and around the bottom half of the groves #68 cut in shaft #39 as do the raised portions of the cover plate #64 of which are configured in a manner that when assembled these raised portions of the cover in this embodiment of same fit into and around the upper half of the groves #68 cut in shaft #39 and acts as the outer 50% of the bearing portions that sure the shaft #39 and the worm portion of the worm gear in place as well as employ same as bearings enabling same to freely rotate therein #69 is simply one of two friction reducing washers with the other one of same also being around #63 but located between the upper inset portion of #38 and and the upper surface portion of worm gear #62 (not shown.)

So that when cover plate for all #64 is secured around the the outer periphery portion of same is into the inset bottom portion of #38 by means of mechanical fasteners #30 all is allowed to freely rotate while tightly housed therein. #70 is a an open and cut slot in this cover plate #64 in which the threaded post #63, extending up out of the lower portion of the rail mount #37. extends through and into the inner open portion of the worm gear #62 includes threads that engage and mesh with outer thread portions threaded a threaded post #63, which is both vertically and rotatably secured in the lower portion of the rail mount #37.

So that by means of the clockwise and counterclockwise rotation of the vertical sight adjustment screw portion of shaft #39, the worm portion of the worm gear set in turn engages teeth in the outer periphery portion of a wheel or the gear #62 portion of the worm gear set. The inner open portion of this gear #62 including the threads, meshed with the outer threaded portion of the threaded post #63, extending up out of the lower portion of the rail mount #37. A first end portion of the lower housing portion of the digital image sensor surveillance sight is raised and lowered relative to a first end portion of the lower rail mountable portion thereof, with a second end portion of each remaining pivotably secured to a second end portion of the lower and rail mountable portion of same by means of mechanical fastener #71, in turn very precise vertical sight adjustments to the digital image sensor surveillance sight can be performed, in this embodiment thereof.

FIG. 20-B. This drawing includes an overhead view of an embodiment of an upper surface portion of a lower rail mountable portion #37 of a digital image sensor surveillance sight. With this drawing thereof including a view of the upper surface portion of same. The lower side thereof would be the portion of same that would include a clamping portion attachable to a mounting rail on a firearm. Housed in inner portions of this lower rail mountable portion #37 of the digital image sensor surveillance sight are the components providing same with lateral or horizontal sighting adjustability. This task is performed by means of the clockwise and counter clockwise rotation of an end portion of a horizontal sight adjustment screw #40. located on a first end portion of the lower rail mountable portion of #37 and extends through a hole therein to an opening #71 in the aft portion of #37 and is then threaded through a lateral sighting adjustment post #72 therein and out of the other side of same to where #40 passes through another hole starting in the opposite inside side portion of opening #71 to where same comes to a slot just wide enough to accept a c-clip #73 there through and onto a recessed groove comprising of a cut out inset portion extending around the sight adjustment screw #40.

Lateral sighting adjustment post #72 extends up and above the upper surface portion of this embodiment of a lower rail mountable portion #37 of a sight adjustable rail mount, in a manner that when same is mechanically fastened to the bottom surface portion of a digital image sensor surveillance sight housing #38 as is included in FIG. 20-A in a manner that when fully assembled to and along with the lower portion of a surveillance sight housing #38. Lateral sighting adjustment post #72 extends up and into opening #74 in the lower end portion of a digital image sensor surveillance sight housing #38 as is included in FIG. 20-A, in a manner that by means of the clockwise and counterclockwise rotation of the lateral or horizontal sight adjustment screw portion of sight adjustment screw #40. Very precise horizontal sight adjustments are thus made to the digital image sensor surveillance sight. #63, is a head on overhead view of the threaded post, that the upper threaded portion of same would extend up out of the lower portion of the rail mount #37 and would thread into the threaded open inner portion of the worm gear housed under the cover for same #64 viewable in FIG. 20-A. The square or rectangle head portion of same is mounted in the recessed lateral slot, in the upper portion of #37 under the mechanically fastened cover for same #77, in this embodiment thereof.

FIG. 20-C. Includes a drawing of all of the components comprising an embodiment of the portion of a surveillance sight housing, #38 Included in FIG. 20-A of which in some embodiments thereof being mechanically fastenable to the lower open outer periphery portion of an upper portion of an embodiment of a surveillance sight's housing #35. and other embodiment' thereof simply being a lower portion of a surveillance sight housing. Of which, is both vertically, as well as laterally adjustable, relative to the actual rail mount portion #37 thereof. This drawing of embodiments thereof have been included simply to provide a fully assembled view of these embodiments of same.

FIG. 20-D and FIG. 20-E include drawings of a blown up view of an embodiment of the lower portion of a surveillance sight housing, #38. As is included in FIG. 20-A, as well as a blown up view of the a lower rail mountable portion #37 of a digital image sensor surveillance sight. As is included in FIG. 20-B. and all of the internal components comprising same.

FIG. 20-D includes an embodiment of a lower portion of a digital image sensor surveillance sight housing #38 with the cover plate #64 removed and placed to the side and all internal components housed therein in this embodiment of same, removed therefrom. #69 being two friction reducing washers, the first of which stationed between the upper inset portion of #38 and and the outer surface portion of worm gear #62 and the teeth around the outer periphery of same, that meshes with the teeth on the worm portion #61, of the worn gear, which is all actually part of the vertical sighting adjustment screw #40 in this embodiment thereof.

FIG. 20-E This drawing includes a profile view of the embodiment of FIG. 20-B of which is a lower rail mountable portion #37 of a digital image sensor surveillance sight. With this drawing including the actual clamping plate portion #29 of the rail mount as employing thumbscrews #28 integral to screws or threaded rods to effect the devices mechanical securement to a mounting rail on firearm, in this drawing thereof. This actual clamping plate #29 potion of a rail mount, would actually be on the opposite and non viewable side of same in this embodiment thereof #40 is a full view of lateral sighting adjustment screw that threads into, and through post #72 that extends up and out of #37 and into the opening #74 in the lower end portion of a digital image sensor surveillance sight housing #38 as seen in FIG. 20-D.

FIG. 20-F simply includes drawings both of a profile view as well as a head on overhead view of the threaded post #63, of the embodiment of FIGS. 20-A, B, and FIG. 20-C, that the square or rectangle head portion of same is mounted in the recessed lateral slot, in the upper portion of #37 under the mechanically fastened cover for same, and of which the threaded portion of same would extend up out of the lower portion of the rail mount #37, then pass through the oval opening for same in cover #64 and would thread into the threaded open inner portion of the worm gear housed under the cover for same #77 viewable in FIG. 20-A. in this embodiment thereof.

FIGS. 21-A and FIG. 21-B. As well as. FIGS. 22-A, FIG. 22-B. All include drawings of embodiments of a type of a combination surveillance sight or surveillance and sight acquiring device and angularly adjustable display, or a type of a combination, surveillance sight or surveillance and sight acquiring device and angularly adjustable display mount. All of these embodiments thereof share many things common with each other. A couple of these things being, that all include, two basic integral portions. The first of which including the mount and all integral portions thereof that are non rotatable and part of the rail mount, or clamping portion thereof. #78, mountable to the, Picatinny or other type of accessory mounting rail, on a firearm, employing same. These portions of same in these embodiments thereof, additionally including a battery compartment #84 as well as an infrared illuminator and/or other night viewing components such as thermal optics included in the housing for same. #88 integral to the battery compartment #84 or optionally with the housing for all night viewing components included as part of or attached to the housing the digital image sensors and other components, and same either in electrical communication with the batteries in battery compartment #84 in the same manner. As is included in the embodiment of the combination digital image sensor surveillance and sight acquiring device and multi-positionable dedicated display, included in FIG. 22-A in these embodiment's thereof. The beam width adjustment for same achieved by means of the clockwise and counterclockwise rotation of #89. #92 is simply the combination on off and brightness control switch for same in these embodiment's thereof. The upper portion of the rail mount portion of this device also includes a plate. #83, this plate includes a plurality of indents or inset portions #85 around the outer periphery portion thereof.

The second of the two basic portions of these embodiments of devices include the rotatable portions thereof. This including the display #93 and/or display mount #79 as well as the mounting base bracket #80 portion thereof and latch pin housing portion of same. This base bracket #80 includes a opening that extends around the upper rail mount portion of the device and of which is rotatably coupled to same between the upper plate portion of same #83 and a threaded ring #90, that maintains adjustable friction to the mounting base bracket #80 between #83 and #90. This threaded ring #90 also includes a set screw #91 to maintain same in its adjusted position in these embodiments thereof.

The display #93 and, or display mount #79 as well as the mounting base bracket #80, portion thereof and latch pin housing portion of same are all rotatably coupled to the rail mount, or clamping portion #78 of this device. #78 and adjustable to a plurality of angles relative to same, by means of the pulling and releasing of the spring loaded finger pull #81. integral to a latch pin, in these embodiments thereof. Latch pin and finger pull are both viewable and will be described in detail in FIG. 22-B.

FIGS. 21-A through FIG. 22-B. all show same, as including a power cord #100 plugged into one of the micro USB or OTG receptacles #12 both on the battery housing as well as the sighting, or sight acquiring component housing portions of these devices in these embodiments thereof. This power cord #100 is included as an example of a simple mode to provide electrical communication between the batteries housed in battery compartments #84 employed as a primary power source in some embodiments thereof and as a reserve, alternate or recharging power source for others, in the examples of embodiments thereof., included in FIGS. 21-A, through FIG. 22-B.

FIGS. 21-A, Includes a drawing of an embodiment of a type of a combination digital image sensor surveillance sight and multi-positionable dedicated display for same #93. This embodiment thereof, actually including the display housing or case for same #93 as being a portion of this device that's rotatable relative to the rest of same. This embodiment thereof actually includes the same basic type of rail mountable surveillance sight that is included in FIG. 17-A, with the main difference between this embodiment thereof and the embodiment of the surveillance sight included in FIG. 17-A. being primarily just in the positioning of some of the switches and controls on same. This embodiment thereof is mounted to a small section of Picatinny rail (not actually viewable in this drawing) but actually made as a portion of, or mechanically fastened to the surface of a non rotatable portion of this device under same and thus removable and re-mountable to same. In that this embodiment thereof, like the embodiment thereof included in FIG. 17-A, may, or may not additionally include its own power supply, in that same was developed primarily for military applications and mountable to the device in this manner to to provide a soldier with the ability to alternatively employ same as a surveillance sight mounted on either an upper, or lower mounting rail out either close to the muzzle, or elsewhere on the firearm and alternatively employ same in conjunction with computerized glasses computerized goggles or other.

The actual sight adjustable rail mount portion of this embodiment thereof, is also of the same basic type as the embodiment thereof included in FIGS. 20-A through FIGS. 20-E. These sight adjustable rail mounts possess the ability to provide and maintain very minute and precise sighting adjustments, in a manner in which they were devised to provide, not only these these digital image sensor sights, but all others of the applicants as well, with the extreme levels of accuracy that all digital image surveillance sights of the applicants are actually capable of achieving, even when the digital image sights or surveillance sights employing same have a very short linear footprint.

The multi-angularly adjustable digital display mount, or integral display quickly adjusts to any desired angle of view relative to the firearm and then solidly locks into the newly desired angle of view, simply by means of pulling the finger pull #81 and rotating this digital display or mount for same with one hand, then, which same solidly locks back into its newly desired angle of use relative to the mount for same once released.

FIG. 21-B Includes a drawing of an embodiment of a combination surveillance sight and angularly adjustable display mount. This embodiment thereof includes all but a few things common with the embodiment thereof included in FIG. 21-A. Obvious differences in this embodiment thereof, as well as the embodiment of a digital image sensor sight acquiring device and angularly adjustable display mount, of FIG. 22-B, being in sames employment of an angularly adjustable digital display mount #79 that includes a dedicated digital display or smart device cradle portion of same #95 as well as a housing portion of same, #98 configured for the insertion of and housing of a combination three sided slide and compression plate #97, that also includes an opening in and through an upper portion of same provided for the insertion of a threaded rod, portion of thumbscrew #99 through same and then into and through the said threaded member portion, of the upper back side portion, of the display mount #79. Thus enabling the vertical adjustment, of compression plate #97, by means of the clockwise and counterclockwise rotation of thumbscrew #99, and thus, the compressive securement of a smart device or dedicated digital display between the bottom portion of the compression plate #97, and the upper surface portion of the cradle #95 portion of the angularly adjustable display mount #79 in this embodiment thereof, instead of same actually being an integral portion of an actual angularly adjustable housing portion of dedicated digital display, as is included in the embodiment thereof, included if FIG. 21-A.

FIG. #22-A. Includes a drawing of an embodiment of a combination surveillance and target acquiring device and angularly adjustable display mount. This embodiment thereof, as well as the embodiment thereof included in FIG. 22-B. like the embodiments of the combination surveillance sights and angularly adjustable displays or display mounts, of FIGS. 21-A. and FIG. 21-B. are shown as employing the greatest portion of the same basic type of components, as are also employed in the embodiment of the digital image surveillance sight included in FIG. 17-A., with the exception of sames employment of a reticle beam selector and projector as well as the absence of sames employment of a sight adjustable rail mount of any kind. This simply due to this devices ability to acquires highest achievable level of accurate target acquisition, from behind other sights or scopes mounted on and sighted in, on a firearms accessory mounting rail.

This device is capable of accomplishing this task by means of sames ability to align the center of the lens portion of its target acquiring digital image sensor #22 in perfect linear alignment with the targeting reticle or crosshairs of the sight or scope same is acquiring targeting acquisition from.

This device accomplishes this task, firstly by means of this devices positioning of the actual lens of the targeting digital image sensor #22 as well as the maintaining of same aiming directly forward and perfectly centered over the center of the firearms accessory mounting rail, automatically simply by means of mounting this device to same. This simply due to the manner in which same is devised and engineered. This also being the positioning of the targeting reticle or crosshairs of almost all sights and scopes of which are also perfectly centered over the firearms accessory mounting rail, once mounted to same, as well, although positioned at different heights, directly over same.

This leaving the only adjustments needfully made to this device for same to acquire perfect linear alignment of the lens of the targeting digital image sensor #22 with the targeting reticle or crosshairs, from other sights or scopes mounted in front of same, on the firearms accessory mounting rail and thus acquire perfect targeting acquisition from same accomplished simply by means of the vertical adjustment of the lens portion of the targeting digital image sensor #22 by means of the vertical adjustment of the housing for same to the same height as the targeting reticle or crosshairs, are positioned above the firearms accessory mounting rail.

All components enabling this embodiment thereof as well as the embodiment thereof included in FIG. 22-B, with the abilities to accomplish these tasks, are included in FIGS. 22-B through FIG. 22-E. The only real differences between these two embodiments thereof being the embodiment of FIG. 22-A's employment of the display housing or case for same #93 and the embodiment of FIG. 22-B's employment of a digital display mount #79, as being a portion of the rotatably coupled mounting base and upper bracket portion of same #80 of this device and thus being the portions thereof that are angularly adjustable relative to the remaining portions, of these two embodiments thereof.

Notice that the housing #88 for the infrared illuminator, thermal optics, or other night viewing components is shown as being part of or attached to the upper portion of the housing, housing the digital image sensors and other components. The positioning of #88 above the target image acquiring digital image sensor #22 simply ensures that the illuminating services provided by same are not obstructed by the sight or scope that this device is acquiring target acquisition from. This drawing of an embodiment thereof also shows same as employing a type of omnidirectional five-G antennas #19 on top of #88 and if employed in this embodiment thereof. The cables for same would simply extend through a aft portion of the housing of #88 with the connections for same on the upper inside portions of same. In this embodiment thereof all night viewing components, like all other components comprising this device, are provided power by means of the batteries, in battery compartment #84, and with all in electrical communication with same by means of power cord #100 in these examples of an embodiments thereof.

Image transference for all digital image sensor surveillance sight and sight acquiring devices included in this application, not employed by our armed forces, have several optional modes employable by them to achieve video communication between same and the smart device such as smart phone smart glasses smart watch or its own dedicated display, employed by same, which has always included either radio transmission, or direct wire communication and although their are several modes to do so that include WI FI or other modes or types of radio transmission. Direct wire or fiber-optic communication until recently has been the only mode in which image transference between the digital image sensors and digital display employed by same, could be accomplished without suffering from latency issues.

However that has recently changed due to the advent of five-G technology. This due to the modes of device to device communication employable by five-G technology, of which can achieve image transference between the digital image sensors equipped to employ same and the five-G compatible digital displays employed by them, with almost zero latency and of which, plans are in place to employ same in all future digital image sensor surveillance sights and sight acquiring devices of the applicant with same.

However, at this point its doubtful that our armed forces will be employing the type of high frequencies radio transmission employed by of the type of device to device communication employed by five-G. In that although military electronics are extremely high tech, radio transmission on the battlefield is extremely restrictive, due to the vulnerabilities of same. This primarily due to electromagnetic signals same emit that can be exploited by the enemy in many ways, both in that of location detection, as well as other security risks. Its for these reasons the applicant has been told that all digital image sensor surveillance sights and sight acquiring devices of the applicant employed by our troops will employ tiny shielded fiber-optic cables, for all image communication rather than radio transmission, or even hard wire communication in these embodiments thereof.

FIG. #22-B. Includes a drawing of a profile view of the forward portion of a combination surveillance sight and target acquiring device and angularly adjustable display mount. This embodiment thereof, is drawn as if the vertically adjustable image transfer component housing #3, housing the digital image sensors, as well as the digital image transmitting and/or transferring modules for same, along with all antennas switches and other components, therein and thereon, had been removed from the combination knob and threaded rod #102 provided both for the attachment as well as the vertical adjustment of the image transfer component housing #3., relative to the accessory mounting rail on the firearm #27, of which is shown as a being Picatinny weapons rail in this drawing of an embodiment thereof as well as a view of one of the thumbscrews #28 provided for the mechanical securement of the device to same.

Included as an integral portion of the bottom of the base bracket #80 is the housing #104 for a latch pin #82, of which in this embodiment thereof is actually the end portion of a spring loaded finger pull #81 extending all of the way through an opening in #104 with the end portion of latch pin #82 extending out of the inner end portion of housing #104. Thus by means of the pulling of the spring loaded finger pull #81 and thus removing the end portion of same, being latch pin #82 from the one of the plurality of indents #85, around the outer periphery portion of plate #83. Thus enabling base bracket #80 as well as the digital display, or digital display mount portion of same to be angularly adjusted relative to the portions of the device solidly mounted to Picatinny rail #27.

Of course in the same a manner once the finger pull #81, is released the spring inside the latch pin housing #85 compressibly re-secures latch pin #82, into another one of the plurality of indents #85, or inset portions, around the outer periphery portion of plate #83. Thus re-securing base bracket #80, as well as the digital display, or digital display mount portion of same solidly into its newly desired angle of adjustment relative to the non-rotatable portions of the device solidly mounted to Picatinny rail #27.

FIG. #22-C. includes both a drawing of a profile view, as well as a view of back side of the vertically adjustable image transfer component housing #3. housing, housing the digital image sensors, as well as the digital image transmitting and/or transferring modules for same, along with all antennas switches and other components, therein and thereon. These two viewpoints of same also provide a good view of a raised female threaded portion of the back side of the image transfer component housing #3 with cut off portion of the threaded rod portion of the combination knob and threaded rod #102 threaded through same. Both of which provided for the attachment, as well as for the vertical adjustment of the image transfer component housing #3, by means of the clockwise and counterclockwise rotation of the knob portion of the combination knob and threaded rod #102.

This raised female threaded portion of the back side of the image transfer component housing #3 inserts into and vertically travels up and down an inset groove or channel #107 in the forward center portion of the battery housing #84. The threaded rod portion of the combination knob and threaded rod #102 also extends through the entire span of the inset portion #107 of #84 with a smooth non threaded end portion of same inserted into an inset hole in the very bottom portion of same as seen in FIG. 22-B. in these examples of embodiments thereof.

FIGS. 22-D. includes drawings of a disassembled blown up view of the components comprising an upper portion of the this embodiment of a combination surveillance and target acquiring device as well as the end connecting portion the upper bracket portion of the angularly adjustable display mount for same. This as well as the mode in which the knob ant threaded rod portion of same are rotatably coupled to same in this embodiment thereof #109 is an upper extended portion of the upper housing portion of the battery compartment housing #84 of the comprising of an extended collet #110 and threaded portion #111, as well as a milled out inset portion thereof #112, located on the uppermost portion of same in this embodiment thereof. An opening in the end portion of the upper bracket portion of the display mount #79 fits over and is rotatably coupled to the extended collet portion thereof #110 between two friction reducing washers #109 and tension adjusted and maintained thereon by means of machine nut #114 and set screw in same. #115 This extended collet, threaded and inset portion of the upper housing portion of this embodiment thereof also includes an opening in, and extending through the center portion thereof, in which the threaded rod portion of #102 both extends through and is rotatably coupled to and maintained on the upper portion of same, by means a C clip plate #117 extending through a slot #119 in a side portion of the knob portion of #102 and clipping onto and around the upper inset portion thereof #112 in these examples of embodiments thereof.

FIG. 22-E includes a drawing of an assembled view, of the embodiments of the composition of components included in FIG. 22-D. A portion of the knob portion of the combination threaded rod and knob portion of this this embodiment of same is shown as being transparent to view and gain a better understanding of the internal configuration of this embodiment of the knob and the milled out inner portion of same to accommodate the machine nut #114 portion of the combination knob and threaded rod #102 and the components housed in and under same in this example of an embodiment thereof.

FIG. 23. Includes a drawing of a soldier, member of a S.W.A.T. team, or other #57, that actually has two different types of the digital image sensor surveillance sights included in this application, mounted on the firearm he's employing, and employing same in conjunction with each other. Of which is not the normal mode of employment for either of these devices. However both were included in this drawing as well as in the drawing provided for FIG. 24. simply in an effort to provide an understanding of some of the basic functions, as well as well as one of the basic tactical modes same were devised to be employed.

The embodiment of device mounted and sighted in on the bottom rail #1 and out towards the muzzle of the firearm, is an embodiment of one of the multi digital image sensor surveillance sights #53 included in this application. This drawing shows same being employed as a surveillance device, by a soldier, or member of a S.W.A.T. team, after having to take cover from incoming fire, in a theater of urban combat, or employing same to surveil an area for present or hidden dangers, before interring in, or traversing through same.

This drawing shows the user employing same extended just beyond the edge of the corner of the building #54 or other he is taking cover behind, where the digital image sensors behind the viewing window, or windows of the multi digital image sensor surveillance sight #53 can attain a full view of the area. This is one of the primary tactical modes this device was devised to be employed. However same would normally be employed in conjunction with a broad range of display options, such as smart glasses, smart goggles smart phone small tablet or its own dedicated display in its own mount or even same on a wrist mount. Thus providing the user with the ability to maintain a full time view and perfect vantage point of surveilled and targeting images provided by the digital image sensors housed therein, no matter what position the user had to position himself behind protective cover and safely out of the line of fire.

The device mounted on the upper accessory mounting rail of the firearm is the embodiment of a combination multi digital image sensor surveillance sight and display mount #51, included in FIG. 21-A with a smart phone, or a dedicated display #93 mounted in the display mount #79 of same.

This device also has many advantageous modes and mountable positions of employment on a firearm. However the primary tactical mode in which same was devised to be employed is much in the same manner that the multi digital image sensor surveillance sight is being employed in this drawing, both for surveilling and sighting purposes out towards the muzzle of the firearm. However this device would be mounted on the firearm, where the user of same could maintain a clear view of the screen of the display device mounted in the multi angularly adjustable mount #55 for same. Thus the mode, as well as one of the primarily tactical mounting positions this device was devised to be employed, is on the top accessory mounting rail and out towards the muzzle of the firearm and thus employed in the same basic manner and to the provision of the same basic services, but more as a complete and fully self contained unit rather than the embodiment of a multi digital image sensor surveillance sight #53, which has to be employed in conjunction with a separately employed display device.

These devices were not devised to actually be employed in conjunction with each other, in any way. However, this drawing includes the multi digital image sensor surveillance sight, mounted on the bottom rail of the firearm, as employing the display device #50 mounted in the combination multi digital image sensor surveillance sight and multi angularly adjustable display mount #51, mounted on the upper accessory mounting rail of the firearm, with its captured digital video images transferred between same by means of either point to point radio, direct wire, or fiber optic cable communication, to the display or smart device mounted in same and thus provide its surveilled and targeting images to the soldier, member of a S.W.A.T. team, or other, from a position of protective cover and safely out of the line of fire.

However no matter which of these devices are actually employed and what actual display device and in what manner same is actually employed with same, both of these devices provide the user with fully unobstructed visual in all angles of view of his surroundings in either full screen individually, or simultaneously in different windows of the display its employing and provide the user with the full to maintain a full visual of his entire surroundings to thoroughly access the true battlefield demographics and the impending dangers therein simply by means of sticking the end portion of the muzzle of the firearm with either an embodiment of the multi digital image sensor surveillance sight #53, or an embodiment of the combination multi digital image sensor surveillance sight and multi angularly adjustable display mount #51, mounted on either the top, or bottom mounting rail and out towards the muzzle of the firearm, provides the user with the ability to extended same just beyond the edge of a wall, tree, armored vehicle, or other, to expose the digital image sensor surveilling and target acquiring devices viewing window. Where a very broad and full and unrestricted field of view of the area can both be acquired, and a visual of same can be very safely and easily maintained, thus providing the user with a full, ongoing and unobstructed visual as well as the full accurate use of the firearm and providing the user with the ability to do so, from literally any position the user has to position himself in relation to the firearm, to remain out of the line of fire, whether this position includes the user having to do so with his back flat up against the wall, or from what side of the firearm the user has to position himself relative to the firearm or surveilling the area over the users head, such as out of a trench, or berm and whether having to look down halls, into rooms and other hiding places when clearing buildings of snipers or other hostile combatants and whether on reconnaissance or simply traversing from one position to another and having to view around buildings or other obstacles to properly surveil down allies or other areas to see if the path needed to take is safe to do so. This as well as a broad range of other duties required of our troops on a daily basses requiring them to put themselves in harms way to do so.

FIG. 24. Includes a drawing of the same soldier, member of a S.W.A.T. team, or other, employing all of the same basic equipment embodiments as is included in FIG. 23. This drawing includes the user, maintaining a full surveilled visual of the area, as well as full use of the firearm and the ability to return accurate fire from same, if under attack and the order is given to do so, from any position of protective cover and totally out of the line of fire, even while under heavy incoming fire, as depicted in this drawing.

This drawing, like the drawing included in FIG. 23. also includes these two devices being used in conjunction with each other and although employable in this manner, same were not actually devised to be employed in this manner.

However, whether employing an embodiment of the multi digital image sensor surveillance sight #53, mounted on either the bottom or the top accessory mounting rail out towards the muzzle of the firearm and whether same is providing its captured surveilled and targeting digital video images, to smart glasses, smart goggles, smart watch, smart phone, small tablet or its own dedicated display in its own mount, or wrist mount, for same. The images provided by same are thus providable to the user regardless of his position relative to the firearm employing same.

This also holding true in the employment of an embodiment of the combination multi digital image sensor surveillance sight and multi angularly adjustable display mount #51, mounted on the upper accessory mounting rail out towards the muzzle of the firearm. Either of which provide the user with a fully unobstructed view of the area along with full accurate use of the firearm, from literally any position the used has to position himself relative to the firearm.

The level of safety and control providable, not only to our ground troops, law enforcement, secrete service, homeland security and others defending this nation, but also all others of this nation relying on the safety and security provided by them, and providable to them by means of embodiments of these devices, is of tremendous significance simply in that embodiments of these devices will provide them with an all new and never previously availed level of safety and control.

These newly availed abilities will doubtless not only save countless numbers of our ground troops lives, but the employment of embodiments of these devices by our armed forces could literally change the manner in which many future combat operations are conducted by our troops, especially in theaters of urban combat, where lines become blurred, due to the actual hostile combatants being intermingled with innocent civilians, that more often than not have been long suffering victims of tyranny and oppression by the actual enemy themselves.

The employment of embodiments of these devices by our armed forces will provide our troops not only with the ability to very effectively resolve conflicts by means of much smaller elite forces, by means of the providing, them with the all new level of safety and control providable by these devices, never previously availed to them. Thus not only enabling them with the ability to very safely and effectively surveil the area from positions of protective cover as well as to take and maintain control of a conflict from same, but also with the ability to do so in a manner where they can take their time and properly access the true threat demographics as well as to accuracy identify the true aggressors and distinguish between same and innocent civilians, who far more often than not, are victims, that have been long suffering from the effects of tyranny and oppression by the enemy themselves.

Thus not only enabling our troops law enforcement and others with the ability to fight wars and safely take control of conflicts, in a manner in which collateral damage is all but eliminated and only the true aggressors need face the consequences of their aggression. This, as well as, providing our troops and others maintaining the peace and safety for all of the rest of us in this nation with a far greater chance of returning home once the conflict is over, but also with the ability to do so, in a manner where, in future conflicts, our troops will be far more viewed by the innocent, and non aggressors, as the good guys there to help them.

It will be apparent to one with average skill in the art of electronic optics and firearm sighting systems that the all aforementioned embodiments of the digital image sensor surveillance sights and the digital image sensor surveillance sight acquiring devices included in this application may be provided using some or all of the mentioned composition of features and components without departing from the spirit and scope of the present invention. It will also be apparent to the skilled artisan that the embodiments described above are specific examples of a single broader invention which may have greater scope than any of the singular descriptions taught. There may also be many alterations made in the descriptions without departing from the spirit and scope of the present invention.

FIG. 25 through FIG. 32 include an embodiment of a combination sighting, range finding and accurate aim-point marking mobile application, devised and developed in ways that employs the computing abilities of the smart digital displays, employed as targeting screens, by embodiments of the digital image sensor surveillance sights and digital image sensor surveillance sight acquiring devices of the applicant to acquire accurate target acquisition in same as well as to view all surveilled digital videos images captured by same, in ways that provides same with a combination of rather amazing abilities. Such as, not only the ability to very accurately determine distance to a target, but also apply same to all ballistic and trajectory calculations data relative to same by means of the computing abilities of the smart digital display device and data both entered and included as well as all instructions included in this mobile application, trajectory calculations of extreme levels of accuracy at great distances are calculated. Then by means of the the mobile operating system smart display devices employment of the their screens mapping grid and their precise positional awareness of all positioned thereon on same provides an additional superimposed small mark or crosshairs positionally oriented on the screen of the smart display device referencing the true offset and accurate aim-point for the shot, or crosshairs positionally oriented on same employable by the user to achieve an accurate shot at great distances in the following examples of embodiments thereof.

FIG. 25 Through FIG. 32. includes an embodiment of a combination, sighting screen, range finding, trajectory calculating and accurate aim-point marking mobile application. This mobile application was primarily developed for the employment of the digital video camera sighting devices included in this application due to levels of accuracy attainable by embodiments of them and as a result thereof. This mobile application, was devised by the applicant as employable by all digital video camera surveillance sighting and sight acquiring devices of the applicant's. In that all possess the ability to employ the screens of a smart digital display devices, to view digital video targeting and surveilled images captured by them.

Thus by means of the modes in which the enabling software and instructions included in this combination range finding, trajectory calculating and accurate aim-point marking mobile application accesses and employs the mobile operating systems and computing abilities of a smart digital display device, employed by these sighting devices included in this application, enables combinations of numerous functions, services abilities that all work together in ways. in which the culmination thereof, in conjunction with the unique mode in which the sighting devices included in this application acquire target acquisition should provide these sighting devices and the users of same, with the ability to achieve levels of accuracy far greater than any other type of sighting device previously devised. This along with the ability to do so, by means of a few very simple, quick and easily finger gestures by embodiments of same. On the screens of the smart digital display devices employed as a targeting screens by embodiments of same.

Enabling software and instructions included in this mobile application embodiment, among many other things includes known ballistics statistics and equations, relative to the many different types and variations of firearms and specifics relative to same and ballistic coefficients for the various types of ammunition employable by them, along with other factors and specifics, relative to equipment employment, as well as additional information, initially provided by the user during the initial setup process of the application. This as well as ballistic table equations, relative to things like wind speed and direction, and additional specifics and other factors relative to conditions present and relevant, optionally enter able by the user prior to the shot by means of simple finger gestures on the screen of the smart digital display device employed. This combination range finding, trajectory calculating and accurate aim-point marking mobile application then employs all acquisitions along with all data and instructions needful relative to same, to very accurately make all trajectory calculations for the shot by means of the mode in which this mobile application accesses the mobile operating system and employs same along with the computing abilities of the smart digital display device employed.

However this mobile application doesn't stop there, in that the software and instructions comprising same is structured in a manner in which it goes on and employs, a combination of functions and abilities performable by both the operating system of the smart display device, along with its access, both to the operating system mapping grid of the digital display it self, in conjunction with the calculating and computing abilities of the smart digital display device in a manner that employs a combination of functions and abilities performable by means of both working together in accordance with additional instructions included in the software in this mobile application, to provide an additional small superimposed mark, or crosshairs. Offset, but relative to, the primary sighted in targeting reticle, displayed in the center of the screen of the smart digital display, referencing the true offset and accurate aim-point for the shot, on the screen of the smart digital display device employed, positionally oriented on same and employable by the user, to quickly and easily achieve, never previously achievable levels of accuracy and maintain same at great distances.

The applicant has always been fully aware of advanced levels of service and abilities developable and employable by embodiments of the applicant's digital video camera sighting devices when employing same in conjunction with smart digital display devices of all kinds and the various modes in which they could not only share the employment of the screens of smart digital display devices and employ same as their own targeting screens. but also to the almost limitless developmental potential of advanced services and abilities providable. Not only by the computing abilities of the smart digital display devices employed as targeting screens by them, but rather due to the modes in which the mobile operating systems they employed were structured and the modes in which the applicants digital video sighting devices possessed the ability to potentially employ them as extremely high tech computerized sights, due, both to the modes in the digital video camera sights of the applicants were employing them as their targeting screens, as well as the modes in which mobile operating systems are structured and the modes in which all abilities comprising same, are made as accessible and employable by means of simple finger gestures enabled by their operating platforms, that not only provide access and the control, of not only all software and function enabling abilities comprising same but also with the ability to do so in conjunction with any additional software included in the software and instructions included in a mobile application developed for the employment of any of the digital video camera sighting devices of the applicants and downloaded into the smart digital display device employed as a targeting screen by embodiments of same.

This as well as the selective provision of all advanced services and abilities providable by embodiments of them, as also being very easily instruct-able and employable by the user of same, by means of simple touch screen gestures, also enabled by the mobile operating systems of the smart digital display devices employed and the modes in which embodiments of the digital video camera sighting devices of the applicants employ them.

The applicant was fully aware of these things, dating back to his first inception, development and testing of the first functioning prototype of digital a digital video sighting device the applicants, Of which was accomplished in part, by means his employment of the digital display portion of the applicant's own smart phone, not only for the extremely high resolution of the digital displays employed by same and the many employable and adaptively employable modes of digital image communication by them and the many ways of optionally employing and taking full advantage of same.

The applicant was also fully aware and had always realized the potential and broad range of not only of the computing abilities of smart devices themselves, but of the almost limitless development potential enabled by the mobile operating systems employed by them and the mode in which mobile applications are granted access to mot only to their computing abilities but also to almost all comprising their entire operating system, along with all abilities and the combinations thereof not only present, but also additionally downloadable and employable in conjunction with same.

This applicant, was also aware of there being many kinds of mobile application development programs and knew of there being many additional services and function enabling abilities that could be made as both providable and employable by the applicants digital video camera sighting devices by means of the development and employment of additional software and instructions in the form of mobile applications downloaded into the smart digital display devices employed as targeting screens by same.

However the largest portion of the knowledge the applicant now has pertaining to these things has come about as a result of countless hours researching all function enabling abilities and the combinations thereof providable by means of the many mobile application development programs. These findings of the applicant regarding same were confirmed as well as numerous additional abilities and options employable to same were both confirmed as well as others discovered as a result of technical information acquired from several top mobile application developers consulted and the going over all functions and combinations thereof needful, with them. At which time the applicant was not only assured of all functions and combinations thereof needed as being easily developed, as well as the best application development programs employable for the development of this combination sighting screen, range finding, trajectory calculating and accurate aim-point marking mobile application. Of which the applicant had also discovered as a result of his own research relative to same. However as a result thereof not only was the applicant assured of his findings being sound but discovered even additional tools in the form of finger gesture control and even voice control options offered by the many mobile application development programs employable to the development of same. This as well as numerous menu and control panel format options. That enabled employable services performable by same, as being more quickly and easily employed by the user of same.

The applicant was also assured of his findings of all being developable in the form of stand alone, or off line applications enabling all functions needful to be developed in ways that don't actually require an internet, or service connection of any kind. However versions of same will possess the ability to receive and employ information from weather and other services via the internet providing data employable such as latitude, barometric pressure, wind predictions and other whether conditions and other information employable. This, as well as many additional service and advanced abilities providable by the employment of G.P.S. by same. However the main programming menus will also have provisions for the user to manually input all information deemed relevant or needful, to the advanced refinement of trajectory calculations and placement of the additional mark on the screen, employable to achieve true accurate aiming of the firearm, relative to distance and all other factors determining trajectory for the shot. This application is also being developed in a manner that the highest possible level of accuracy will still be easily achieved by the user with or without an internet connection.

However, he also became very aware that this advanced mobile sighting application and the profoundly effective abilities same provides, has a very narrow range of actual employ-ability. In that about the only thing, this combination range finding, trajectory calculating and accurate aim-point marking mobile application can possibly be effectively employed by, are digital video camera sighting devices. This simply due to the fact that all functions enabled and services providable by embodiments of this mobile application, are employable solely by a type of firearm sight that acquires and provides digital video targeting images to smart digital displays by means of its own digital video image sensors and video digital image transmitting components and that employs screens of the smart digital video displays, as their targeting screens and thus will likely render this mobile application as exclusively employable by digital video camera sighting devices of the applicants and of which was actually devised primarily for the exclusive employment of same by the digital video camera sighting devices included in this application.

Of which were also actually devised solely for their abilities to achieve far greater levels of accuracy than any other type of firearm sighting device previously devised. Of which in all ways they will be capable of doing so, due to the modes in which they acquire target acquisition in the first place, as well as the mode in which they provide and the targeting images captured by same are displayed by the digital displays employed by same. That will not only provide them with the ability to achieve far greater levels of accuracy at great distances, than any other type of firearm sighting device preciously devised However, using the sighting devices included in this application in conjunction with this combination range finding, trajectory calculating and accurate aim-point marking mobile application. Will provide them with the ability to achieve absolutely profound levels of accuracy at great distances and achieve same, by means of a few very simple, quick and easily finger gestures on the screen of the smart digital display device employed as a targeting screen by embodiments of them.

Accordingly, using this mobile application a user can input information to allow the system to select the appropriate weapon characteristics, ballistics, distance and wind effects, etc., to calculate an adjusted reticle showing the trajectory of a shot relative to the position of the primary reticle, and an accurate aim point relative to the primary reticle showing where a user would have to aim to accurately hit the target targeted by the primary reticle. In doing so, a user may then use the adjusted reticle as the targeting reticle in order to hit the target, or alternatively aim the primary reticle at the location identified by the aim point in order to hit the target.

FIG. 25 Includes a drawing an embodiment of a screen of smart display device employing an embodiment of a combination sighting screen, range finding, trajectory calculating and accurate aim-point marking mobile application for digital video sighting devices, with same including software providing instructions, enabling an embodiment of an optional superimposed layout on the screen of the smart display device employed, as well as finger gesture controls and services and combinations thereof controlled by same. These controls in this embodiment thereof include combination tap on and tap off gesture control buttons. In this embodiment thereof. Some of these controls selectively employed to perform individual tasks needful and others employed to access additional controls such as a small superimposed numbered key pad, or access to controls to effect other functions and services, with these controls for same primarily appearing and employed on a side portion of the screen of the smart display device employed in this embodiment thereof and all enabled by means of this combination range finding, trajectory calculating and accurate aim-point marking mobile application's software providing all instructions to effect all functions and combinations thereof needful to the performance of all tasks and services rendered. In this embodiment thereof.

Included in the embodiment thereof included in FIG. 25. and FIG. 26. Are drawings of a frontal view of a screen of a smart display device employing an embodiment of this combination, sighting screen, range finding, trajectory calculating and accurate aim-point marking mobile application for digital video sighting devices. This drawing includes superimposed images of seven finger gesture control buttons provided with same positioned at a distance between each other across a lower portion of the screen of the smart display device. This drawing includes a large window brought up and displayed on the screen of this smart display device by means of tapping the first finger gesture control button #200 labeled munitions in this embodiment thereof.

This embodiment thereof in FIG. 25. includes an image of a menu that the user would scroll through by means of the up and down finger gesture control buttons #220 on the right side of the menu, to enable the user with the ability to easily scroll through and find the type of firearm employed alphabetically. Once chosen, In this embodiment thereof then another menu would appear on the screen (not shown.) This menu would include other specifics relative to the firearm chosen, such as caliber, barrel length and other. Once needful choices relative to same are made by the user, also included in this embodiment thereof the next menu employed by the user in this embodiment thereof is the ammunition menu as seen in FIG. 26. which would include the various types of ammunition employable relative to the type and caliber of firearm selected in the precise menu or menus. At this point the user would once again simply scroll through the alphabetic menu and select the type of ammunition used and presently employed. Additional menus would also be included and optionally employable during the initial setup process of this combination range finding, trajectory calculating and accurate aim-point marking mobile application in the screen of the display device employed as well (also not shown) enabling the user with the ability to enter additional information if known and deemed needful. In this embodiment of. This combination range finding, trajectory calculating and accurate aim-point marking mobile application of which would employ software and figures relative to the specific menu selections made by the user during the aforementioned initial setup process, along with software and figures relative to additional information entered by the user, relative to conditions present before the shot. Of which all figures along with instructions provided by this embodiment of a combination range finding, trajectory calculating and accurate aim-point marking mobile application would be employed by the computing abilities of the smart display device to effectively calculate trajectory, of which this embodiment of a combination range finding, trajectory calculating and accurate aim-point marking mobile application would then provide the instructions for computing abilities of the smart display device employed to provide a mark and, or crosshairs marking the calculated accurate aim-point for the shot relative to all figures relative to to distance calculated and figures relative to specifics entered. In this embodiment thereof.

Selections of the different menus as well as same scrolled through and selections made on same by the user during his employment of same accomplished by means of simple finger gestures such as finger flick, drag stop and simple finger tap gestures for actual selections made in this embodiment thereof. This large superimposed menu selection window is removed from the screen of the smart display device after all selections deemed needful by the applicant are made simply by means of the user tapping the gesture control button #200 the second time in this embodiment thereof.

The software included in embodiments of the combination sighting screen, range finding, trajectory calculating and accurate aim-point marking mobile application for digital video sighting devices included in this application, among other things, includes a full set of ballistic tables, with all known trajectory statistics for an extensive list of firearm types, variations thereof relative to their employment of the different types of ammunition employable by same. These ballistic tables would not only include all known equations and trajectory tables relative to the firearms employed such as equations relative to the effects of barrel length and drift factors due to rifling direction and bullet rotation, as well as factors relative to the types of ammunition employed, which also varies not only in velocity, but factors such as the shape, size and weight of the projectile as well as the charge propelling same vary greatly and of which effect the ballistic coefficient of each and thus the trajectory of each.

Also included in the software of this embodiment of a combination range finding, trajectory calculating and accurate aim-point marking mobile application and employable to the effect of achieving extremely precise trajectory calculations, are all known figures relative to other conditions and factors that effect trajectory such as target elevation, wind speed and direction, rain, and even barometric pressure and latitude. All of which having an effect on trajectory with even the least of which easily making the difference between a hit and a miss in shots of extreme distance. These figures, like all others are also both known, as well as easily programmable and employed along with all else included in this application, along with this combination range finding, trajectory calculating and accurate aim-point marking mobile applications instructions for the employment of same, along with the computing abilities of the smart display device employed.

All information and figures effecting trajectory calculations relative to all of these factors and their scaled effects on trajectory relative to distance, are all known and operationally programmable and would be included along with all instructions for the employment of same into an embodiment of this combination sighting screen, range finding, trajectory calculating and accurate aim-point marking mobile application and fully employable by all digital video camera sighting device surveillance sights and all digital video camera sighting device surveillance and sight acquiring devices of the applicant.

Included in the software and instructions comprising this embodiment of a mobile application is the provision of the aforementioned large superimposed window providing the users access and employment of a plurality of menus brought up on the screen of the smart display device employed by means of tapping finger control button #200. In this embodiment thereof.

These menus are accessed and employed by the user during the initial setup process of this mobile application. In this embodiment thereof. Each of these menus would be selectively employed as well as selections made on same by means of finger gesture control buttons, by the user either on or around an outer periphery portion of same makes selections in this embodiment thereof by means of the user scrolling through the superimposed menu provided on the screen of the smart display by means of finger gestures. Once the selections from the superimposed menus are made by means of a finger tap gesture on same, information and figures only for the ballistic table relative to the selections made by the user are employed as a base for all trajectory calculations performed by computing abilities of the smart display device employed, along with the data and instructions provided to same provided by this embodiment of a combination sighting screen, range finding, trajectory calculating and accurate aim-point marking mobile application for digital video sighting devices, included in this application.

FIG. 27. Includes a drawing of a frontal view of the same embodiment of a screen and smart display device employing an embodiment of this combination sighting screen, range finding, trajectory calculating and accurate aim-point marking mobile application for digital video sighting devices, with the images of seven finger gesture control buttons as is included in FIG. 25. and FIG. 26. This drawing includes an additional service enabled by another portion of the software and instructions comprising same when installed in and employed in a smart digital display device, of which is actually the second task performed during the initial setup process, In this embodiment thereof and enabled by the software and instructions comprising this embodiment of the combination sighting screen, range finding, trajectory calculating and accurate aim-point marking mobile application and the smart digital display device employing same. This being for the acquisition of a superimposed and positionable reticle #202 in the center of the screen of the smart display device employed. The acquisition of this reticle is accomplished first by means of the tapping of the second one of the gesture control buttons #203. labeled Ret. Sel. standing for, reticle selection in this embodiment thereof. Of which when tapped, a plurality of finger gesture control buttons appear on the screen of the digital display device employed in this embodiment thereof. The top three finger gesture control buttons, which may be labeled "primary reticle", "adjusted reticle", and "aim point", allow a user to select the reticle (primary or adjusted) or aim point for which the user wishes to select a reticle image and/or color. When one of these top three tapped, may bring up a selection of reticle images employable both for primary reticles employable as well as others employable to indicate the adjusted or calculated accurate aim point after all calculations relative to same are made. These marks, crosshairs, or reticle choices #204 vary in size, shape. This embodiment also shows same including color choices of red or green. Other colors may be provided and selectable. The choice made for the primary reticle also places same in the center of the screen of the smart display device employed. The secondary superimposed small mark and/or crosshairs to be superimposed and placed on the screen of the smart display device after all calculations relative to trajectory are made by same to reference the true accurate aim point or crosshairs to be employed to achieve an accurate shot by the user of same.

A second tap on gesture control button #203 causing the removal of the superimposed menus from the screen of the smart display device and the programmed selections of same as well as the placement of the selected superimposed image of the primary reticle #202 is placed in the exact center of the screen of the smart display device in this embodiment thereof.

Calculations made by the smart digital display device employed to accurately calculate trajectory for the positioning of same on the screen of smart digital display device is accomplished In this embodiment thereof firstly by means of sames employment of supplied data and instructions provided by this combination sighting screen, range finding, trajectory calculating and accurate aim-point marking mobile application as well as data relative to selections made from ballistic table menus. As described in FIG. 25. and FIG. 26, during the initial setup process of this embodiment of same by the user. This along with information provided by him relative to size of the target as well as additional information optionally entered by him relative to conditions present and needful. All of which is employed by the smart display device to accurately calculate trajectory of a shot and mark positions relative to same on the screen of the smart digital display device employed. In this embodiment thereof.

The modes in which all of these tasks are accomplished and services provided by means of the employment of this embodiment of a combination sighting screen, range finding, trajectory calculating and accurate aim-point marking mobile application for digital video sighting devices by a smart digital display device employed as a targeting screen by either one of the applicants digital image surveillance sights or digital camera sighting devices in this embodiment thereof. Details relative to these things are further described and easily understood in the additional drawings and descriptions thereof that follow.

FIG. 28. Includes a drawing of a frontal view of the same screen and smart display device employing an embodiment of this combination, sighting screen, range finding, trajectory calculating and accurate aim-point marking mobile application, for digital video sighting devices, with the images of seven finger gesture control buttons as is included in FIG. 25. This drawing shows same in the performance of another service enabled by a another portion of the software and instructions comprising same when installed in and employed in a smart digital display device. This is actually the third task needfully performed during the initial setup process and also enabled by instructions included the software of this embodiment of a combination sighting screen, range finding, trajectory calculating and accurate aim-point marking mobile application.

This task including the positioning of the superimposed primary targeting reticle #202 in the center of the screen of the smart display device in this embodiment thereof. This task is accomplished firstly by means of tapping the gesture control button #205, marked Ret. Pos. for reticle positioning. In this embodiment thereof. The tapping of finger gesture control button causes super imposed reticle positioning controls #206 to appear on a side portion of the screen of the smart display device. In this embodiment thereof. These controls are employed for the positioning of the superimposed target reticle #202 if employed, on the screen of the smart display device during the sighting in of the firearm. These same reticle positioning controls would also be employed simply for the marking and the conveying of the exact position of the conventional reticle provided by one of the embodiments of the applicants digital video camera sighting device or for the conveying of the exact position of the image of the conventional crosshairs or targeting reticle acquired from a sight or scope by an embodiment of one of the applicants digital image sensor, surveillance and sight acquiring devices, to the smart digital display device employed by same for the displaying of surveilled and targeting images captured and provided by same, or the marked and conveyed exact position, of the conventional reticle provided to the smart display device employed. The positioning of the primary superimposed target reticle #202 by means of reticle positioning or marking controls #20. In this embodiment thereof. from sames initially placed starting position of adjustment, perfectly centered in the screen of the smart display device employed, by means of instructions provided by an embodiment of this mobile application.

Positional adjustments are made to the superimposed primary targeting reticle #202 on the screen of the smart display device by means of reticle positioning or marking controls #206, very slowly and precisely right, left, up, and down, either when sighting in the firearm to the target, if actually employing same for the acquiring of target acquisition by the firearm employed or employed for the marking and conveyance of the exact position of the image of the conventional targeting reticle provided by an embodiment of the digital video camera sighting device employed.

The positioning In this embodiment thereof. is accomplished by means of the reticle positioning or marking controls #206 and of which is accomplished by the user, simply by means of finger press, hold and release gesture control buttons #207 on the ends of the two intersecting lines on the superimposed reticle positioning controls for same #206 in this embodiment thereof. Thus providing the user with the ability to very easily and precisely positionally mark the provided image of a targeting reticle for positional referencing prepossess or actually positionally adjusting of the targeting reticle #202 to the target, when sighting in the firearm employed to sames precise aim point, either on a firing range by means of live fire, or alternatively by means of the employment of a very common electronic bore scope, with the digital image of sames view of the target through the barrel of the firearm employed provided by same, brought up and displayed directly on the screen of the smart digital display employed along with the superimposed image of targeting reticle #202. Thus providing the user with the ability to very easily and precisely adjust the targeting reticle to the target by means of the superimposed reticle positioning controls #206, either displayed simultaneously on the screen of the smart display device employed or selectively in the screen of a laptop or other. In this embodiment thereof.

The Superimposed reticle positioning controls #206 are removed from the screen of the smart digital display device employed and the superimposed reticle or the marked positional orientation of same is locked into the position, positionally adjusted to by same on the screen smart digital display device, In this embodiment thereof. by means of the user once again tapping the gesture control button #205 enabled by means of instructions provided by an embodiment of this combination sighting, range finding and accurate aim-point marking mobile application.

FIG. 29. Also includes a drawing a frontal view of the same screen and smart display device employing an embodiment of this combination sighting screen, range finding, trajectory calculating and accurate aim-point marking mobile application for digital video sighting devices with the images of seven finger gesture control buttons as is included in FIG. 25. Through FIG. 28. This drawing includes another service enabled by a another portion of the software and instructions comprising same when installed in and employed in a smart digital display device. This service actually being the first task needfully performed by the user when employing this combination sighting screen, range finding, trajectory calculating and accurate aim-point marking mobile application for digital video sighting devices. This including the user conveying his estimated height of the target to the smart display device and the operating system of same. This task accomplished firstly by means of the tapping of the finger gesture control button #208 in this embodiment thereof of which causes a small superimposed numbered key pad #209, to appear on a side portion of the screen of the smart display device in this embodiment thereof. This numbered key pad is included as a means for the user to convey his estimated height of the target to the smart display device. This task is performed by means of the user typing his estimated height of the target in inches on the superimposed numbered key pad #209. This superimposed numbered key pad is removed from the screen of the smart display device and the estimated inch height of the target is conveyed to the smart digital display device for its employment of same as the first factor to accurately calculate the actual distance that a target is from the user and the superimposed numbered key board #209 is removed from the screen of same by means of the user once again tapping the gesture control button #208 in this embodiment thereof.

The second factor needed by the smart digital display device to accurately calculate distance to a target is a scaling factor based on the size of the image of the target as same appears on the screen of the smart digital display device. The comparison of the scaling factor against the actual or estimated height of the target in inches conveyed by the user, in this embodiment thereof can be used to calculate the range to the target. As described here in FIG. 29, and by means of these two factors and the differences between same that a very accurate distance to the target is very easily calculated by the mobile application on the smart digital display device using the computing abilities of same, in this embodiment thereof. FIG. 30. includes an example of one optionally employable mode, in which the precise height of the image of the target could be easily measured and conveyed to the smart display device to be employed as the second equation to be compared against the first equation by same to accurately calculate distance to a target. In this embodiment thereof.

FIG. 26. also includes a drawing a frontal view of the same screen and smart display device employing an embodiment of this combination sighting screen, range finding, trajectory calculating and accurate aim-point marking mobile application for digital video sighting devices with the images of seven finger gesture control buttons as is included in FIG. 25. Through FIG. 28. This drawing of this embodiment thereof includes additional services enabled by another portion of the software and instructions comprising same when installed in and employed in a smart digital display device, of which being an employable mode and controls employable by the user of this embodiment thereof to perform the aforementioned second task, needfully performed by the user for accurate distance of a target relative to the user to be calculated. This being for the user to accurately measure and convey the actual height of the image of the target as same appears on the screen of the smart digital display device employed. This task is performed in this embodiment thereof firstly, by means of the user tapping the finger gesture control button #210 of which causes both a superimposed finely numbered scale #211 with a press hold and slide finger gesture control button for positioning same. In this embodiment thereof. This superimposed finely numbered scale #211 includes very fine lines extending out laterally from numbered increments In this embodiment thereof This as well as well as, a small numbered key pad #209 also superimposed on a side portion of the screen of the smart display device. In this embodiment thereof. This finely numbered scale with the very fine lines extending out laterally is employed by the user in this embodiment thereof to accurately position same beside the image of the target and accurately measure the height of the target's image as same appears on the screen of the display.

This is accomplished simply by the user positioning the first fine line referencing zero on the scale at the bottom of the targets image and entering the number referenced by the fine line or the smaller mark between two of the fine lines extending out from the scale at the highest part of the image of the target. Once the height of the image of the target according to the scale is determined, In this embodiment thereof. same is conveyed to the for calculations made to determine distance to the target by means of the small superimposed numbered key pad #209, by the user. Also included in this embodiment thereof. This measurement is compared against the estimation of the actual height of the target in inches previously conveyed by the user in the same manner to the smart display device of which by means of the computing abilities of same along with instructions provided by the combination sighting screen, range finding, trajectory calculating and accurate aim-point marking mobile application, accurate distance to the target relative to the user is easily determined by means of the computing abilities of same simply by means of calculating the differences between the targets displayed screen height as well as the magnification level of same relative to the scale provided and the actual target height in inches, both conveyed by the user employing same. In this embodiment thereof.

The superimposed finely numbered scale as well as the numbered key pad is removed from the screen of the smart display device and the scaled screen height of the target entered by the user on same is conveyed to and employed by the smart display device as the second and final equation needful by same to accurately determine distance to the target. by means of the user once again tapping the gesture control button #210 in this embodiment thereof.

At this point, the smart display device, is provided not only with all figures needful to accurately calculate distance to the target, but also with all figures included in the ballistics tables selected for the type of firearm and ammunition employed and provided to same during the first step of the set up process of the mobile application. Included in the description provided for FIG. 25. and FIG. 26. As well as same position knowledge of the superimposed target reticle, positionally adjusted to the target and described as the third step of the set up process of this embodiment of. the mobile application. Included in the description provided for FIG. 28, same is provided with all figures needful both to calculate the true aim-point relative to the superimposed target reticle on the screen of the smart display device employed.

As a result thereof, the user at this point would have, the option of tapping the gesture control button #215, referenced as aim-point. In this embodiment thereof. of which would activate the process of the smart digital display device employed's provision of the secondary superimposed small mark and/or crosshairs positionally oriented on the screen of the smart display device after all calculations relative to trajectory are made by same, to reference an accurate aim point or crosshairs to be employed to achieve an accurate shot by the user of same.

However, a high level of accuracy could only be achievable at this point if no wind was present and the target was positioned at a relatively even elevation relative to the user in that both have an effect on trajectory. However if any of these conditions are present, a solution is provided by means of the employment of the services provided by means of the user tapping the finger gesture button #212 and referenced as Wind D. S. standing for wind direction and speed. In this embodiment thereof. An additional scale #207 is also provided in this screen to convey degrees of either positive or negative elevation of the target relative to the shooter as well. In this embodiment thereof.

Another embodiment of this estimated height screen layout included here in FIG. 29, could and may include provisions for the user to enter and convey the estimated actual height of the target in inches, or other suitable metric, to the smart digital display employed as described in FIG. 28. This information may be used in combination with a scaling factor to calculate distance to a target.

FIG. 30 provides a height scaling factor screen that may also be employed for entering and conveying a scaling factor, referenced by the fine lateral line extending laterally referencing numbers on the superimposed finely numbered scale In this embodiment thereof, provided for the determining of the height of the image of the target displayed on the screen of the smart display device employed.

It's also noteworthy that all tasks relative to the measuring of the image of the target by means of the superimposed finely numbered scale #211, with very fine lines extending out laterally from numbered increments on same, In this embodiment thereof. can be very easily and accurately performed even on targets of great distance from the user simply by means of blowing up the images of same, simply by means of image enlarging features possibly enabled by the smart display itself. In this embodiment thereof.

This mode and tools provided for the measuring of target images, In this embodiment thereof. as well as other function enabling tools, modes and finger gestures employed to effect the performance of same included in this application have been included as simple options devised by the applicant and included only as examples to describe simple modes and tools employable to enabling of functions and the performance of tasks needful, of which may change during the full development process of embodiments of this combination sighting screen, range finding, trajectory calculating and accurate aim-point marking mobile application for digital video sighting devices.

For example, a user may use finger gestures to align the scale 211 to the bottom of the target, and use the numbers provided on the scale to input a scaling factor to the mobile application to be used in the calculations. Alternatively, a user may align the U-shaped lines with the target, and use finger gestures to expand or contract the size of the U to have the mobile application generate a scaling factor based on the size of the U shape on the screen.

Alternatively, if known, a range-to-target estimate may be provide directly to the mobile application directly by the user in similar fashion to how the height estimate was shown. Alternatively, a range finder may be in electronic communication with the device and directly provide a range measurement to the mobile application that can be used in the calculation of the adjusted reticle and/or accurate aim point without need for a range calculation using estimated height and scaling factor.

FIG. 31. Also includes a drawing of a frontal view of the same screen and smart display device employing an embodiment of this combination sighting screen, range finding, trajectory calculating and accurate aim-point marking mobile application for digital video camera sighting devices with the images of seven finger gesture control buttons as is included in FIG. 25. through FIG. 30. This drawing includes additional service enabled by another portion of the software and instructions comprising this embodiment thereof when installed in and employed in a smart digital display device. These controls are provided to perform the third task, needfully performed by the user, to effect the employment of additional figures relative to the effects wind speed, direction and target elevation, also included and programmed into the software of this combination sighting screen, range finding, trajectory calculating and accurate aim-point marking mobile application, for the instructional employment of same through the smart display device working in conjunction with same.

Controls provided for the employment of the services provided by means of the user tapping the finger gesture button #212 and referenced as Wind D.S. in this embodiment thereof. Of which causes the superimposed numbered key board #209, as well as several small finger gesture control buttons to appear the screen of the smart display device employed, referenced wind direction, In this embodiment thereof. that the user could tap if there was wind present and the user desired to enter equations relative to his estimated direction of same to also be figured into into trajectory calculations. In this embodiment thereof. Of which the user could do simply by means of entering a number between zero to three hundred and fifty nine, to convey the estimated wind direction relative to the target, with the target being zero, of which the user would simply enter, on the superimposed numbered key board #209. In this embodiment thereof. The user could also enter his estimation of wind speed on the superimposed numbered key board #209 by first tapping the finger gesture control button referenced wind speed in the same manner. In this embodiment thereof. Target elevation in degrees could also be entered to be figured into the equation by means of first tapping either the finger gesture control button marked incline or decline and then entering the estimated number in degrees also on the superimposed numbered key board #209. This drawing also includes a finger gesture control button to enter the level of optical zoom employed if the digital video camera sighting device employed is equipped with either a manually zoom-able lens or one incapable of conveying the setting electronically. simply by means tapping finger gesture control button referenced #-x-optical magnification and then simply entering the estimated number in degrees also on the superimposed numbered key board #209. In this embodiment thereof. This drawing also includes a finger gesture control button to optionally enter barometric pressure if known simply by means tapping finger gesture control button referenced as barometric pressure and then simply entering the estimated number in degrees also on the superimposed numbered key board #209.

Other controls and/or finger gesture control buttons could and may be added or changed and made as employable at the same time enabling the user to optionally enter additional figures relative to conditions present that could effect trajectory of shots of extreme distances also initially brought up on the screen and made employable by means of tapping finger gesture button #212. In this embodiment thereof. Its also note worthy that by means of the optional employment of the internet by the smart display device employed and additional instructions providable by an embodiment of this mobile application to to the operating system of same. some of, as well as additional condition information such as barometric pressure and other conditions present and relevant could also be employed to even further refine the levels of accuracy attainable by embodiments of this combination sighting screen, range finding, trajectory calculating and accurate aim-point marking mobile application.

These small finger gesture control buttons. Included in this embodiment thereof, illuminate when tapped on and activated and turn off either when the next finger button is employed. In this embodiment thereof. Once all entries deemed as needful are entered by the user and he taps finger gesture button #212 the second time. In this embodiment thereof, all controls relative to same are removed from the screen of the smart display and all figures entered are additionally employed by the computing abilities of same for trajectory calculations as well as sames provision of the accurate aim point or crosshairs employable by the user to effect an accurate shot at great distances in this example of an embodiment thereof.

FIG. 32. Also includes a drawing a frontal view of the same screen and smart display device employing an embodiment of this combination sighting screen, range finding, trajectory calculating and accurate aim-point marking mobile application for digital video sighting devices with the images of seven finger gesture control buttons as is included in FIG. 25. through FIG. 31. This drawing includes a combination of additional services enabled by another portion of the software and instructions comprising this embodiment thereof, when installed in and employed in a smart digital display device. In this embodiment thereof, aim point calculation may be initiated by means of tapping finger gesture control button #215 referenced as aim point, which activates the process of all trajectory calculations made based on the information provided to the mobile application in this embodiment thereof. The adjusted reticle and/or aim point may further be provided upon their calculation, and displayed as an additional superimposed reticle on screen. The primary reticle, adjusted reticle and aim point maybe displayed in accordance with the reticle image and color selections previously made by the user with the Ret. Sel. screen shown in FIG. 25. In FIG. 31, the primary reticle is displayed as a dot or small mark in the center of the screen, the aim point (i.e. the accurate aim-point for the shot) is displayed as the cross-hairs above and to the right of the primary reticle, and the adjusted reticle (or true offset showing where the shot will go if fired at the target of the primary reticle) is displayed as the concentric circles below and to the left of the primary reticle. All of these calculations are made relative to information provided by the user both in his entering of the type of firearm and ammunition employed, selected from the superimposed drop down menus as is included in FIG. 25, and FIG. 26. In this embodiment thereof, as well as all information provided by him such as target size as well as other conditions present and relevant, provided by means of the computing abilities of the smart display device, working in conjunction with this embodiment of a combination sighting screen, range finding, trajectory calculating and accurate aim-point marking mobile application and same provision of all instructions and figures needful included in the software comprising same. In these examples of embodiments thereof.

It will be apparent to one with average skill in the art of mobile applications and firearm sighting systems that the combination sighting screen, range finding, trajectory calculating and accurate aim-point marking mobile application of the invention may be provided using some or all of the mentioned composition of features and enabling software and instructions without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

The descriptions set forth above are meant to be illustrative and not limiting. Various modifications to the disclosed embodiments, in addition to those described herein, will be apparent to those skilled in the art from the foregoing description. Such modifications are also intended to fall within the scope of the concepts described herein. The disclosures of each patent, patent application, and publication cited or described in this document are hereby incorporated herein by reference, in their entireties.

The foregoing description of possible implementations consistent with the present disclosure does not represent a comprehensive list of all such implementations or all variations of the implementations described. The description of some implementations should not be construed as an intent to exclude other implementations described. For example, artisans will understand how to implement the disclosed embodiments in many other ways, using equivalents and alternatives that do not depart from the scope of the disclosure. Moreover, unless indicated to the contrary in the preceding description, no particular component described in the implementations is essential to the invention. It is thus intended that the embodiments disclosed in the specification be considered illustrative, with a true scope and spirit of invention being indicated by the following claims.

I claim:

1. A targeting device for a firearm having a sighting device, the targeting device comprising:
   a mount capable of being secured to the fire arm;
   a first camera capable of capturing images in a field of view including the sighting device, the first camera being adjustable relative to the sighting device such that it can be aligned with the sighting device; and
   a second camera disposed at a first angle relative to the first camera such that it is capable of capturing images in a second field of view that is different from the first field of view.

2. The targeting device of claim 1 wherein the first camera comprises at least one infrared illuminator.

3. The targeting device of claim 1 wherein the first camera comprises at least one thermo-optic component.

4. The targeting device of claim 1 wherein the first camera includes optical zoom capabilities.

5. The targeting device of claim 1 further comprising a transmitter capable of transmitting images captured by the first camera to a display device.

6. The targeting device of claim 5 wherein the transmitter comprises a port enabling a wired connection to the display device.

7. The targeting device of claim 5 wherein the transmitter comprises an antenna enabling a wireless connection to the display device.

8. A targeting device for a firearm having a sighting device, the targeting device comprising:
   a mount capable of being secured to the fire arm;
   a first camera capable of capturing images in a first field of view, including the sighting device, the first camera being adjustable relative to the sighting device such that it can be aligned with the sighting device;
   a second camera disposed at a first angle relative to the first camera such that it is capable of capturing images in a second field of view that is different from the first field of view; and
   a third camera disposed at a second angle relative to the first camera such that it is capable of capturing images in a third field of view that is different from the first and second fields of view.

9. The targeting device of claim 8, wherein the first and second angles are symmetrically mirrored relative to the first camera.

10. The targeting device of claim 9, wherein the first angle is 90 degrees and the second angle is −90 degrees.

11. The targeting device of claim 8 wherein at least one of the first, second and third cameras includes at least one infrared illuminator.

12. The targeting device of claim 11 wherein the at least one infrared illuminators includes a first infrared illuminator for the first camera, a second infrared illuminator for the second camera and a third infrared illuminator for the third camera.

13. The targeting device of claim 8 wherein at least one of the first, second and third cameras include at least one thermo-optic component.

14. The targeting device of claim 13 wherein the at least one thermo-optic component includes a first thermo-optic component for the first camera, a second thermo-optic component for the second camera and a third thermo-optic component for the third camera.

15. The targeting device of claim 8 wherein the first camera includes optical zoom capabilities.

16. The targeting device of claim 15 wherein the second and third camera include optical zoom capabilities.

17. The targeting device of claim 8 further comprising a transmitter capable of transmitting images captured by at least one of the first, second or third cameras to a display device.

18. The targeting device of claim 17 wherein the transmitter is capable of a wired connection to the display device.

19. The targeting device of claim 17 wherein the transmitter is capable of a wireless connection to the display device.

20. A targeting device for a firearm having a sighting device, the targeting device comprising:
   a mount capable of being secured to the fire arm;
   a first camera capable of capturing images in a field of view including the sighting device, the camera being adjustable relative to the sighting device such that it can be aligned with the sighting device;
   a second camera disposed at a first angle relative to the first camera such that it is capable of capturing images in a second field of view that is different from the first field of view; and
   a transmitter capable of transmitting images captured by the first camera to a display device;
   wherein the first camera comprises optical zoom capabilities, at least one infrared illuminator and at least one thermo-optic component.

\* \* \* \* \*